(12) United States Patent
Bergdoll et al.

(10) Patent No.: US 11,291,306 B2
(45) Date of Patent: Apr. 5, 2022

(54) PORTABLE ARMREST DIVIDER FOR USE ON AIRPLANES, TRAINS, BUSES AND OTHER FORMS OF PUBLIC TRANSPORTATION

(71) Applicants: James Bergdoll, East Setauket, NY (US); Janine Bergdoll, East Setauket, NY (US)

(72) Inventors: James Bergdoll, East Setauket, NY (US); Janine Bergdoll, East Setauket, NY (US)

( * ) Notice: Subject to any disclaimer, the term of this patent is extended or adjusted under 35 U.S.C. 154(b) by 0 days.

(21) Appl. No.: 17/085,431

(22) Filed: Oct. 30, 2020

(65) Prior Publication Data

US 2021/0127840 A1     May 6, 2021

Related U.S. Application Data

(60) Provisional application No. 63/006,801, filed on Apr. 8, 2020, provisional application No. 62/928,646, filed on Oct. 31, 2019.

(51) Int. Cl.
    *A47C 7/54*           (2006.01)
    *B60N 2/75*           (2018.01)
(52) U.S. Cl.
    CPC ............. *A47C 7/546* (2013.01); *B60N 2/787* (2018.02)
(58) Field of Classification Search
    CPC .......... A47C 7/546; A47C 7/66; A47C 15/00; B60N 2/787; B60N 2/79; B60N 2/46;

(Continued)

(56) References Cited

U.S. PATENT DOCUMENTS 4,592,584 A    6/1986   White, Jr. ............... 296/153
4,810,026 A    3/1989   Doane ..................... 296/153

(Continued)

OTHER PUBLICATIONS

The Notification of Transmittal of the International Search Report and the Written Opinion of the International Searching Authority, or the Declaration, dated Jan. 27, 2021, which was issued by the International Searching Authority of WIPO in Applicant's related international PCT application having Serial No. PCT/US2020/058227, filed on Oct. 30, 2020.

(Continued)

*Primary Examiner* — Mark R Wendell
(74) *Attorney, Agent, or Firm* — Bodner & O'Rourke, LLP; Gerald T. Bodner; Christian P. Bodner

(57) ABSTRACT

An armrest divider which is removably mountable on a shared armrest of a seat in which a person may sit includes a planar main body which acts as a vertical divider or barrier between persons sitting in adjacent seats who share a common armrest when the armrest divider is in use, an arm supporting ledge that extends perpendicularly outwardly from one side of the planar main body, the bottom side of which is adapted to rest on and be supported by an existing shared armrest between adjacent seats, and a locking wedge section that may be inserted between and held in place by the passenger's backrest and the armrest. The armrest divider may also include a stop member preferably formed as an outwardly extending protrusion from one side of the planar main body to limit the distance the locking wedge section may be inserted between the armrest and the passenger's seat backrest.

36 Claims, 53 Drawing Sheets

(58) Field of Classification Search
CPC .......... B60N 2/75; B60N 2/757; B60N 2/783; B60N 3/00; B60R 21/02; Y10S 224/926; B64D 11/06
USPC .................................................... 297/411.23
See application file for complete search history.

(56) References Cited

U.S. PATENT DOCUMENTS

| | | | | |
|---|---|---|---|---|
| 4,890,878 | A | * | 1/1990 | Harary .................. B60N 2/783 296/153 |
| 6,260,903 | B1 | * | 7/2001 | von der Heyde .... B60N 2/2821 296/24.46 |
| 7,959,231 | B2 | | 6/2011 | Lee ............................ 297/411.2 |
| 9,586,687 | B2 | * | 3/2017 | Abreu .................... B60N 3/002 |
| 2014/0252821 | A1 | | 9/2014 | Friedlander ................... 297/232 |
| 2015/0084393 | A1 | | 3/2015 | Chang et al. ............ 297/411.23 |

OTHER PUBLICATIONS

The Written Opinion of the International Searching Authority, dated Jan. 27, 2021, which was issued by the International Searching Authority of WIPO in Applicant's related international PCT application having Serial No. PCT/US2020/058227, filed on Oct. 30, 2020.

The International Search Report, dated Jan. 27, 2021, which was issued by the International Searching Authority of WIPO in Applicant's related international PCT application having Serial No. PCT/US2020/058227, filed on Oct. 30, 2020.

* cited by examiner

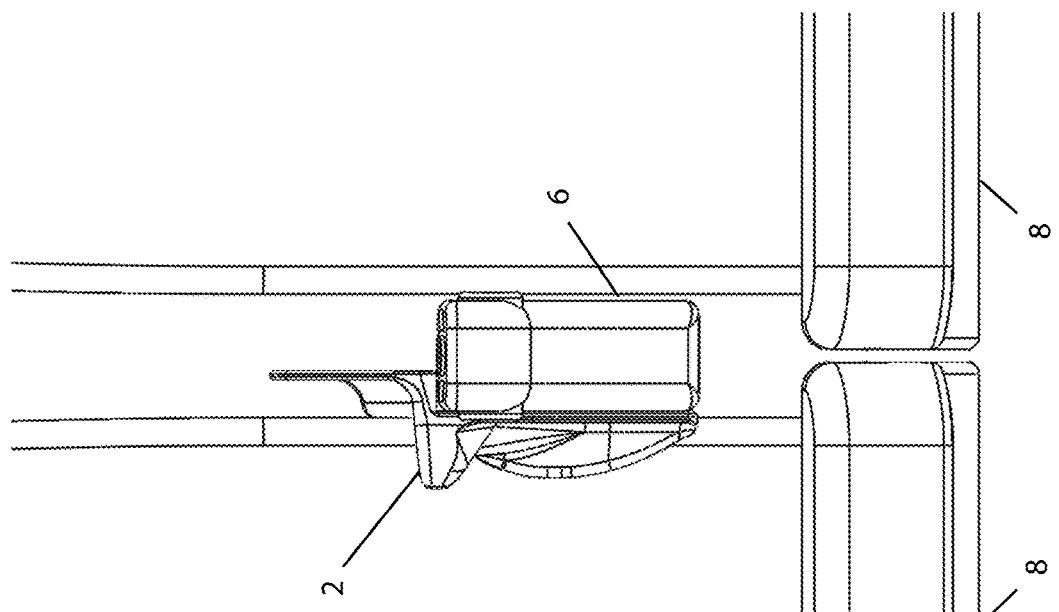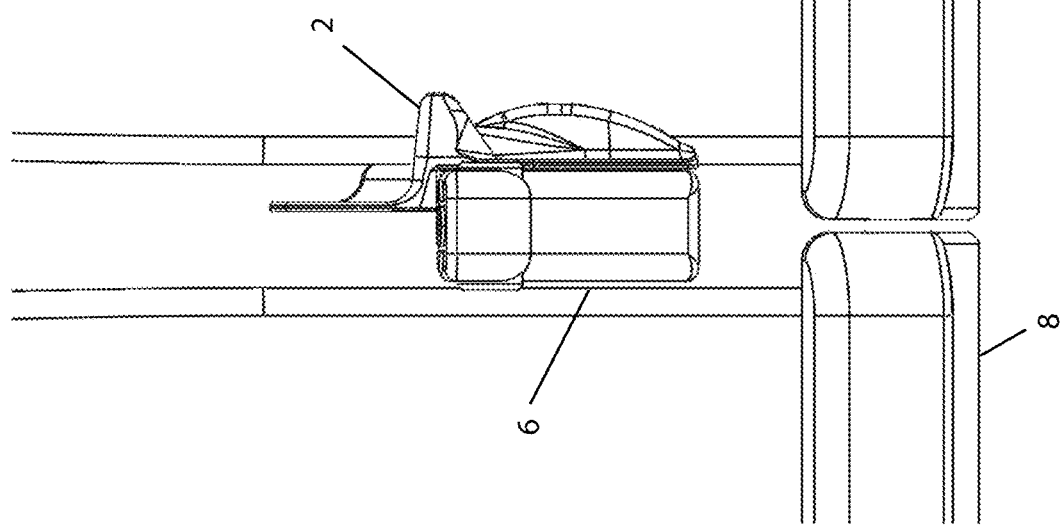
FIG. 13

PORTABLE ARMREST DIVIDER FOR USE ON AIRPLANES, TRAINS, BUSES AND OTHER FORMS OF PUBLIC TRANSPORTATION

CROSS-REFERENCE TO RELATED APPLICATIONS

This application is related to U.S. Provisional Patent Application Ser. No. 62/928,646, filed on Oct. 31, 2019, and titled "Portable Armrest Divider for Use on Airplanes, Trains, Buses and Other Forms of Public Transportation" and U.S. Provisional Patent Application Ser. No. 63/006,801, filed on Apr. 8, 2020, and titled "Portable Armrest Divider for Use on Airplanes, Trains, Buses and Other Forms of Public Transportation", the disclosure of each of which is hereby incorporated by reference and on which priority is hereby claimed.

BACKGROUND OF THE INVENTION

Field of the Invention

The present invention generally relates to seating on various forms of public transportation, such as airplanes, trains, buses and the like, and more specifically relates to devices which may be carried onto such forms of public transportation to increase a passenger's comfort, such as neck pillows and the like.

Description of the Related Art

Studies have shown that many airlines in an effort to increase passenger capacity have reduced both the passenger seat width and the pitch, especially for passengers traveling in economy class. More specifically, many airlines have decreased the seat width from 18 inches or more to 17 inches or less, in some instances, as tight as 15.9 inches, and a pitch of just 30 inches. This reduction in seat pitch and width not only causes discomfort to passengers, especially those occupying economy class seats, in leg room and "elbow room", but also results in conflict, animosity, resentment and competition between passengers sitting in adjacent seats as to who has the right to occupy and control the armrest between seats. Sharing the armrest between passengers is usually not feasible due to its inadequate width of two inches or less.

OBJECTS AND SUMMARY OF THE INVENTION

It is an object of the present invention to provide an armrest divider for use on airplanes, trains, buses and other forms of public transportation.

It is another object of the present invention to provide an armrest divider that is lightweight and portable and may be carried by a passenger onto an airplane, train, bus and the like and removably fitted on and supported by an armrest of the passenger's seat.

It is still another object of the present invention to provide a portable armrest divider that allows an armrest on an airplane, train, bus or the like to be shared by passengers seated in adjacent seats and preventing physical contact between passengers.

It is a further object of the present invention to provide an armrest divider that further helps to separate passengers physically who occupy adjacent seats on various forms of public transportation.

It is still a further object of the present invention to provide an armrest divider that divides a shared armrest between adjacently seated passengers in approximately equal proportions.

It is yet a further object of the present invention to provide an armrest divider that may be held in place between adjacent passenger seats even when one or both of the seats are in a reclined or upright position.

It is still another object of the present invention to provide an armrest divider for use by passengers on airplanes, trains, buses and other forms of public transportation which, when in use, does not cause discomfort to the user passenger or to his fellow passenger sitting adjacent to him.

It is yet another object of the present invention to provide an armrest divider for use on various forms of public transportation (e.g., airplanes, trains, busses and the like) which, when in use, does not interfere with a passenger's seatbelt or those of adjacent passengers.

In accordance with one form of the present invention, an armrest divider is preferably formed as a one piece, lightweight, portable device that may be carried on an airplane, train, bus and other forms of public transportation by a passenger, set up on the passenger's armrest and removed when the passenger is departing the airplane, train or bus. Additionally, the armrest divider of the present invention is small enough to fit into a passenger's carry-on luggage, or carried with him onto the airplane, train or bus.

In one form of the present invention, the armrest divider of the present invention includes a planar main body which acts as a vertical divider or barrier between adjacent passengers when the armrest divider is in use, an arm supporting ledge that extends perpendicularly outwardly from one side of the planar main body, the bottom side of which is adapted to rest on and be supported by an existing armrest of the passenger's seat, and a locking wedge section that may be inserted between and held in place by the passenger's backrest and armrest of the passenger's seat. Furthermore, the armrest divider of the present invention may include a stop member preferably formed as an outwardly extending protrusion from one side of the planar main body to limit the distance the locking wedge section may be inserted between an armrest and the passenger's seat backrest.

These and other objects, features and advantages of the present invention will be apparent from the following detailed description of illustrative embodiments thereof, which is to be read in connection with the accompanying drawings.

BRIEF DESCRIPTION OF THE DRAWINGS

FIG. 13 is a front elevational view of a pair of armrest dividers of the present invention shown mounted on the armrests of a passenger's seat.

DETAILED DESCRIPTION OF THE PREFERRED EMBODIMENTS

Figure 1:
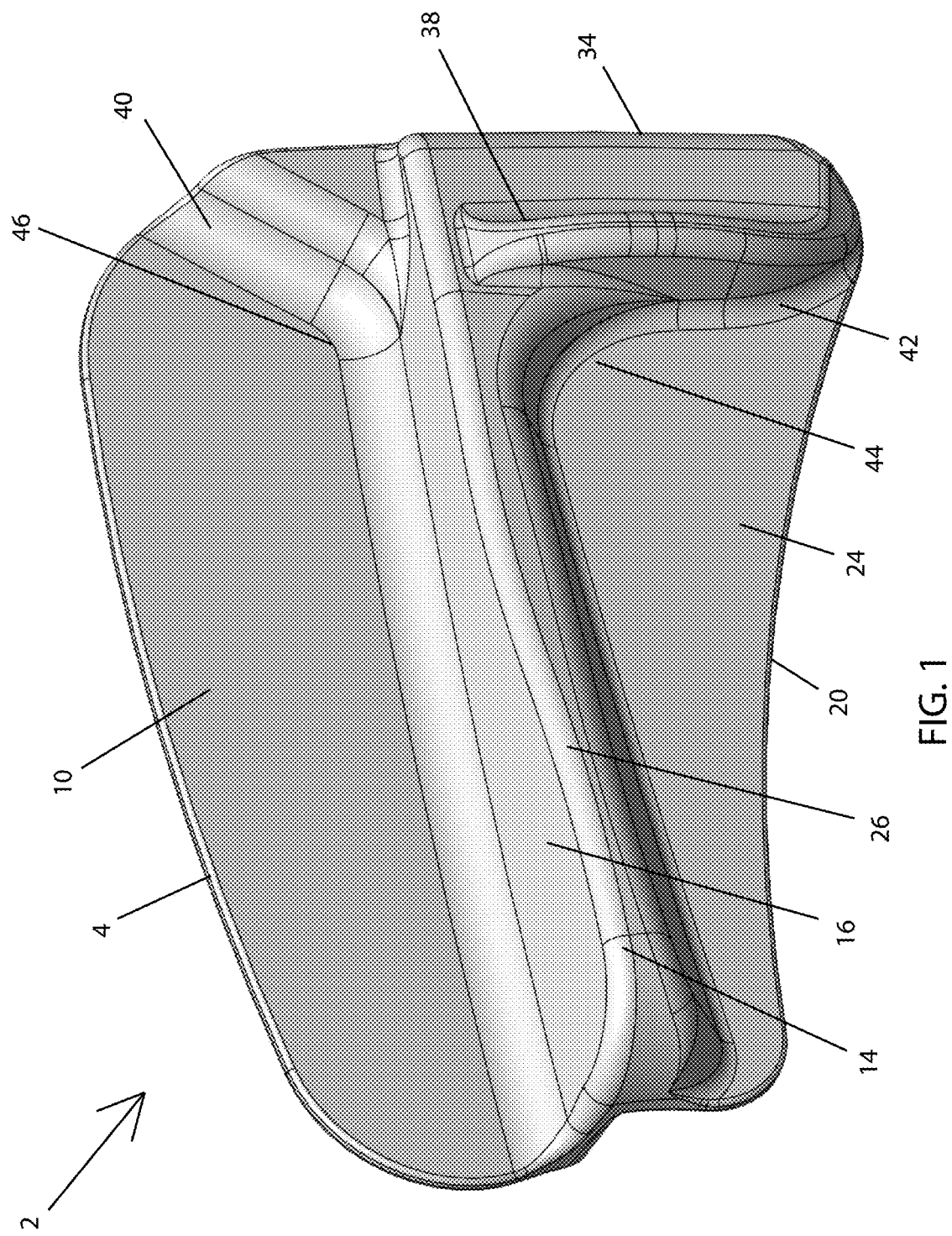
FIG. 1 is a perspective view of a first lateral side of an armrest divider formed in accordance with a first embodiment of the present invention.
Figure 1A:
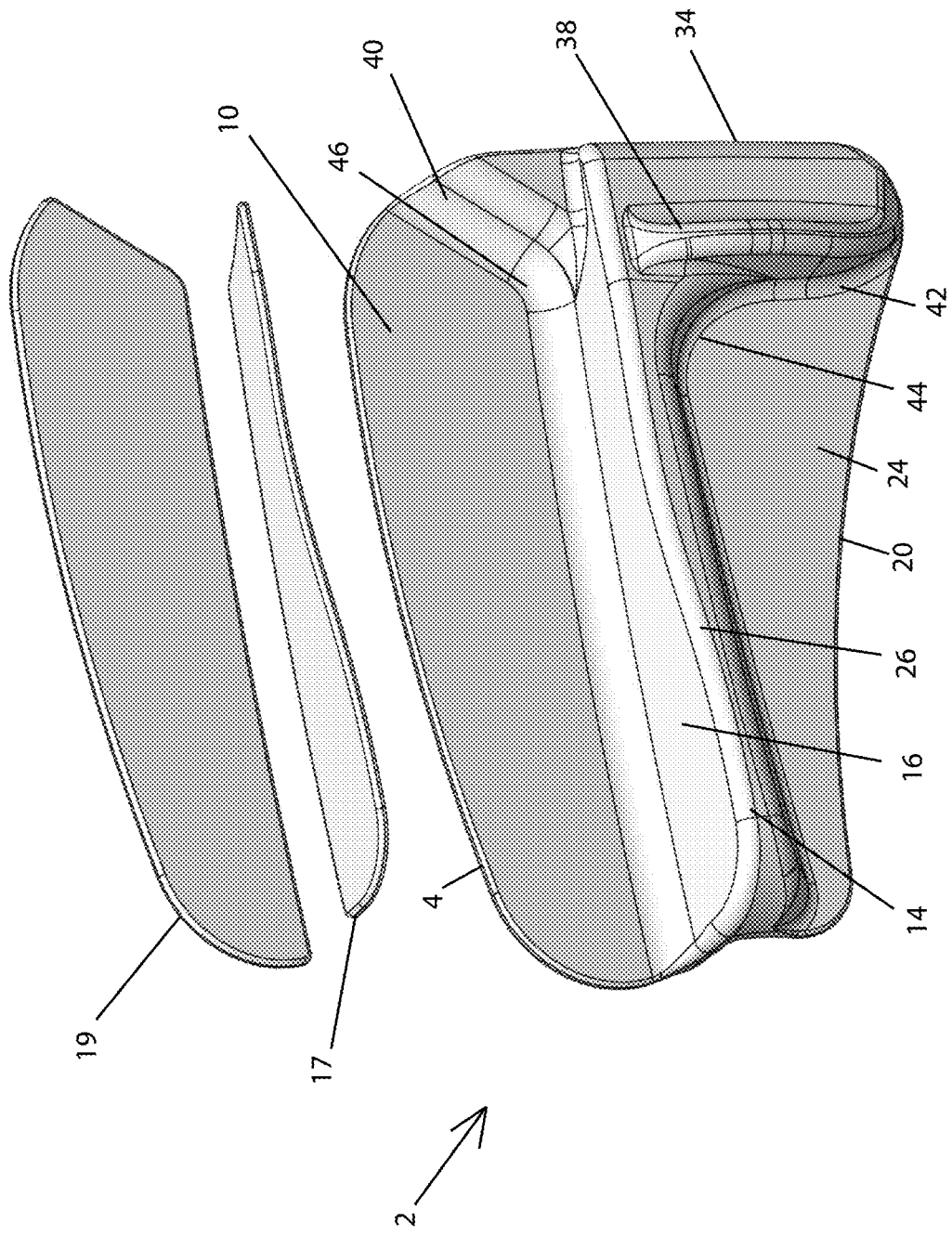
FIG. 1A is an exploded perspective view of the armrest divider of the present invention, and illustrating cushioning material which may be included with the armrest divider to provide more comfort to the user thereof.
Figure 2:
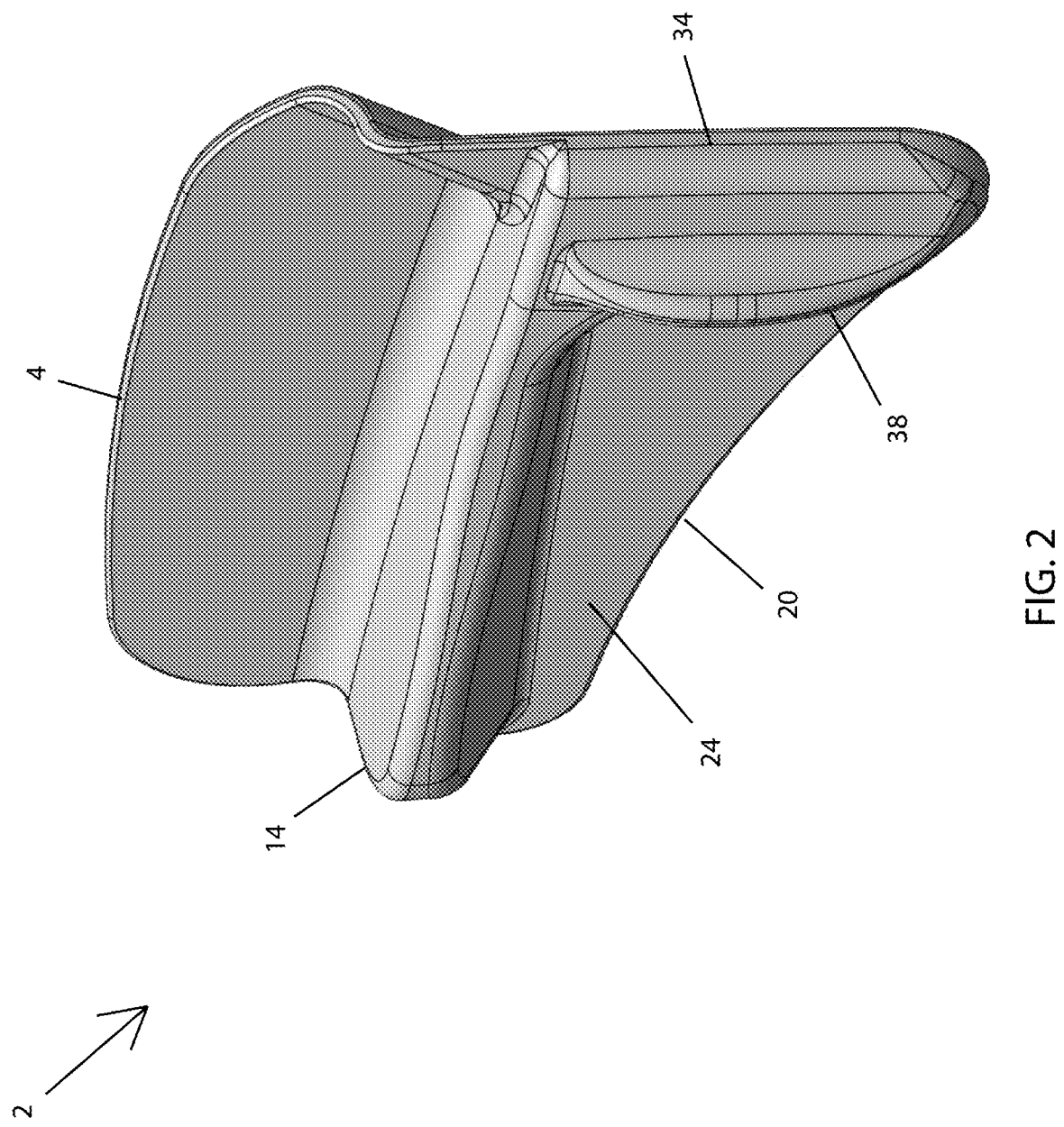
FIG. 2 is still another side perspective view, taken from a different angle than the view of FIG. 1, of the first lateral side of the armrest divider of the present invention.
Figure 3:
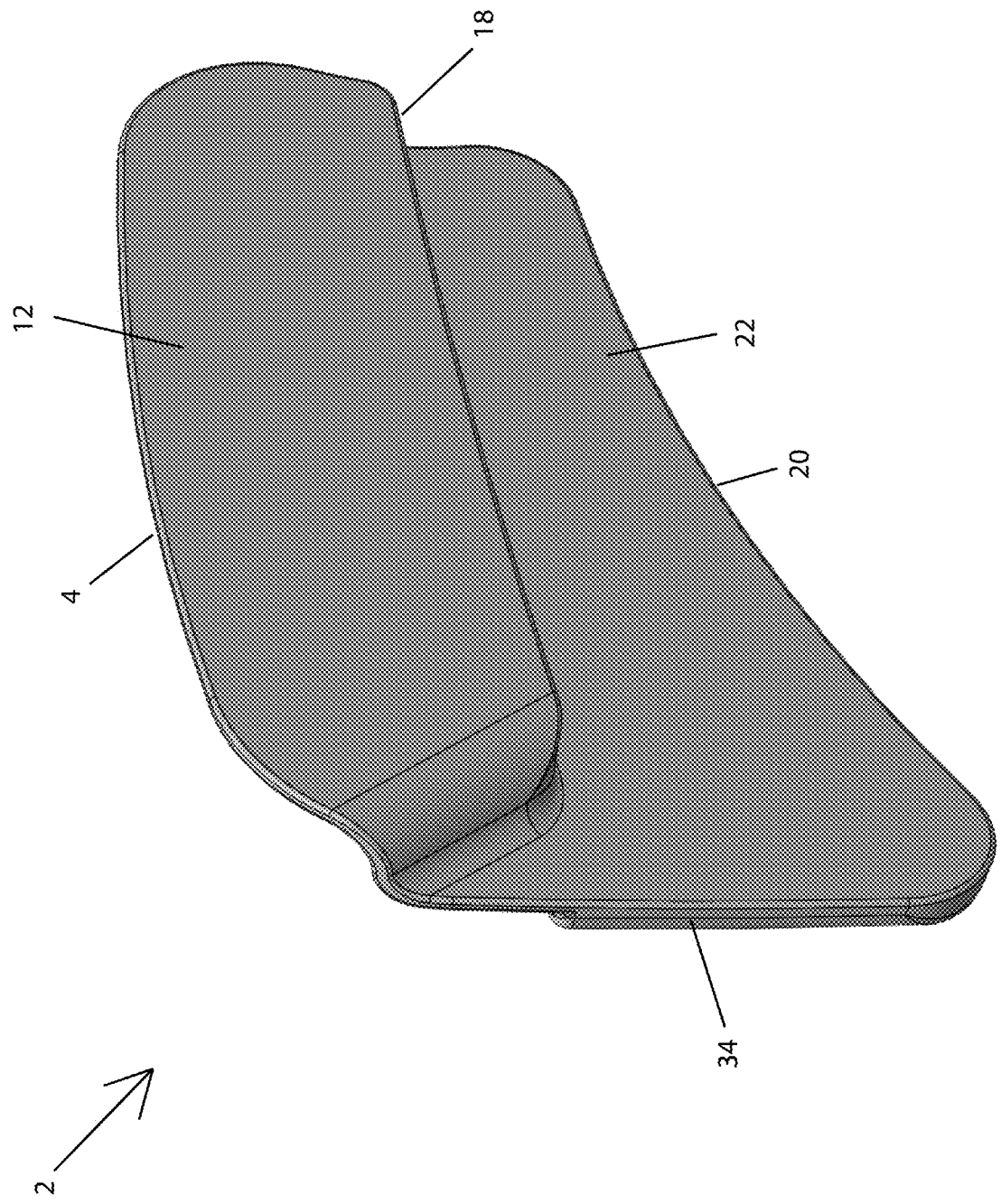
FIG. 3 is a perspective view of a second lateral side of the armrest divider of the present invention, the second lateral side being situated opposite the first lateral side.
Figure 4:
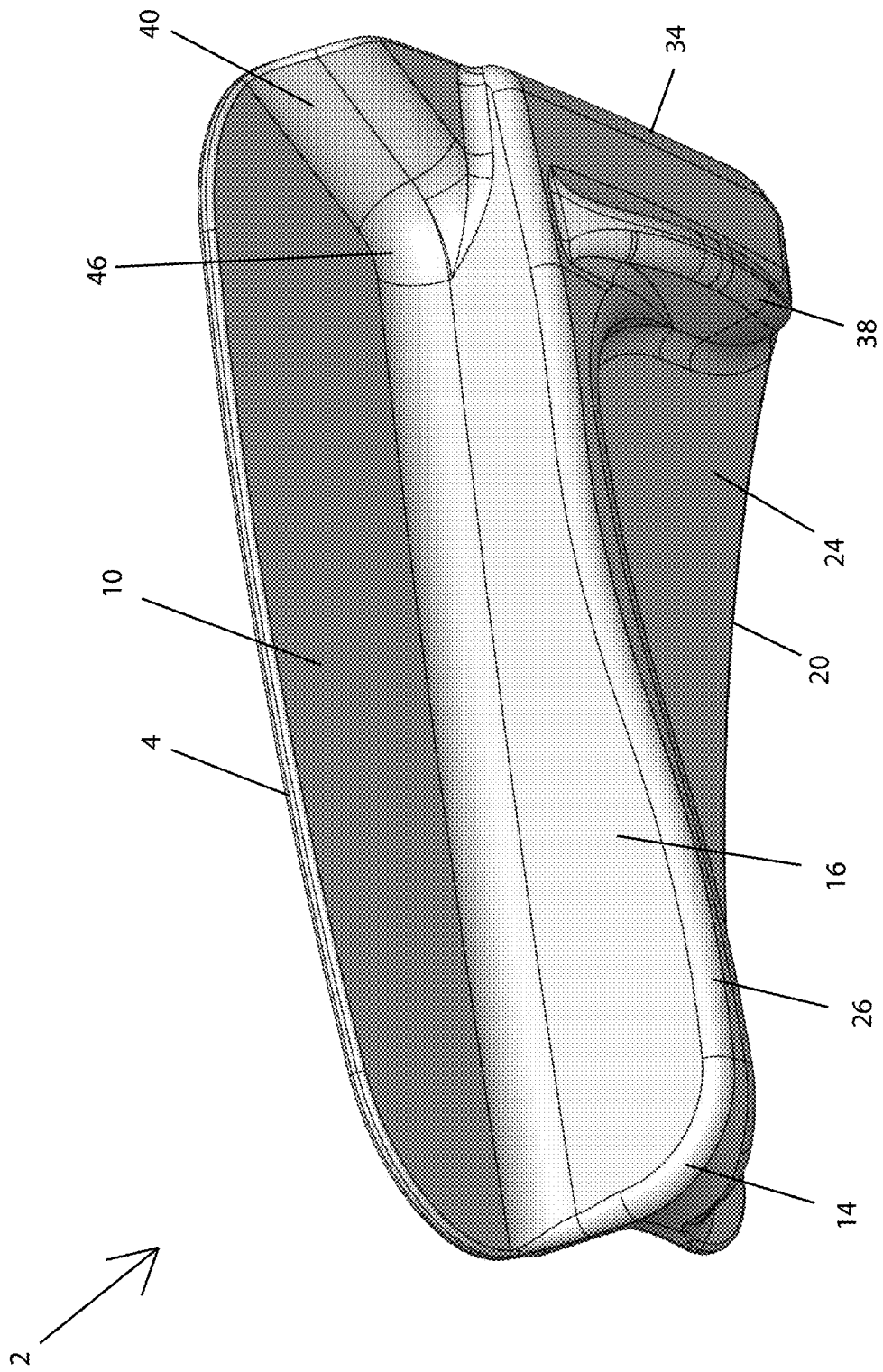
FIG. 4 is a top perspective view of the armrest divider of the present invention.
Figure 5:
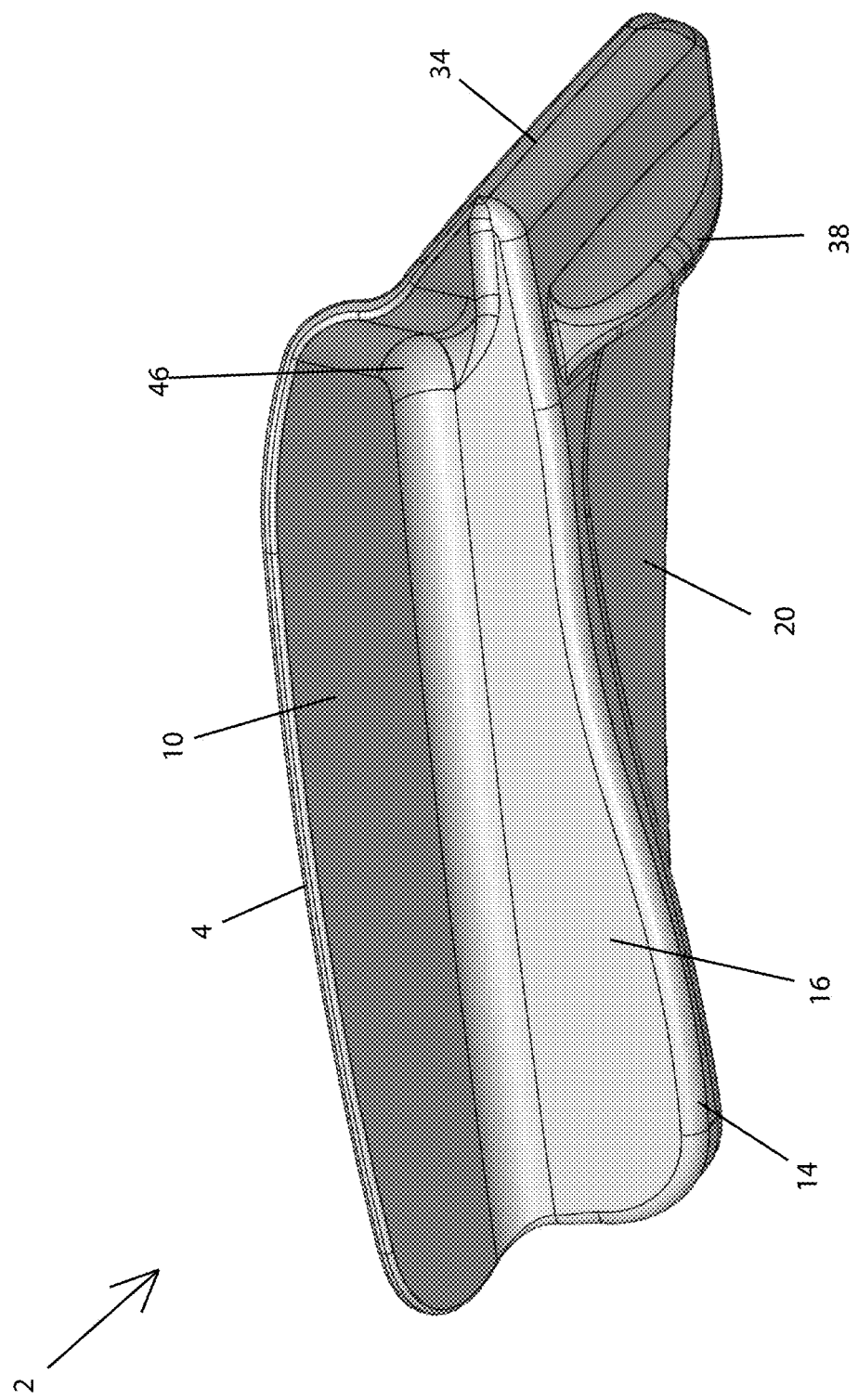
FIG. 5 is another top perspective view of the armrest divider of the present invention.
Figure 6:
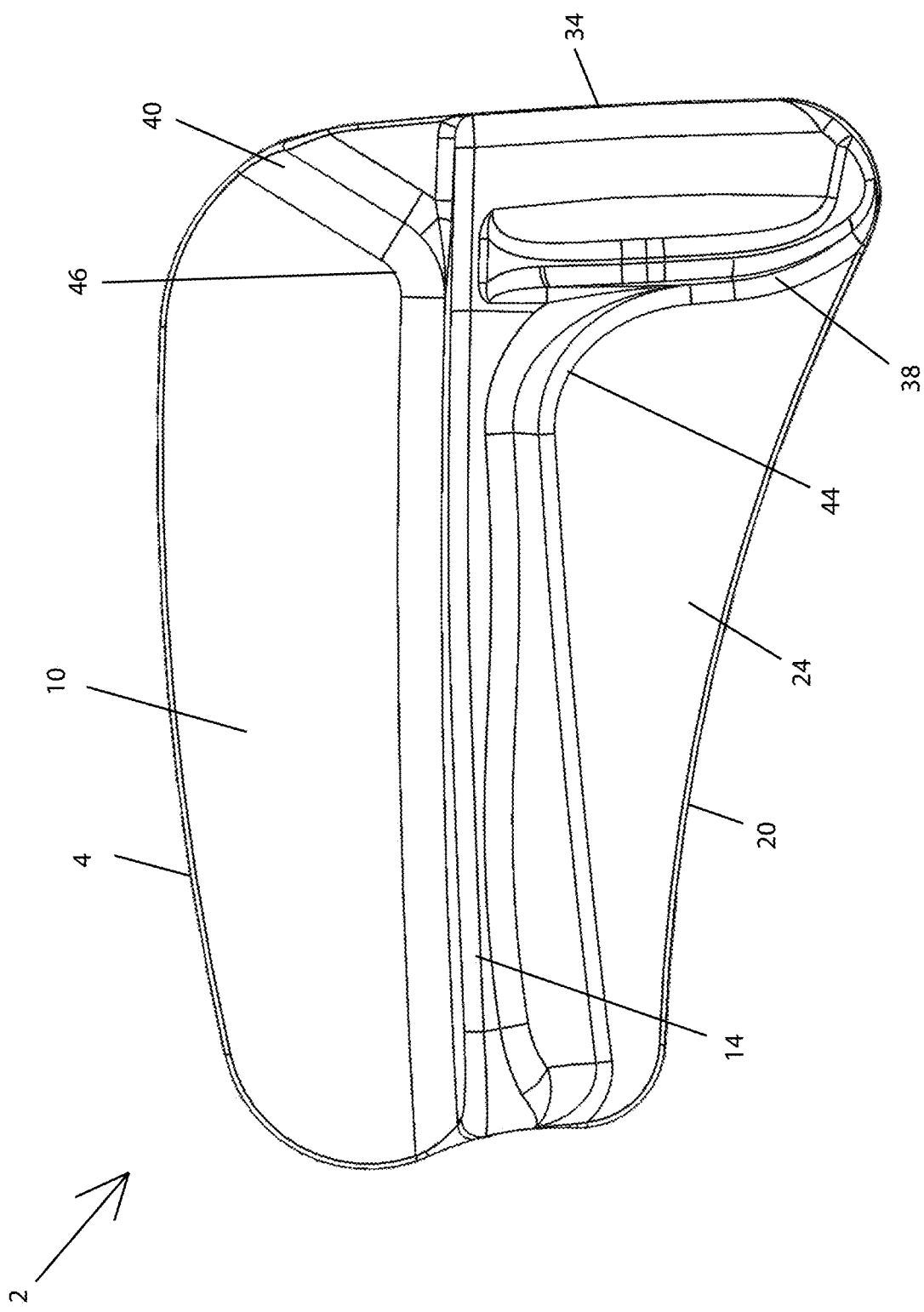
FIG. 6 is an elevational view of the first lateral side of the armrest divider of the present invention.
Figure 7:
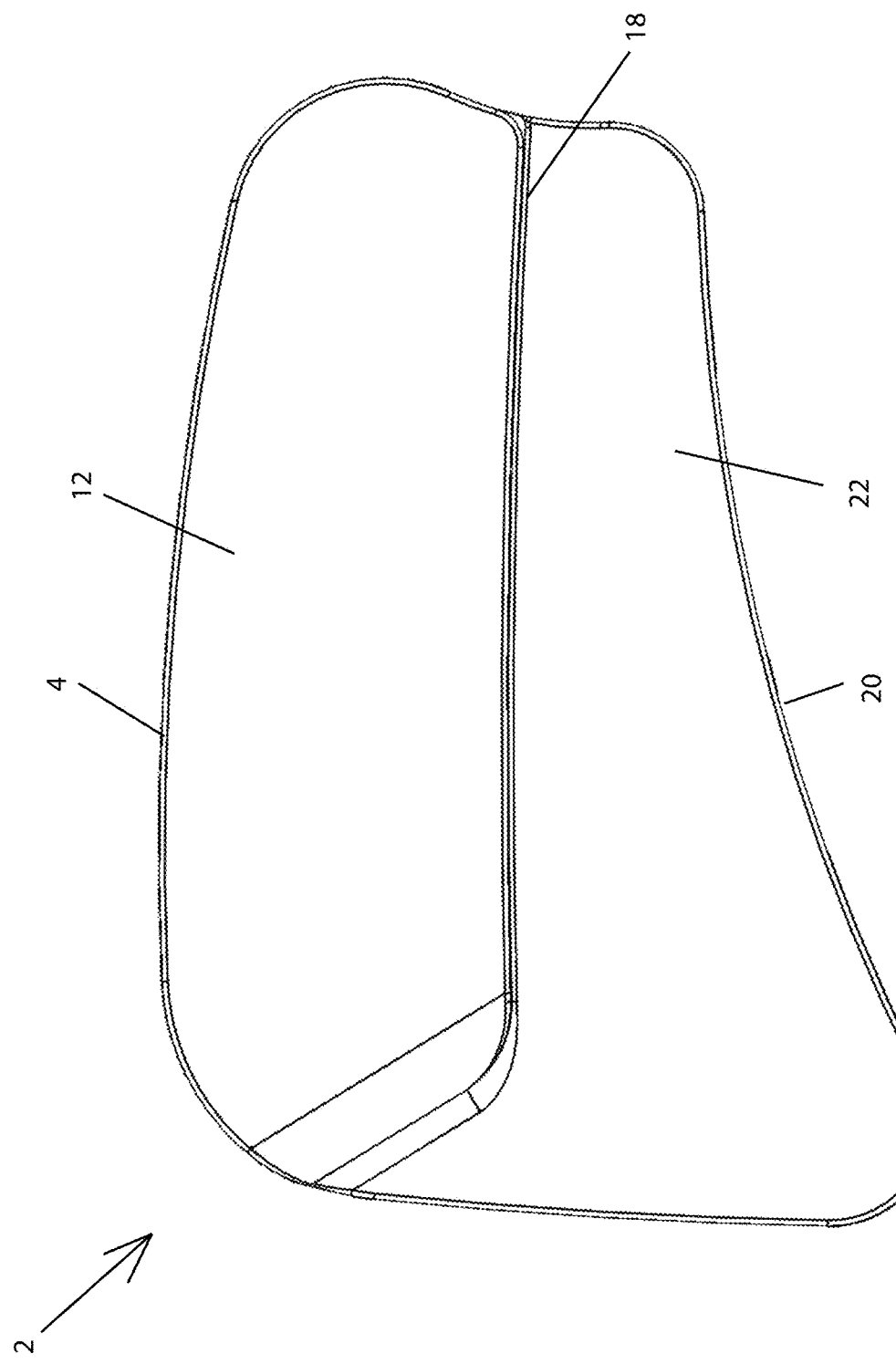
FIG. 7 is an elevational view of the second lateral side of the armrest divider of the present invention.
Figure 8:
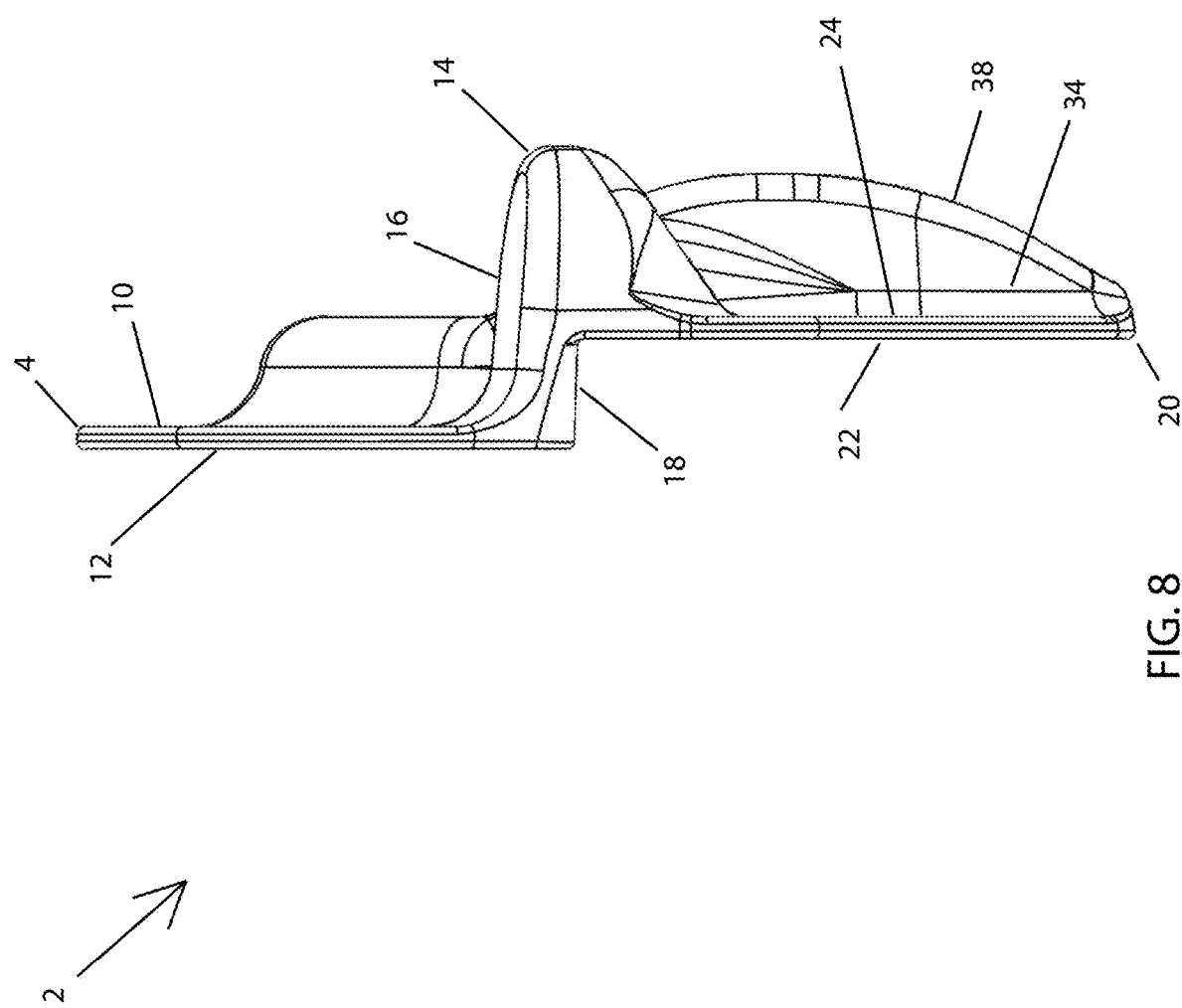
FIG. 8 is a rear elevational view of the armrest divider of the present invention.
Figure 9:
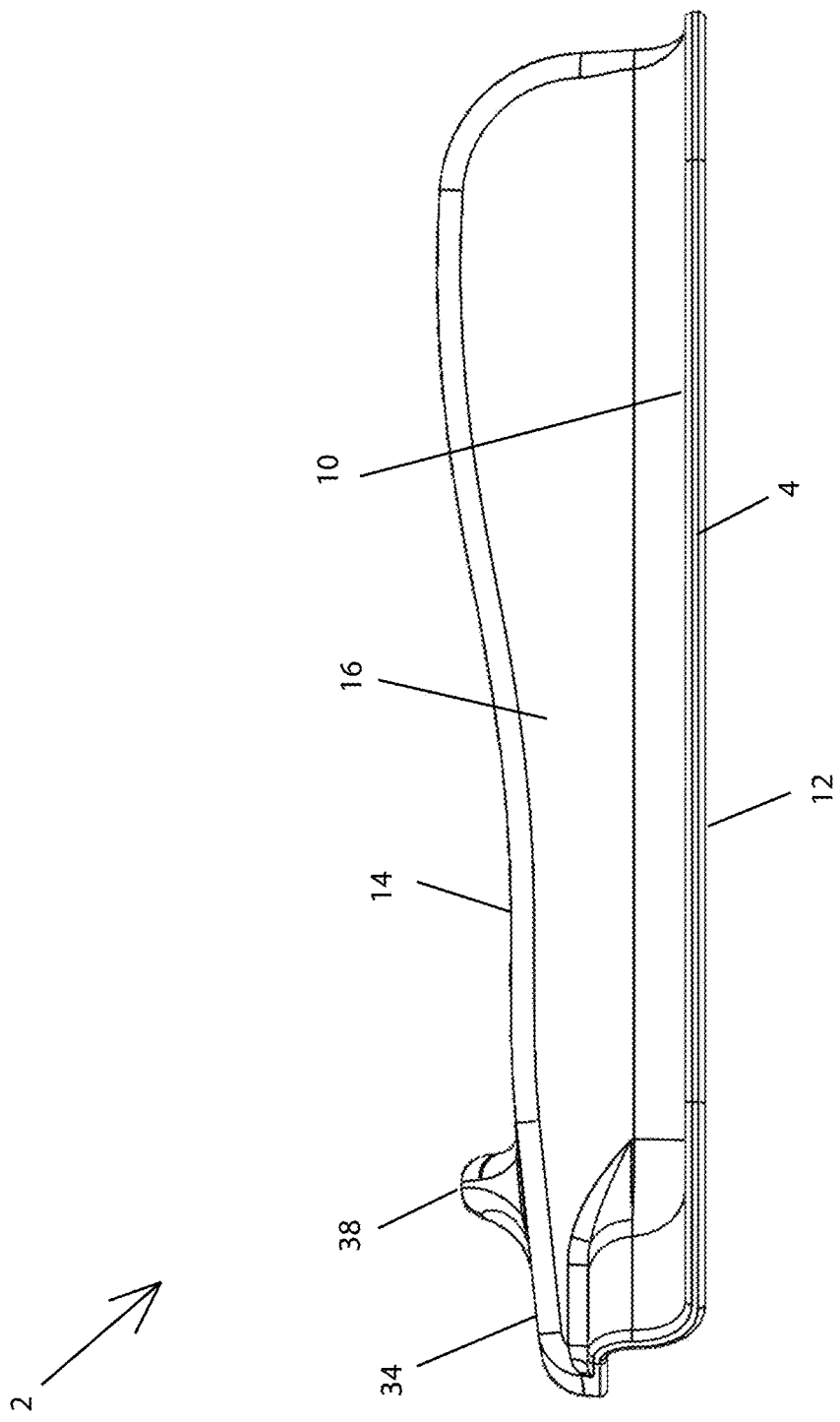
FIG. 9 is a top plan view of the armrest divider of the present invention.
Figure 10:
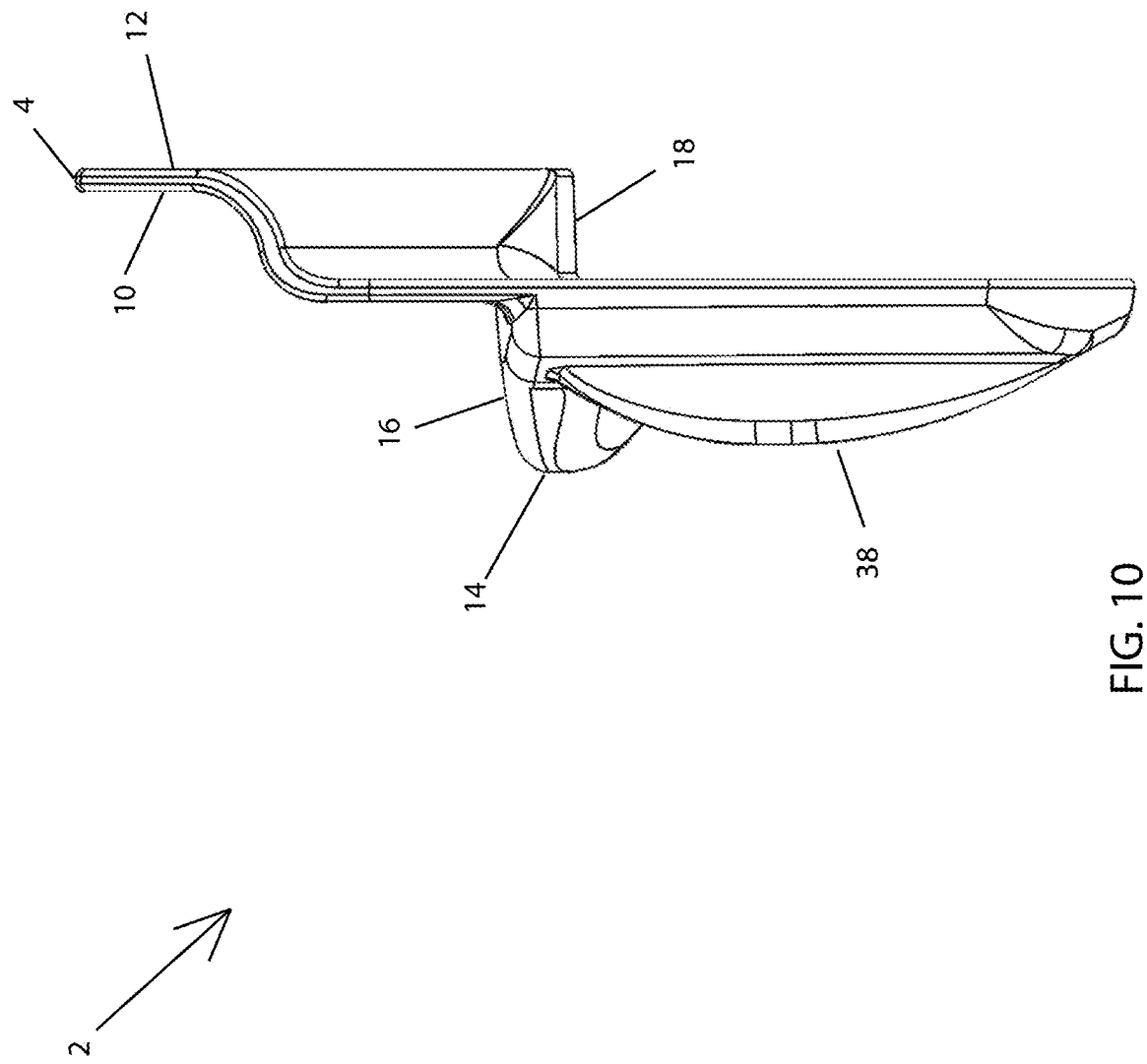
FIG. 10 is a front elevational view of the armrest divider of the present invention.
Figure 11:
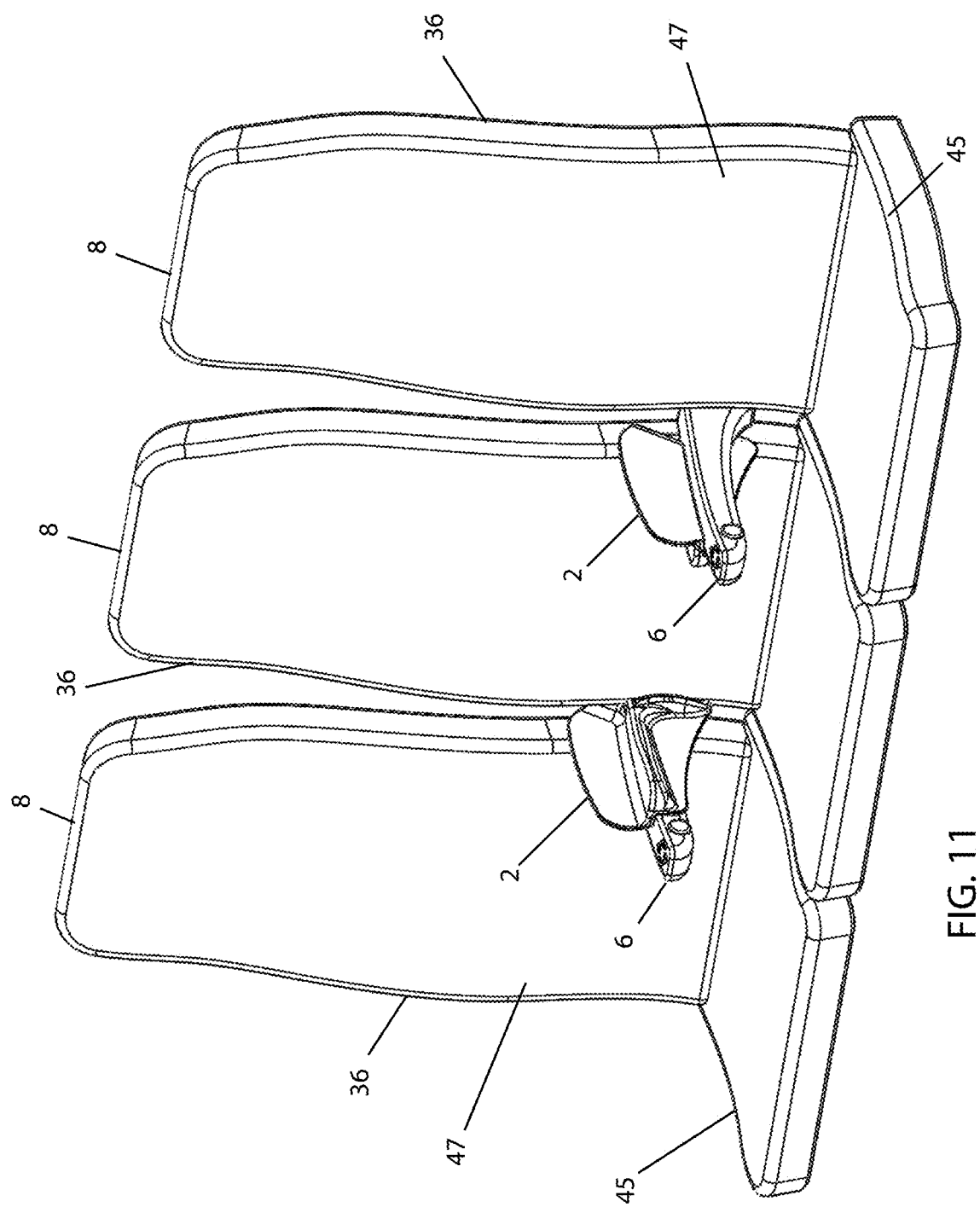
FIG. 11 is a perspective view of a pair of armrest dividers of the present invention shown mounted on the armrests of a passenger's seat.
Figure 12:
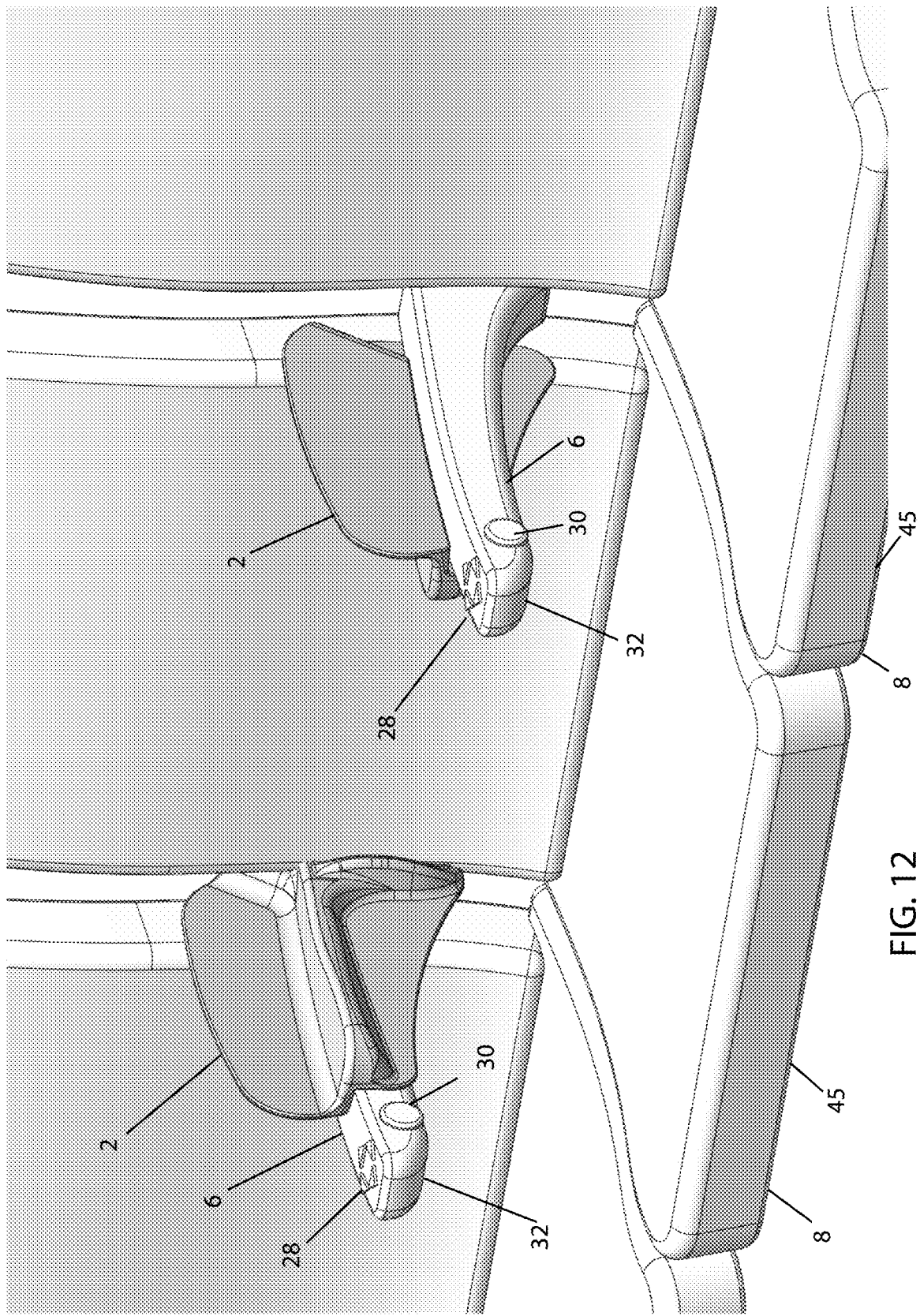
FIG. 12 is another perspective view of a pair of armrest dividers of the present invention shown mounted on the armrests of a passenger's seat.
Figure 14:
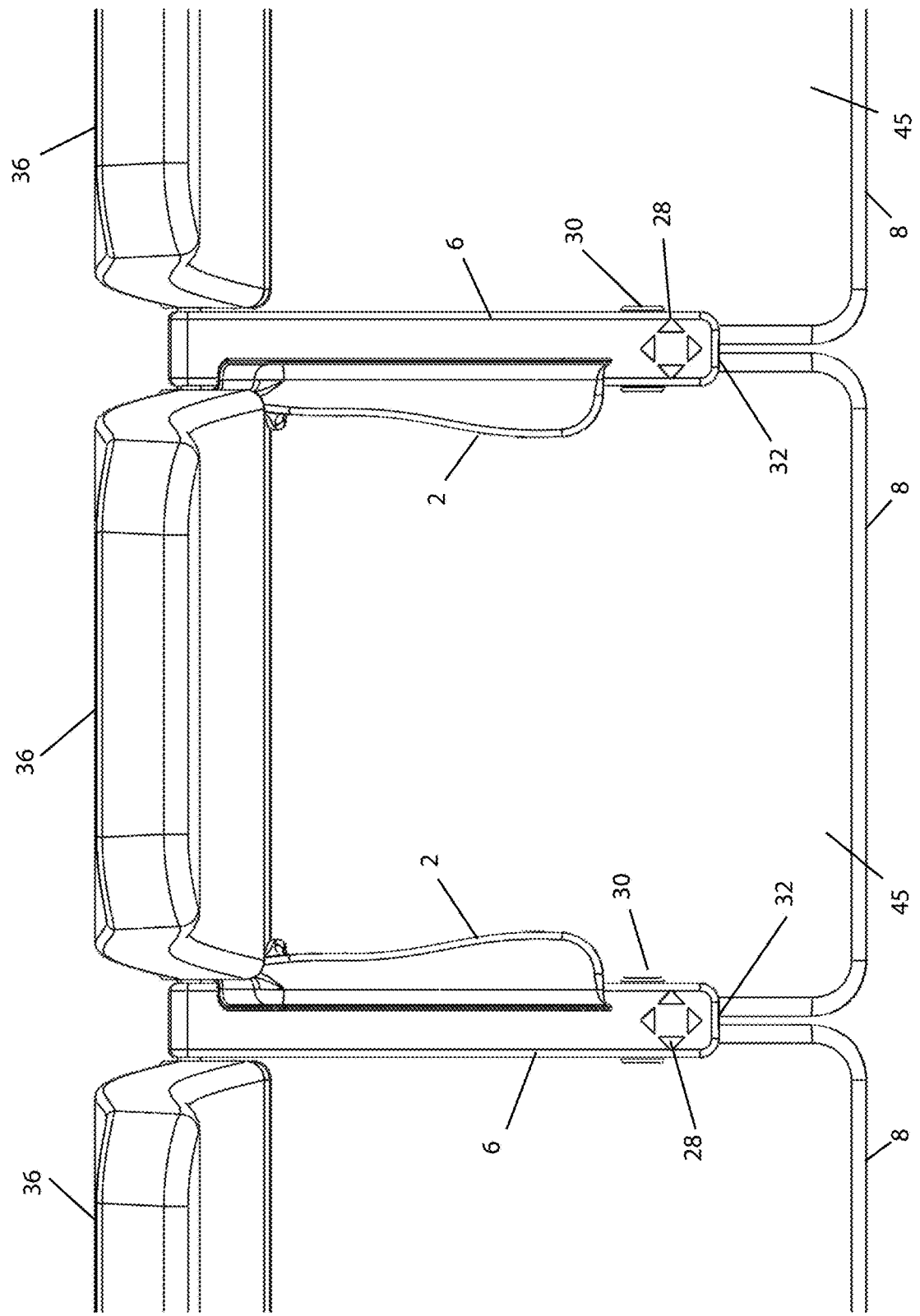
FIG. 14 is a top plan view of a pair of armrest dividers of the present invention shown mounted on the armrests of a passenger's seat.
Figure 15:
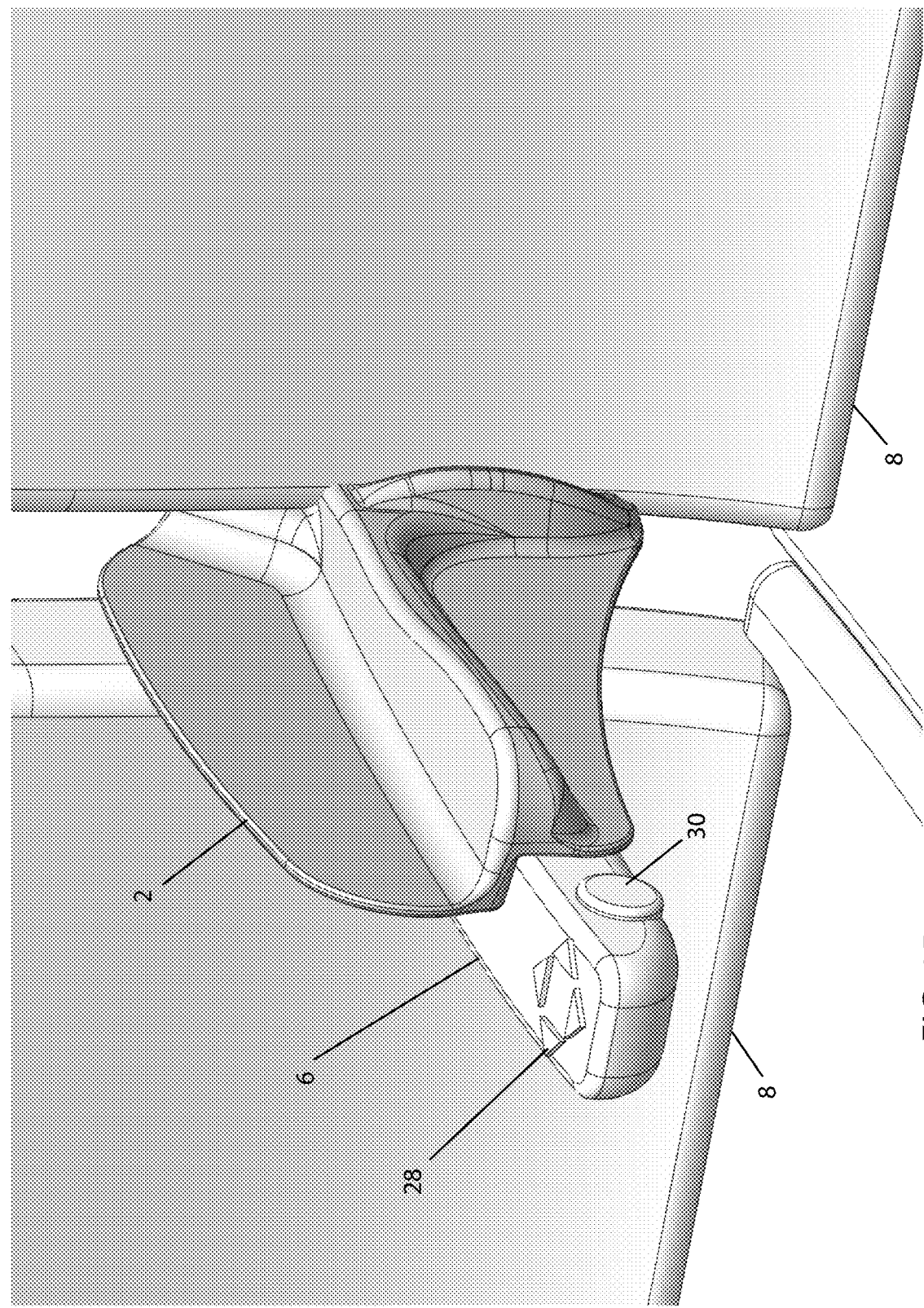
FIG. 15 is a perspective view of an armrest divider of the present invention shown mounted on the armrest of a passenger's seat.
Figure 16:
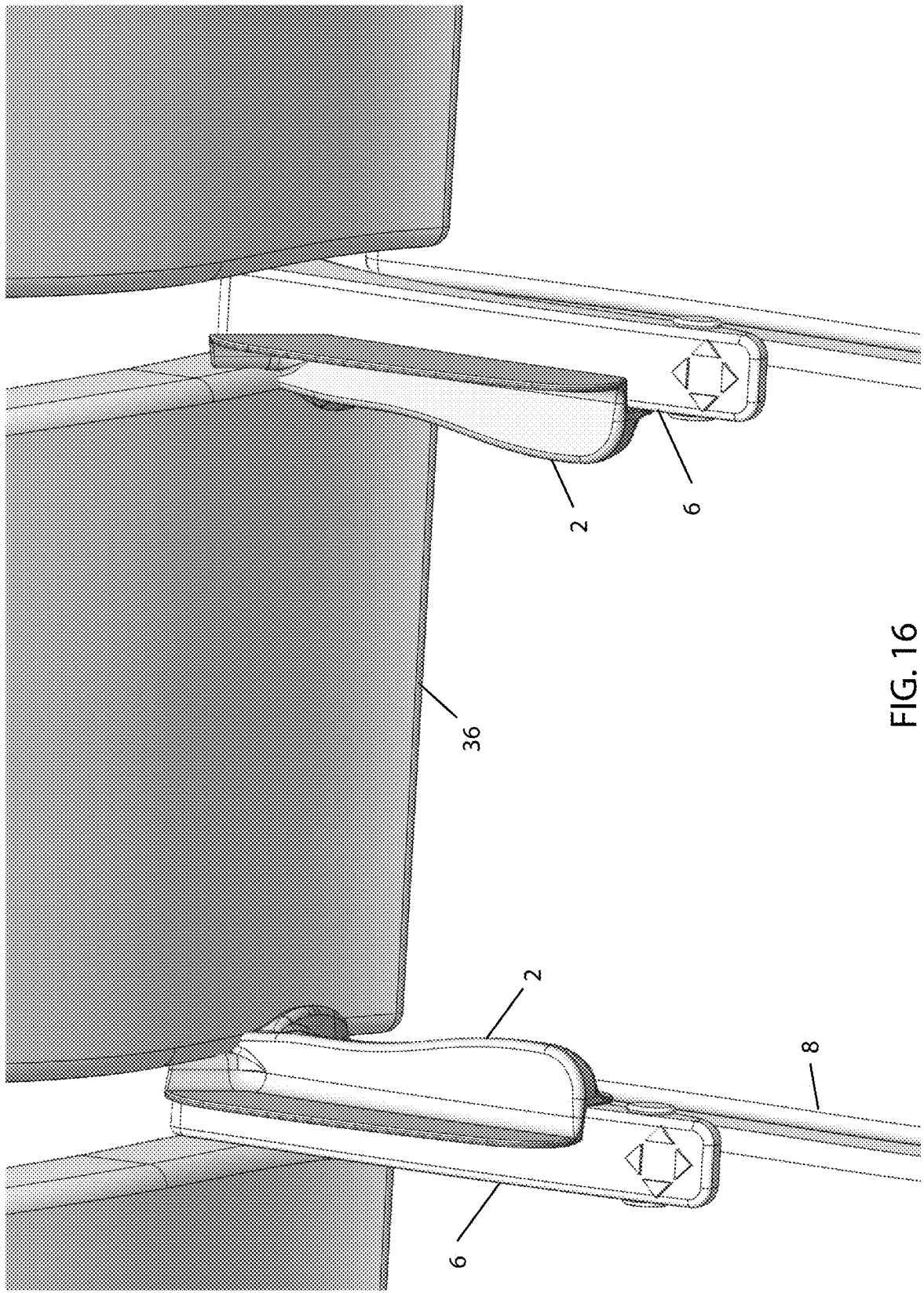
FIG. 16 is another perspective view of a pair of armrest dividers of the present invention shown mounted on the armrests of a passenger's seat.
Figure 17:
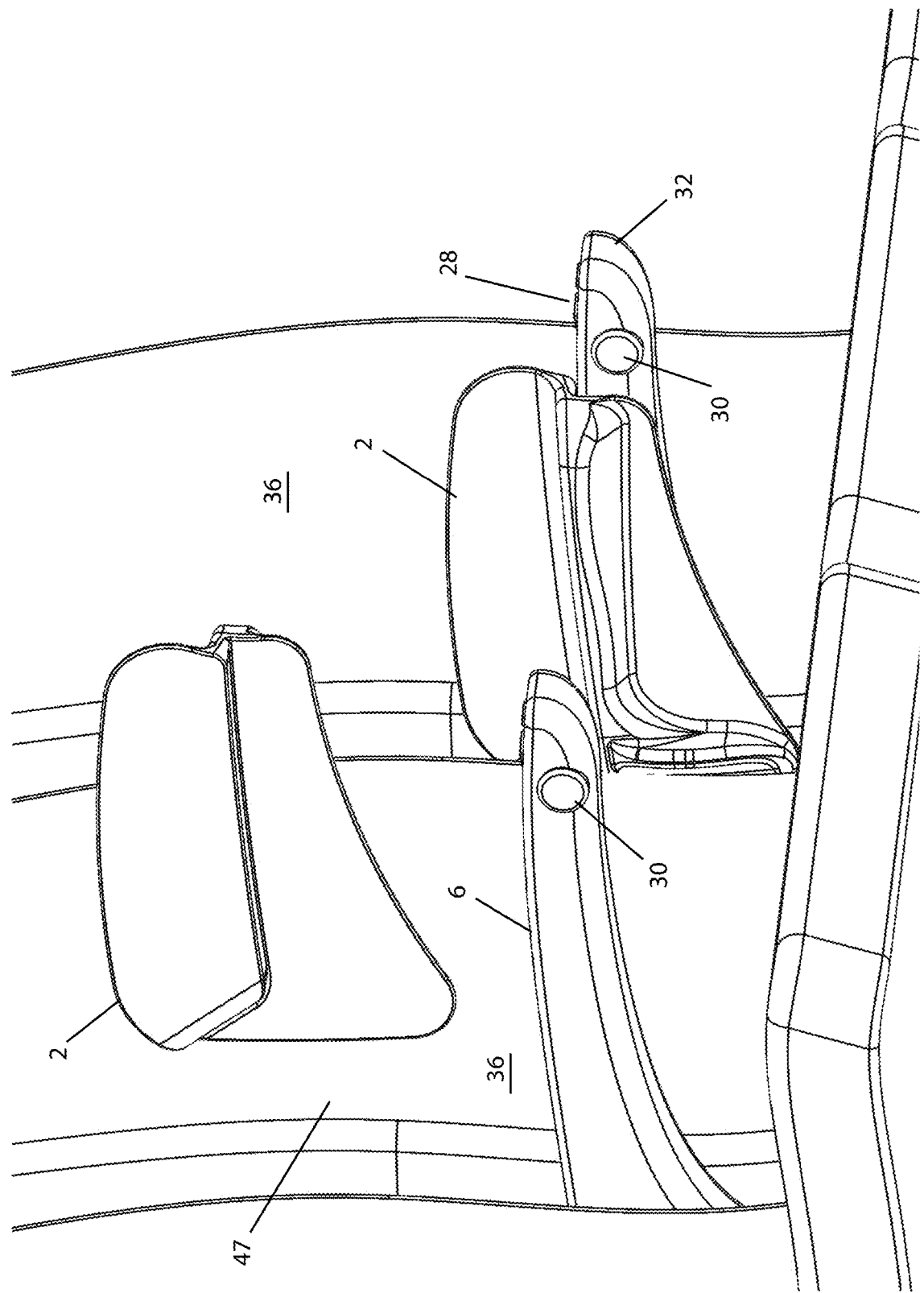
FIG. 17 is a side perspective view of a pair of armrest dividers of the present invention and illustrating how the armrest dividers are mounted on the armrests of a passenger's seat.
Figure 18:
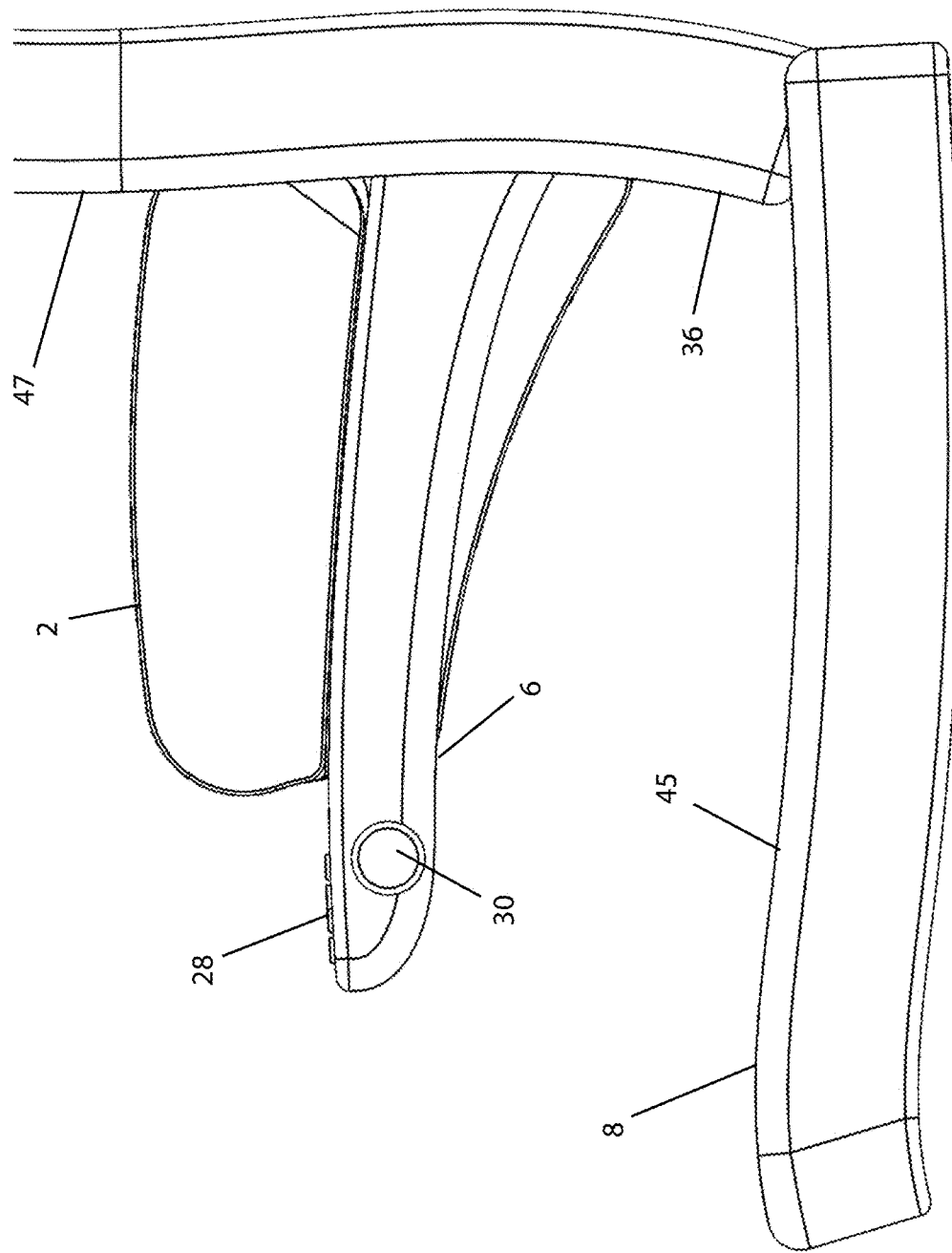
FIG. 18 is a first lateral side elevational view of the armrest divider of the present invention shown mounted on the armrest of a passenger's seat.
Figure 19:
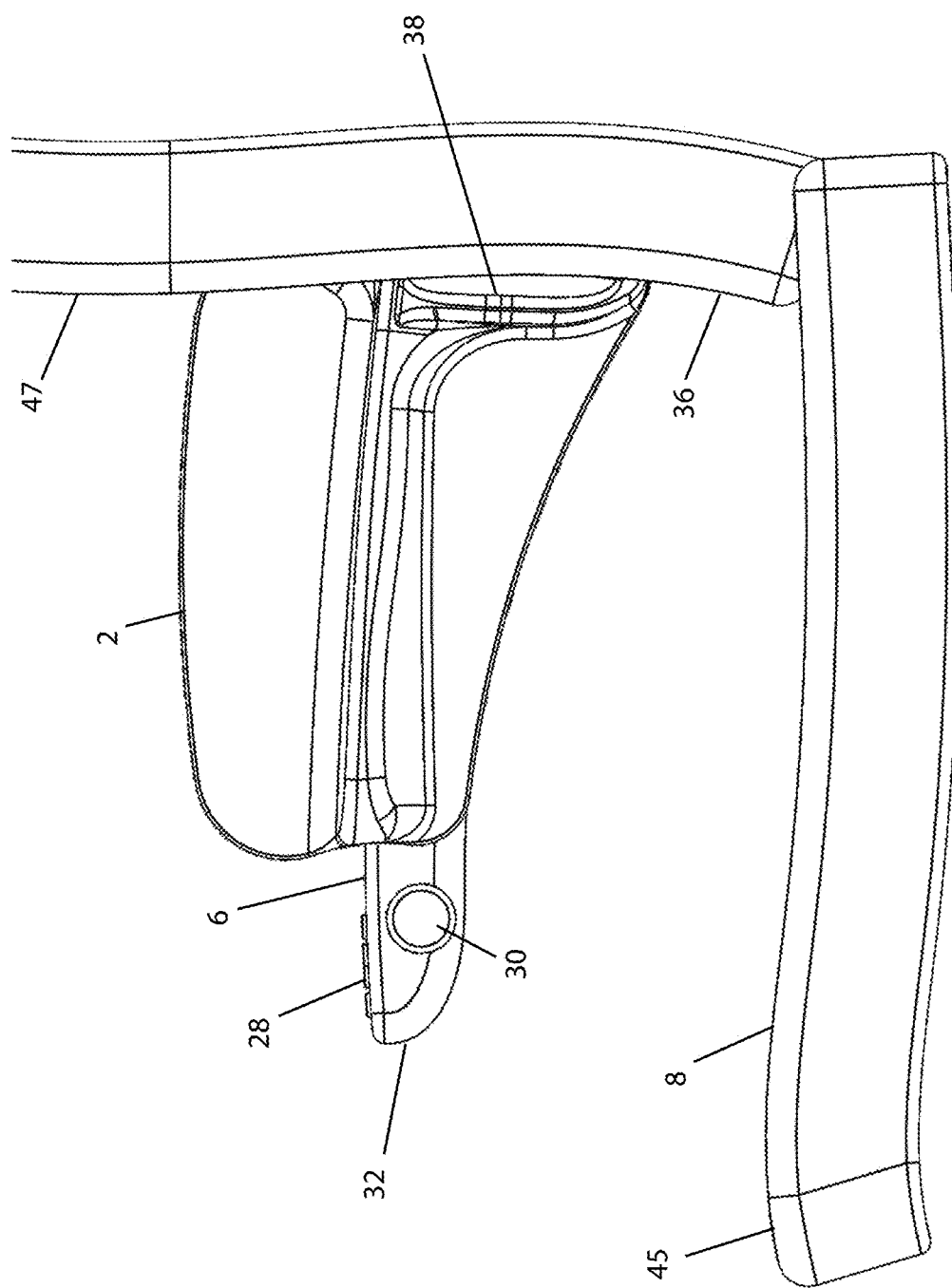
FIG. 19 is an opposite, second lateral side elevational view of the armrest divider of the present invention shown mounted on the armrest of a passenger's seat.
Figure 20:
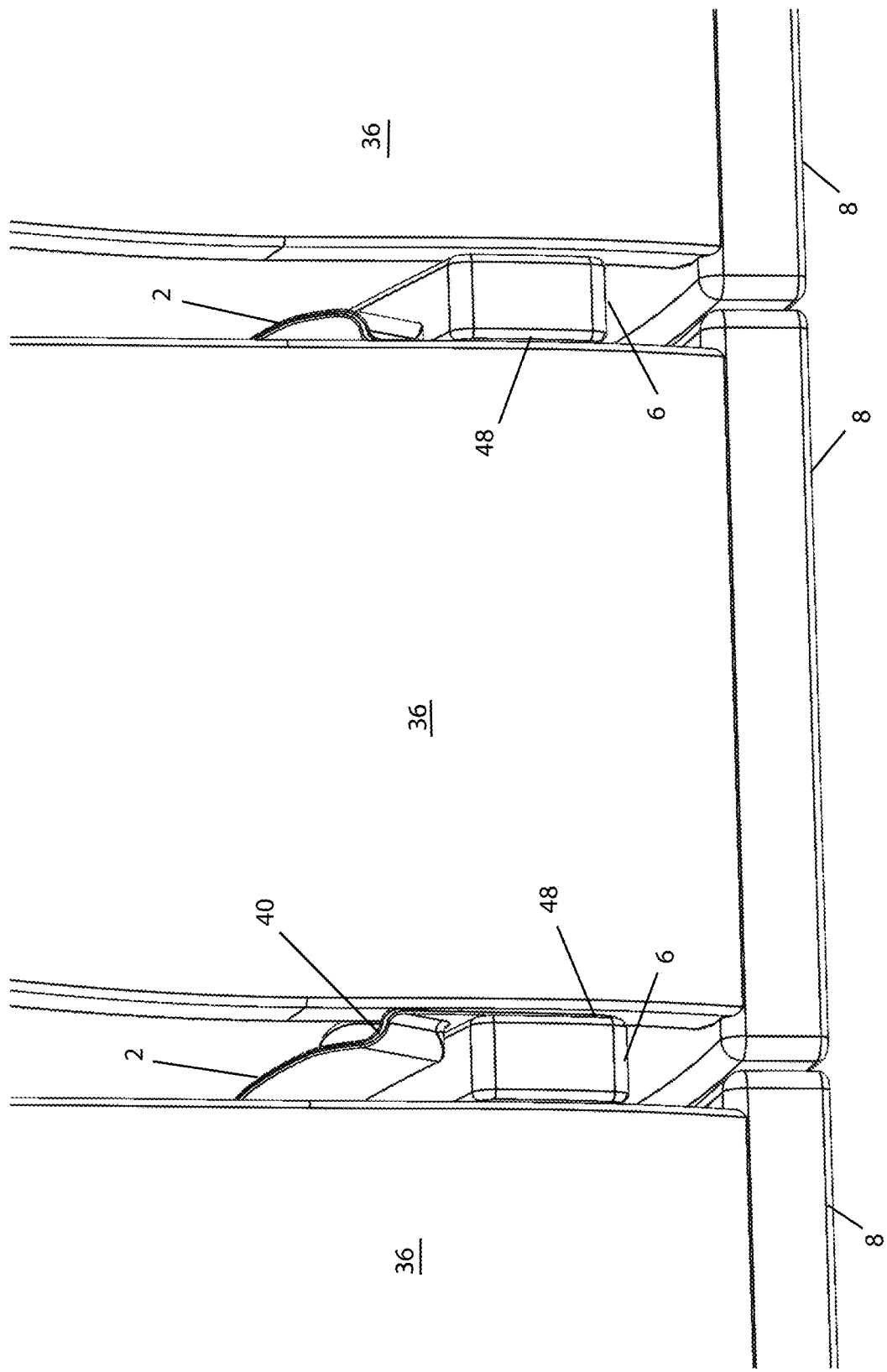
FIG. 20 is a rear perspective view of a passenger's seat and illustrating a pair of armrest dividers of the present invention mounted on the armrests of the passenger's seat.
Figure 21:
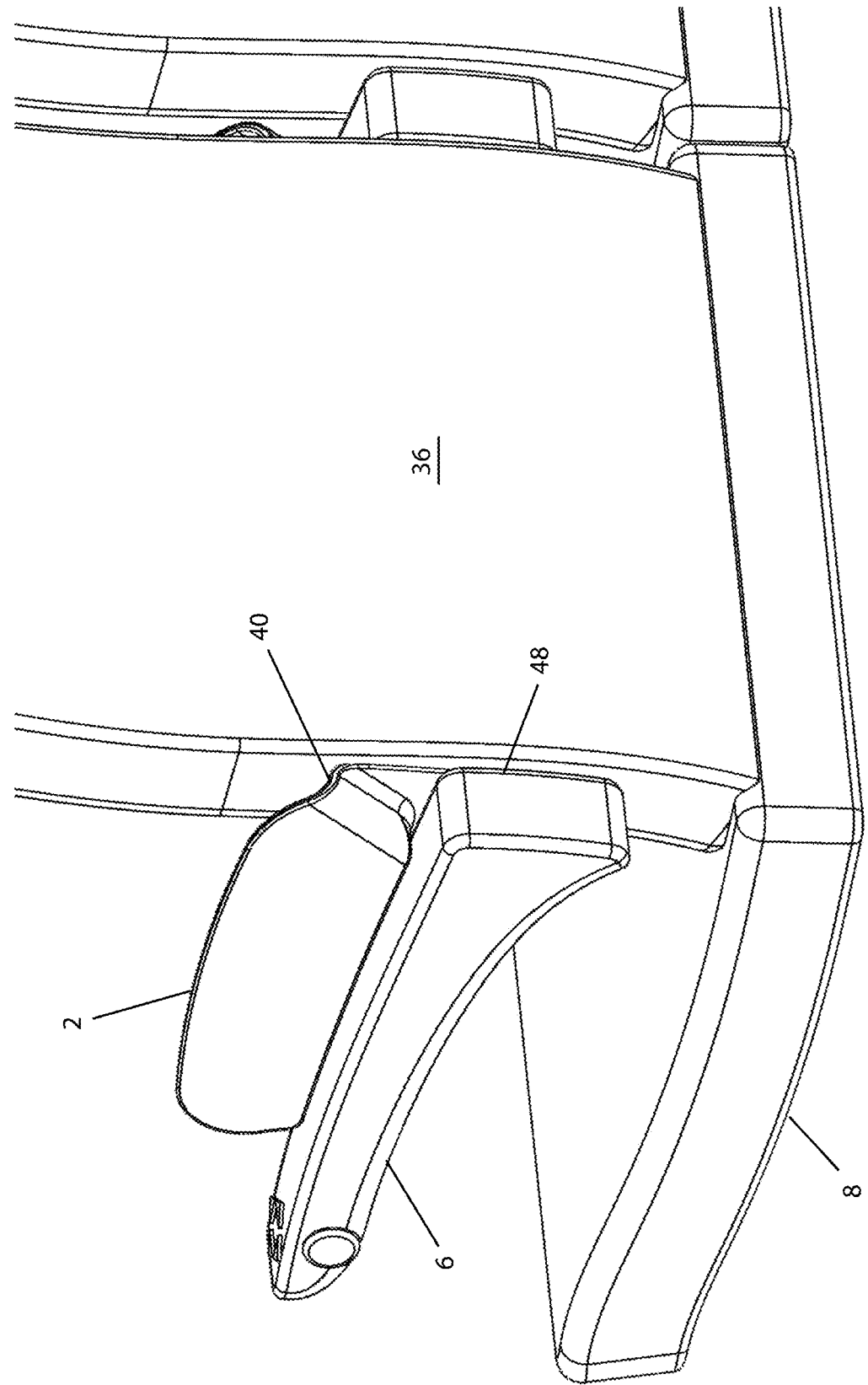
FIG. 21 is a rear perspective view of a passenger's seat and the armrest divider of the present invention shown mounted on the armrest of the passenger's seat.
Figure 22:
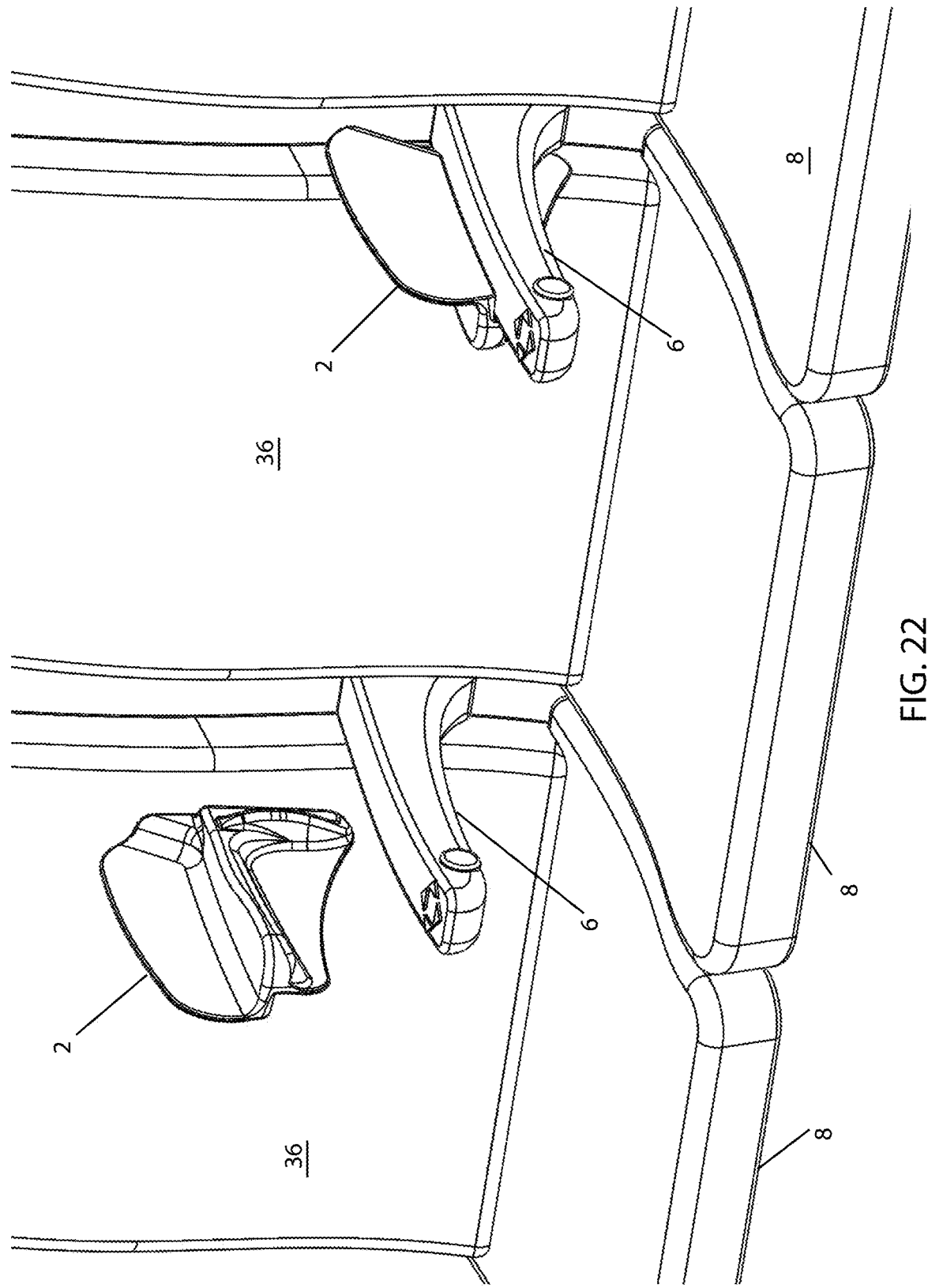
FIG. 22 is a front perspective view of a pair of armrest dividers of the present invention and illustrating how the armrest dividers are mounted on the armrests of a passenger's seat.
Figure 23:
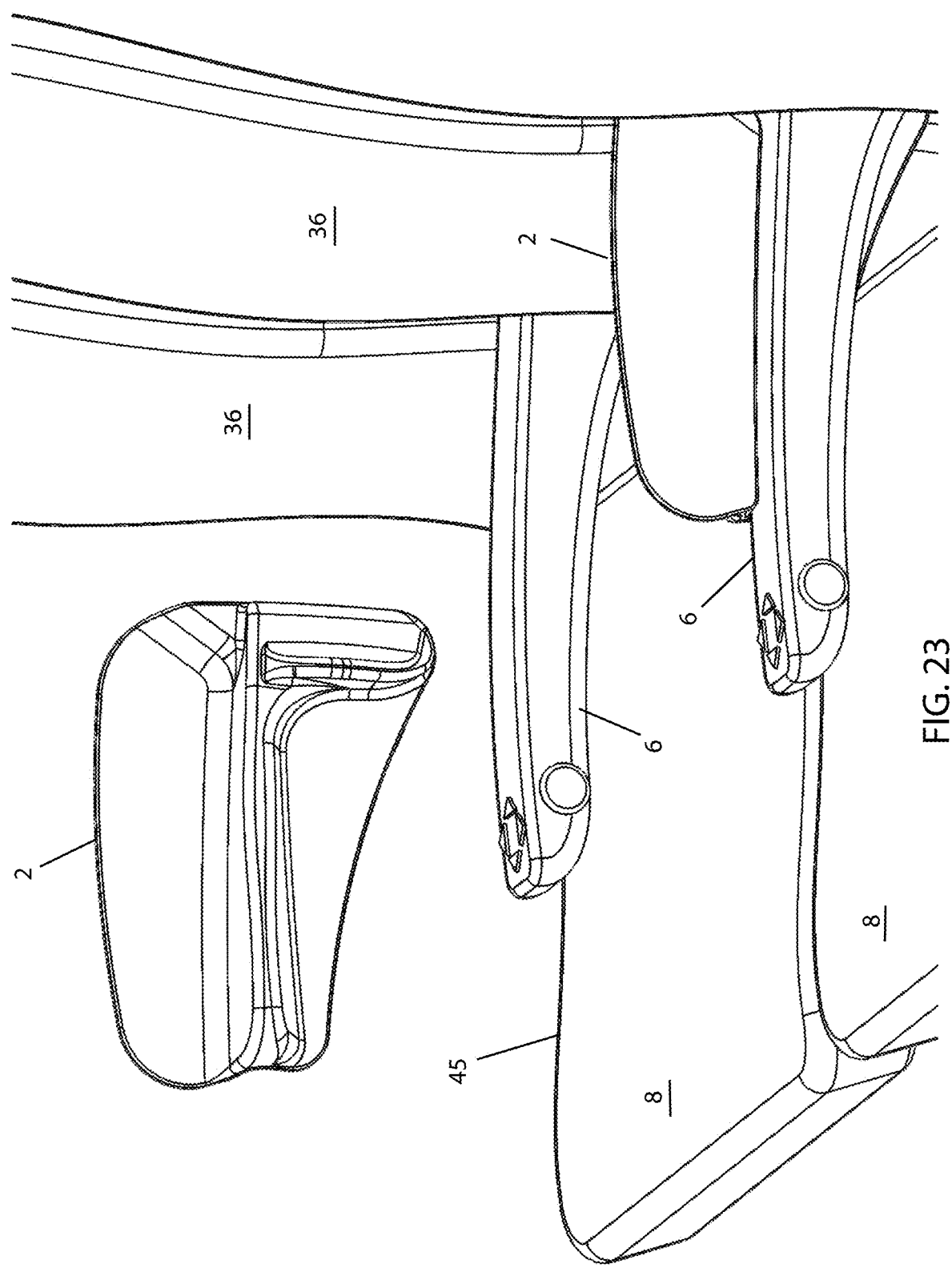
FIG. 23 is a side perspective view of a pair of armrest dividers of the present invention and illustrating how the armrest dividers are mounted on the armrests of a passenger's seat.
Figure 24:
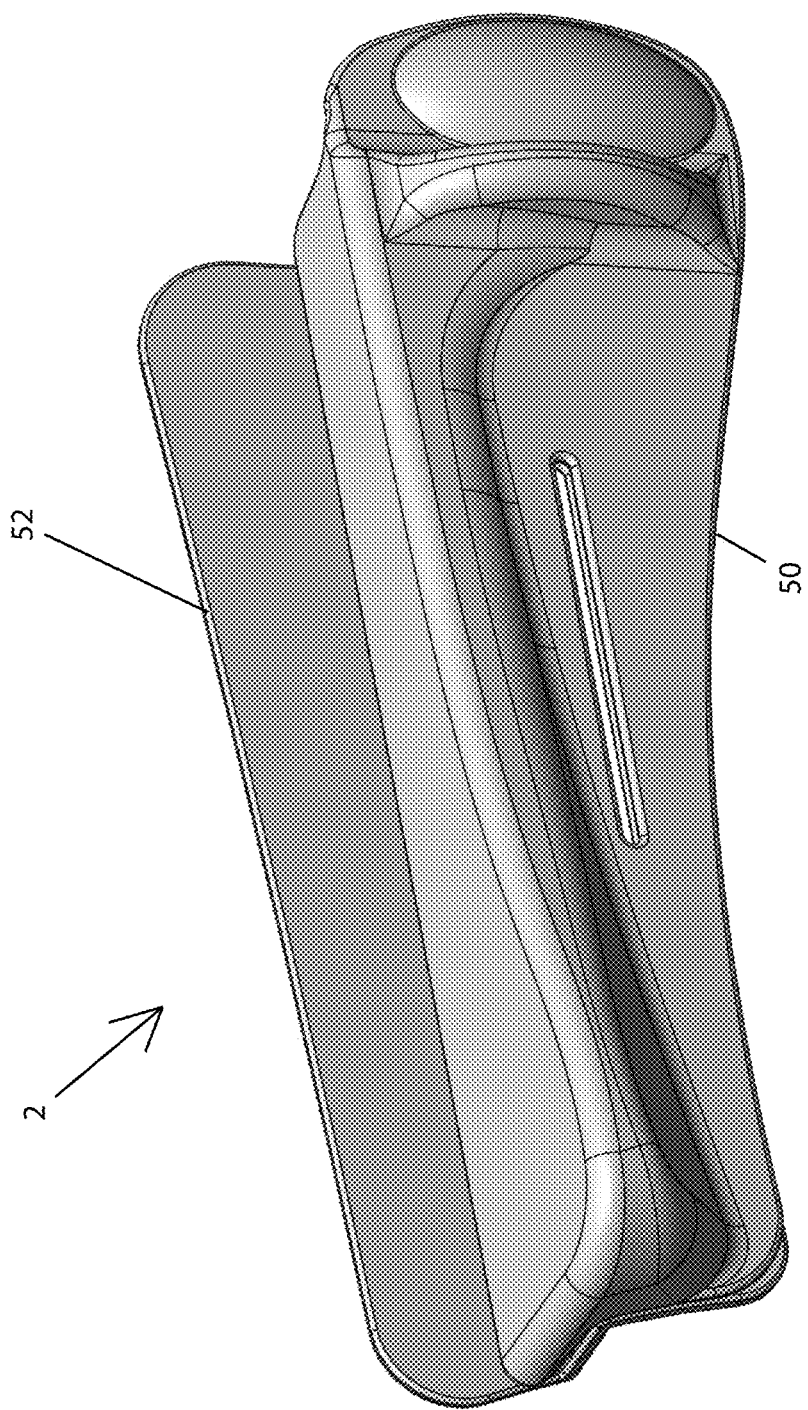
FIG. 24 is a partially exploded perspective view of a first lateral side of an armrest divider formed in accordance with a second embodiment of the present invention.
Figure 24A:
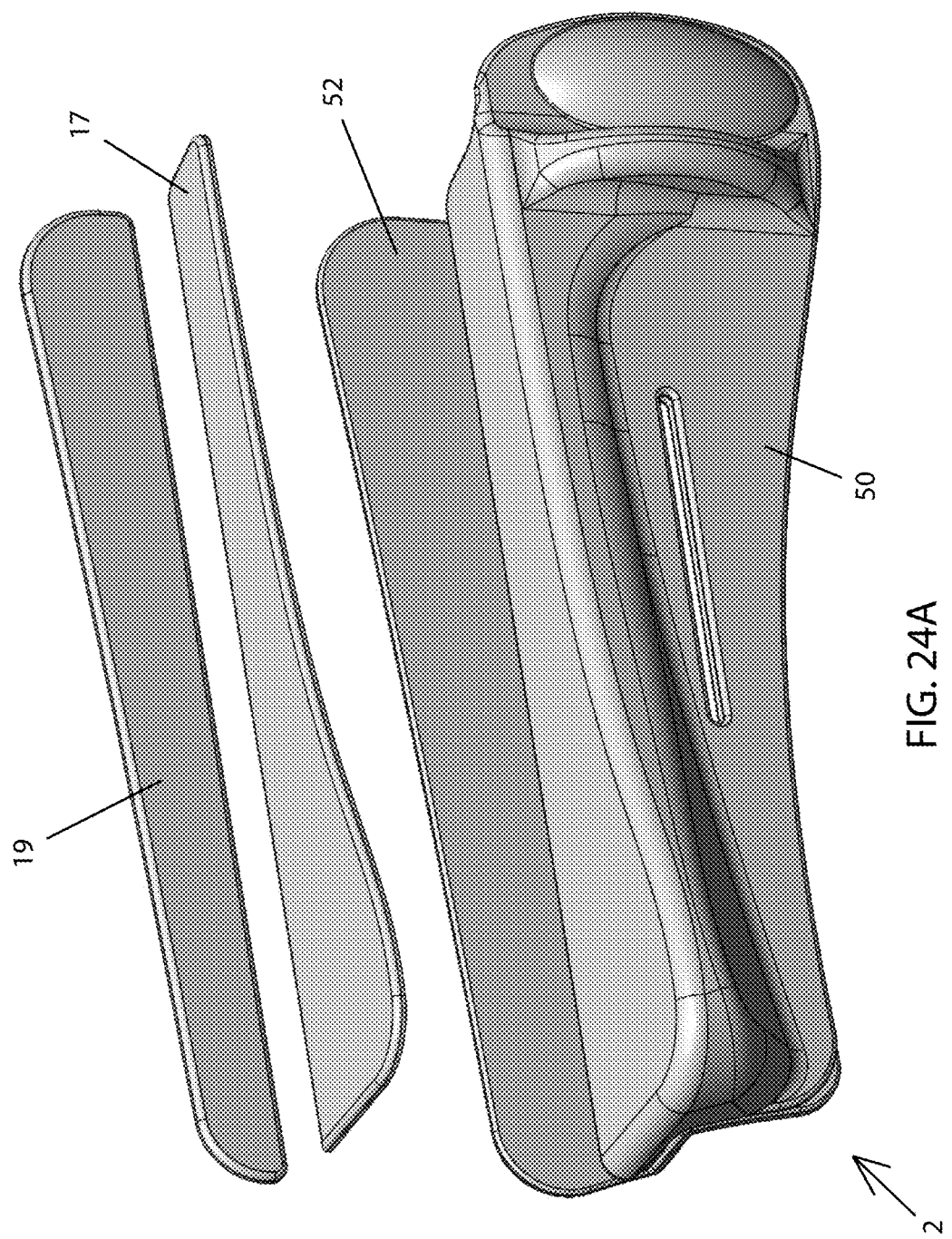
FIG. 24A is another partially exploded perspective view of the armrest divider of the present invention shown in FIG. 24, and illustrating cushioning material which may be included with the armrest divider to provide more comfort to the user thereof.
Figure 25:
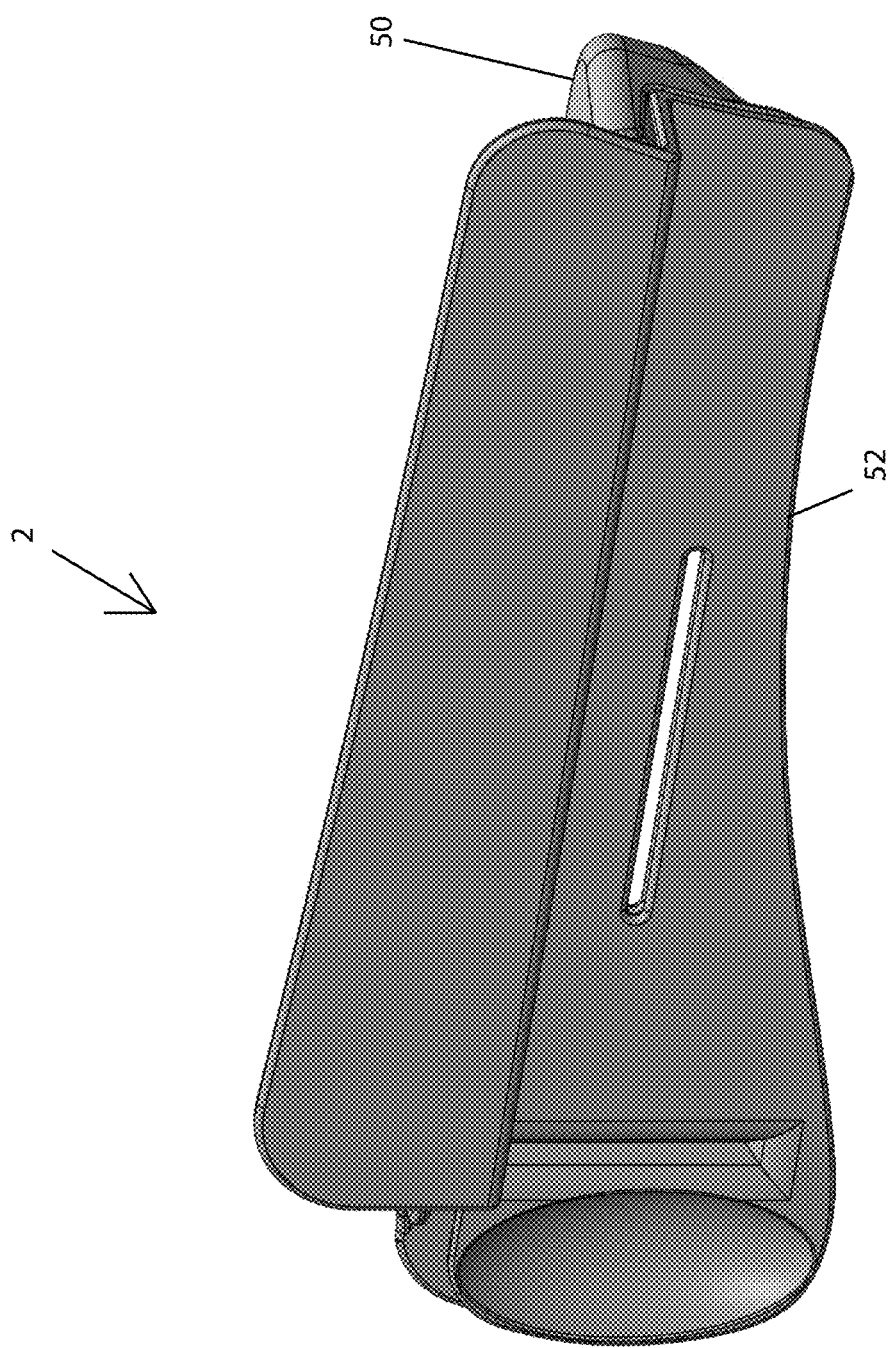
FIG. 25 is a perspective view of a second lateral side of the armrest divider of the present invention shown in FIG. 24, the second lateral side being situated opposite the first lateral side.
Figure 26:
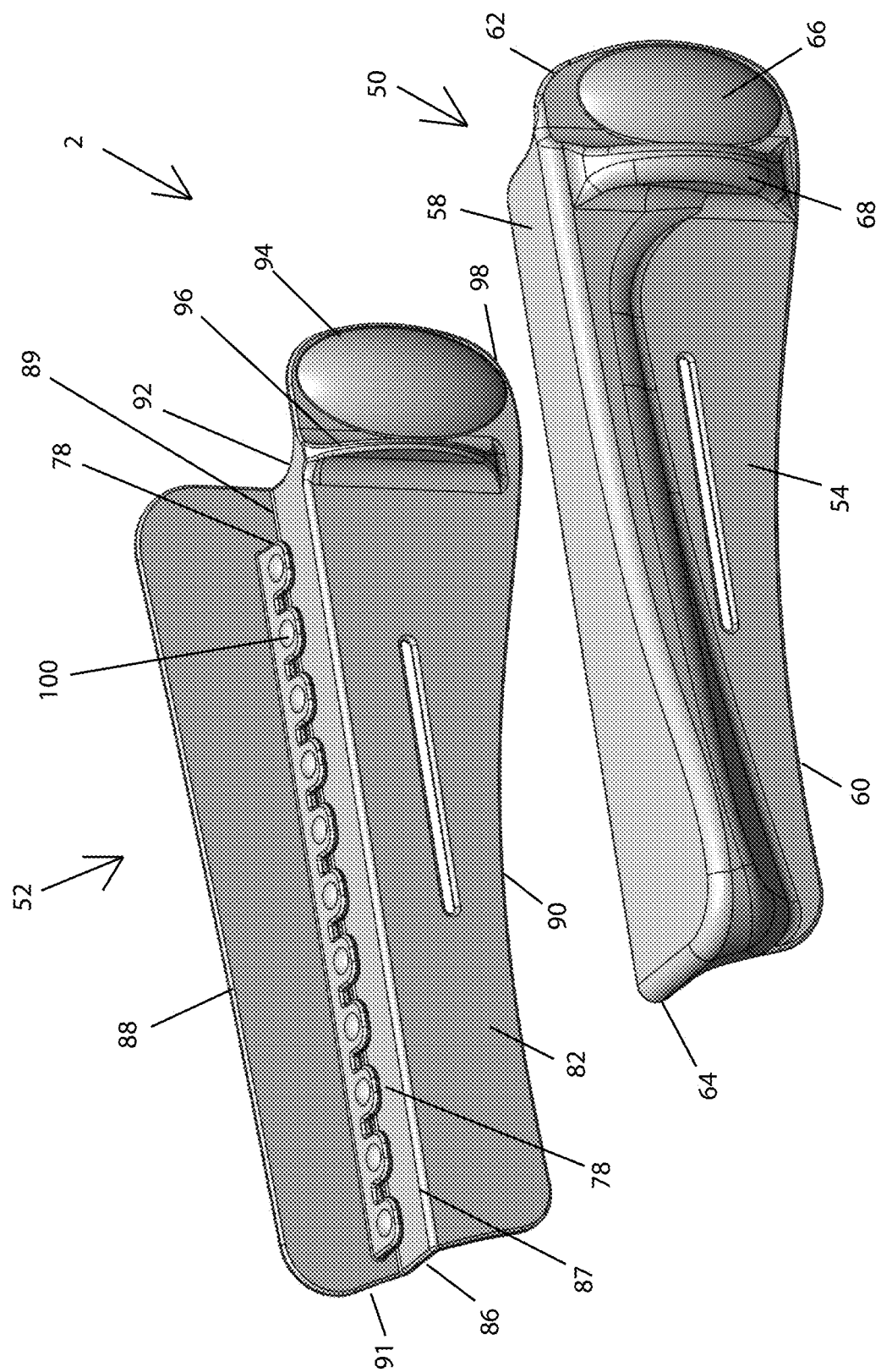
FIG. 26 is an exploded, first lateral side, perspective view of the armrest divider of the present invention shown in FIGS. 24 and 25.

As can be seen in FIGS. 1-23 of the drawings, an armrest divider 2 for use on airplanes, trains, buses and other forms of public transportation, has several components that are preferably integrally joined together to form a unitary, one piece member. Preferably, the armrest divider 2 is lightweight and compact so that it may be easily carried by hand by a person onto an airplane, bus, train or the like and may fit into carry-on luggage brought on to the airplane, bus or train by the passenger. The armrest divider 2 is preferably formed, at least in part, from a plastic material, for example, polyethylene, polypropylene and the like, and by blow molding, injection molding, compression molding, 3-D printing and other well known manufacturing techniques. Even more preferably, the armrest divider 2 may be formed by injection molding using a thermoplastic vulcanizate (TPV) rubberized material, such as commonly known by the trademark Santoprene®, or another synthetic rubber, such as a polychloroprene material known as neoprene. Alternatively, the armrest divider 2 may be made from a silicone material, expanded foam or an encased gel material, and even wrapped or encased with a fabric or leather for comfort and/or aesthetic purposes. Additionally, the armrest divider 2 of the present invention may be formed from a material having antimicrobial or antibacterial properties, for example, an antimicrobial plastic, and may act as a protective shield or guard for the user to prevent his coming in contact with the hand or arm of a person sitting next to him, in consideration of minimizing the risk of transmission of infectious diseases, cold viruses, bacteria and the like.

The armrest divider 2 of the present invention preferably includes a planar main body portion 4. The main body portion 4 will be disposed vertically when the divider is properly positioned to rest on and be supported by the existing armrest 6 of a passenger seat 8. The vertically disposed main body portion 4 acts as a barrier, or "privacy shield", between passengers seated in adjacent seats, and divides a commonly shared armrest 6 in approximately half-sections lengthwise so that adjacently seated passengers may use respectively adjacent sections of the commonly disposed armrest 6 situated on opposite lateral sides of the vertically disposed main body portion 4 of the divider 2, without their arms or elbows physically touching one another's.

As may be seen from the drawings, the planar main body portion 4, or barrier section, of the armrest divider 2 has opposite inner and outer lateral sides 10, 12, respectively, the inner lateral side 10 being situated in closer proximity to and facing the passenger seat 8 of the person using the divider 2. Extending outwardly from and generally perpendicularly to the inner lateral side 10 of the main body portion 4 of the armrest divider 2 is a protruding ledge 14 that functions not only as an armrest for the person using the divider 2 but also as a supporting surface for mounting the divider 2 on the existing passenger seat armrest 6.

More specifically, the ledge 14 of the divider 2 is a generally planar member that extends in a horizontal direction from the main body portion 4 when the divider 2 is properly mounted on the existing armrest 6 of the passenger's seat 8, and has an upper wall 16 and an opposite lower wall 18. The upper wall 16 acts as an armrest for the passenger using the divider 2, and may include a soft, cushioning material 17, such as a gel pad or foam (not shown), affixed to the upper wall 16 by using an adhesive, fasteners or the like, for added comfort. Such cushioning material 17 may also be affixed to the inner lateral side 10 of the planar main body portion 4. Alternatively, the ledge 14 of the divider 2 or at least the upper portion thereof may be formed from a softer material than that of the planar main body portion 4 of the divider 2, the ledge 14 and the main body portion 4 being joined together by using adhesive, fasteners or through a two-stage injection molding process.

Preferably, the ledge 14 of the divider 2 extends outwardly from the inner lateral side 10 of the main body portion 4, or barrier section, a distance sufficient to adequately and comfortably support an arm or at least an elbow of the passenger using the armrest divider 2. The preferred distance that the ledge 14 extends from the main body portion 4 is about two inches to about four inches such that the ledge 14 provides an arm or elbow support which is wider than the full or half-section width of an existing passenger seat armrest 6 that is shared by adjacently seated passengers, adding to the comfort that the passenger experiences during travel.

Preferably, the thickness of the ledge 14 is not so great as to cause the upper wall 16 to be raised significantly above the existing passenger's seat armrest 6 to cause discomfort to the passenger using the divider 2. The thickness of the ledge 14 is preferably about one-half inch to about three-quarters inch so that the passenger's arms or elbows are not elevated significantly more than they would have if they were resting on the seat's armrest 6. Furthermore, the lower wall 16 of the ledge 14 is preferably about three-quarters inch in width to insure that the divider 2 does not occupy more than one half the width of the armrest 6 on which the divider 2 is mounted.

Extending downwardly from and generally perpendicularly to the lower wall 16 of the ledge 14 of the armrest divider 2 is a generally planar, side support member 20. The side support member 20 has an outer lateral side surface 22 and an opposite inner lateral side surface 24 facing the seat 8 of the passenger using the divider 2. The planar side support member 20 is positioned to extend downwardly from the lower wall 18 of the ledge 14 about midway between where the ledge 14 joins the inner lateral side 10 of the main body portion 4, or barrier section, and the distal free edge 26 of the ledge 14, and extends along at least a portion of the longitudinal length of the ledge 14. When the divider 2 is properly positioned with at least a portion of the lower wall 18 of the ledge 14 resting on the existing passenger seat armrest 6, the outer lateral side surface 22 of the side support member 20, facing away from the seat 8 of the passenger using the divider 2, will abut against the side of the existing passenger seat armrest 6. The side support member 20 preferably extends about three inches to about six inches below the ledge 14, but not so far as to interfere with the operation of the passenger's or adjacent passenger's seatbelt.

Incidentally, the longitudinal length of the ledge 14, and the longitudinal length of the main body portion 4, or barrier section, of the divider 2 are chosen so as not to interfere with the controls and switches 28, earphone connectors and the seat reclining push button 30, mounted on the existing passenger seat armrest 6 and usually located at the distal free end 32 thereof. Accordingly, the overall longitudinal length of the armrest divider 2 of the present invention, from one end of the ledge 14 or main body portion 4, or barrier section, whichever extends farthest, to the opposite end of the locking wedge section 34, which will be described in greater detail, is preferably about twelve inches to about eighteen inches, or shorter or longer than this aforementioned range, depending on the type of passenger seat 8 and length of the armrest 6 on which the armrest divider 2 of the present invention is used. Also, the overall length of the divider 2 is further chosen so as not to interfere with the passenger grasping the distal free end 32 of the existing passenger seat armrest 6 to raise and lower the armrest 6.

As mentioned above, the armrest divider 2 of the present invention further includes a locking wedge section 34. The locking wedge section 34 is used for mounting the divider 2 on a passenger's seat 8. The locking wedge section 34 is generally a planar member that is joined to and extends rearwardly outwardly from the side support member 20. The locking wedge section 34 may be disposed to be co-planar with the side support member 20, or stated another way, the locking wedge section 34 generally resides in substantially the same plane in which the side support member 20 generally resides. In essence, the locking wedge section 34 constitutes a thickened rear portion of the side support member 20. Alternatively, the locking wedge section 34 may be offset laterally from the plane in which the side support member 20 resides so that it is somewhat closer to the seat 8 of the passenger using the armrest divider 2. In any event, the locking wedge section 34 is positioned relative to the main body portion 4, or barrier section, and the side support section 20 such that, when the divider 2 is positioned to rest on the existing passenger seat armrest 6, with the lower wall 18 of the ledge 14 and the outer lateral side surface 22 of the side support section 20 respectively contacting the top and side of the armrest 6, and the divider 2 is slid backwards on the armrest 6, the locking wedge section 34 will be wedged between the side of the armrest 6 and the side of the passenger's seat backrest 36 to help hold the armrest divider 2 in place on the existing passenger seat armrest 6. The armrest divider 2 may be easily removed from its secured position on the armrest 6 by sliding the divider 2 forward on the armrest 6 of the passenger's seat 8 and then lifting it upwardly off the armrest 6.

A stop 38 is provided on the armrest divider 2 to limit the extent to which the locking wedge section 34 may be inserted between the armrest 6 and the backrest 36 of the passenger's seat 8. More specifically, the stop 38 is formed as a protruding member that extends outwardly and generally perpendicularly from the inner lateral side surface 24 of the side support member 20. The stop 38 is located generally where the locking wedge section 34 joins the side support section 20. When the divider 2 is placed on the seat's armrest 6 and slid rearwardly thereon such that the locking wedge section 34 is tightly received by the close gap between the armrest 6 and the seat's backrest 36, the stop 38 will contact the front surface of the seat backrest 36 to prevent the locking wedge section 34 from being inserted further between the armrest 6 and the backrest 36 and to help insure that the divider 2 is properly positioned on the armrest 6 of the passenger's seat 8.

In the divider's secured position on the existing passenger seat armrest 6, the longitudinal lengths of the main body portion 4, or barrier section, and the ledge 14, of the armrest divider 2, are chosen so as to preferably extend rearwardly on the armrest 6 between the backrests 36 of adjacent passenger seats 8. In this way, even if one or both of the backrests 36 of the adjacent passenger seats 8 are in a reclined position or an upright position, the armrest divider 2 still functions as a privacy shield and armrest for the passenger using the divider 2.

The armrest divider 2 of the present invention further preferably includes an upper back wall 40 and a lower back wall 42. The lower back wall 42 is joined to the lower wall 18 of the ledge 14 and the inner lateral side surface 24 of the side support section 20, and is further joined to the protruding stop member 38. The lower back wall 42 extends generally perpendicularly from the ledge 14 and side support member 20, and defines with the lower wall 18 of the ledge 14 a lower corner 44 which is preferably rounded or curved, with no sharp edges, so as to be more comfortable to a user of the divider 2 who rests his arms on his lap and off the ledge 14 in such a way that his elbow may contact the side support member 20, the lower back wall 42 or the rounded lower corner 44 adjoining the side support member 20 and the lower back wall 42.

Similarly, the upper back wall 40 is joined to the inner lateral side 10 of the main body portion 4, or barrier section, and the upper wall 16 of the ledge 14 and, in one form, extends generally perpendicularly to the ledge 14 and the main body portion 4, or barrier section, to define a preferably rounded upper corner 46 therewith, with no sharp edges, so as to be more comfortable to a user of the armrest divider 2 when he rests his arm on the upper wall 16 of the ledge 14. In doing so, the user's elbow may be closely positioned to, and may contact, the rounded upper corner 46 with no discomfort.

The lower back wall 42 and the upper back wall 40 are located relative to the other sections of the armrest divider 2 such that, when the divider 2 is properly positioned on the existing passenger seat armrest 6, the back walls 40, 42 will substantially reside close to or between the backrests 36 of adjacent passenger seats 8. Thus, the upper and lower back walls 40, 42 provide a passenger with a greater degree of privacy by at least partially closing the gap between the backrests 36 of adjacent passenger seats 8 and blocking the view from the rear thereof.

It has been found through experimentation that the armrest divider 2 of the present invention is even more comfortable if the upper back wall 40 is rearwardly inclined or sloped with respect to the upper wall 16 of the ledge 14 to define an obtuse angle therewith at the upper corner 46, such as shown in FIGS. 1-2 and 4-6 of the drawings. The inclined upper back wall 40 in this embodiment is provided so that a person is less likely to contact the upper back wall 40 with his elbow when his arm is resting on the ledge 14. The inclined upper back wall 40 better provides more room and comfort for the passenger's arm and elbow and more freedom for the passenger to position his arm on the armrest divider 2, without contacting the upper back wall 40. The angle of inclination of the upper back wall 40 with respect to the upper wall 16 of the ledge 14 is preferably between about 105 degrees and about 135 degrees.

It is anticipated that a passenger will use two such armrest dividers 2, one on the left armrest 6 and one on the right armrest 6. Accordingly, a set of armrest dividers 2 may be provided, one armrest divider 2 configured for use on the left armrest 6 of a passenger seat 8 and the other armrest divider 2 configured for use on the right armrest 6. The left-configured armrest divider 2 would have the same structure, including components and sections, as that of the right-configured armrest divider 2, except that the left-configured armrest divider 2 would be the mirror image of the right-configured armrest divider 2 with respect to the positions and arrangement of its components and sections.

FIGS. 24-39 illustrate another form of an armrest divider 2 constructed in accordance with the present invention. This armrest divider 2 is formed in two parts—an arm support section 50 and a barrier or divider section 52—and provides for an adjustment in the extent to which the arm support section 50 may be extended on the armrest 6 of a passenger's seat 8 for the comfort of the user.

More specifically, the arm support section 50 of the armrest divider 2 has a first lateral side 54 and an opposite second lateral side 56. The arm support section 50 includes a ledge 58 which acts as a support for the user to rest his arm on, the ledge 58 being in a horizontal disposition when the armrest divider 2 is mounted on the armrest 6 of the passenger's seat 8. The ledge 58 may be formed of or include a cushioned material, such as is described previously with the embodiment of the armrest divider shown in FIGS. 1-23. The ledge 58 also preferably has dimensions which are the same as or are similar to those of the ledge 14 of the first embodiment shown in FIGS. 1-23.

The arm support section 50 of the armrest divider 2 also includes a generally planar, side support member 60. The planar side support member 60 extends downwardly from the lower portion of the ledge 58 about midway relative to the transverse width thereof so that a section of the lower portion of the ledge 58 extends transversely beyond the planar side support member 60 so as to be able to rest on and be supported by the armrest 6 of the passenger's seat 8 when the arm support section 50 of the armrest divider 2 is used alone, that is, without the barrier or divider section 52, as will be explained in greater detail. Preferably, the planar side support member 60 extends longitudinally on the arm support section 50 from the proximal end 62 of the arm support section 50, where it is wedged in between the passenger seat armrest 6 and the backrest 36 of the passenger seat 8, and the opposite distal free end 64 of the arm support section 50.

The arm support section 50 also includes, at its proximal end 62, a protruding dome 66 having a convex oval shape that extends outwardly on the arm support section 50 from the first lateral side 54 thereof. This protruding dome 66 is similar in function to the locking wedge section 34 forming part of the armrest divider 2 of the present invention described previously and shown in FIGS. 1-23 of the drawings. Additionally, the arm support section 50 includes a stop 68 that is formed as a protruding member that extends outwardly and generally perpendicularly from the first lateral side 54 of the arm support section 50. Like the stop 38 of the first embodiment of the armrest divider 2 described previously and shown in FIGS. 1-23, the stop 68 formed on the arm support section 50 of this embodiment of the armrest divider 2 is located generally at the proximal end 62 of the arm support section 50 slightly inwardly of the protruding dome 66. The stop 68, as with the stop 38 of the previously described embodiment, is provided on the arm support section 50 to limit the extent to which the proximal end 62 of the arm support section 50, with the protruding dome 66, may be inserted between the armrest 6 and the side of the backrest 36 of the passenger's seat 8.

Figure 27:
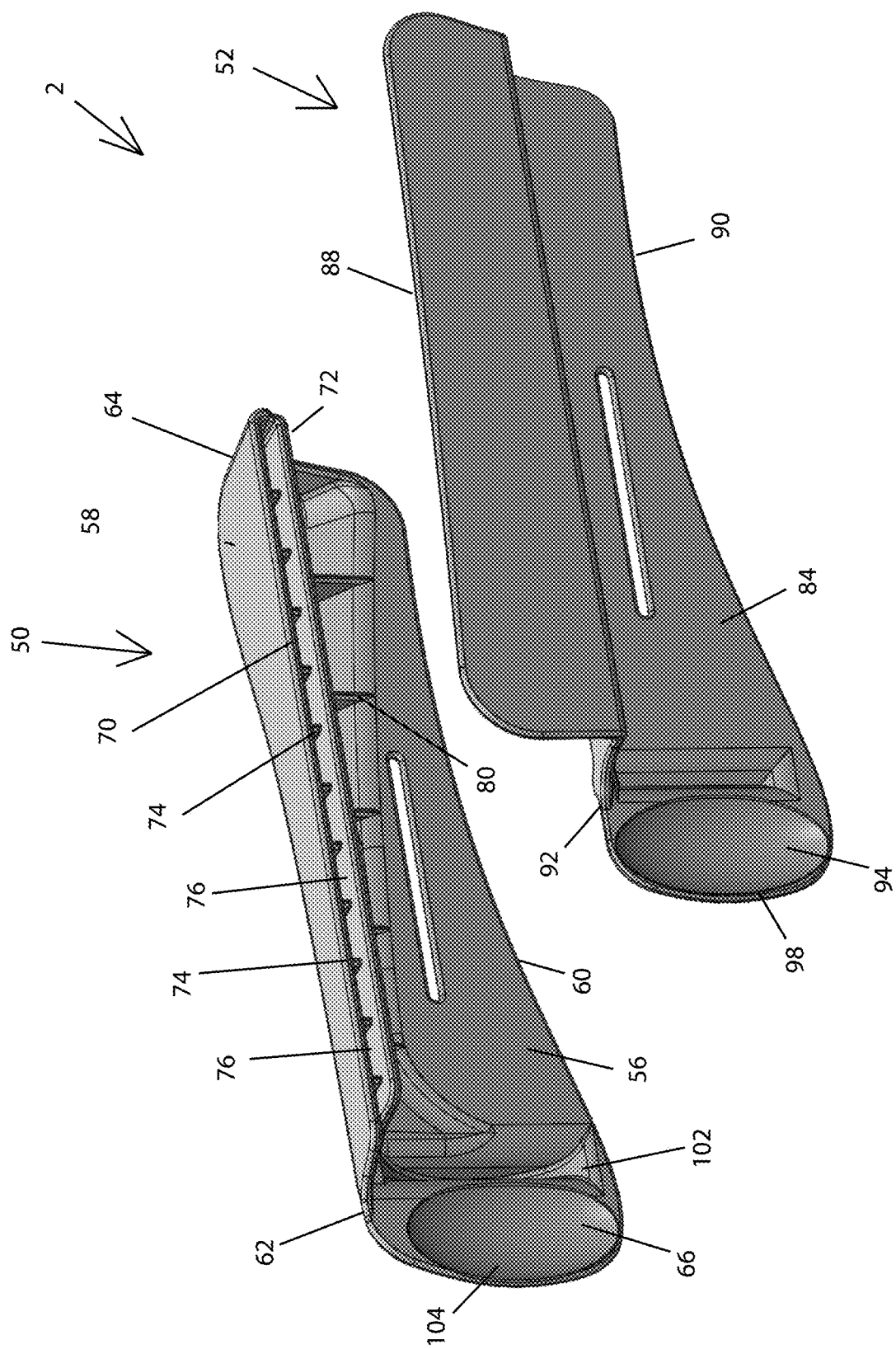
FIG. 27 is an exploded, second lateral side, perspective view of the armrest divider of the present invention shown in FIGS. 24-26.

As shown in FIG. 27 of the drawings, the ledge 58 of the arm support section 50 is defined by two parallel upper and lower walls 70, 72 that are separated from each other on the second lateral side 56 of the arm support section 50 and converge together on the first lateral side 54 thereof. Additionally, between the upper and lower walls 70, 72 of the ledge 58 are located a plurality of laterally extending internal ribs 74 spaced apart from each other periodically along the longitudinal length of the arm support section 50. In a preferred form, the ribs 72 are spaced apart about every ¾ of an inch. Adjacent ribs 74, along with the upper and lower walls 70, 72 of the ledge 58 of the arm support section 50, define individual sockets 76 between them for receiving fingers 78 formed on the barrier or divider section 52 of the armrest divider 2, as will be explained in greater detail. Additionally, there are a plurality of support ribs 80 situated on the second lateral side 56 of the arm support section 50 and periodically spaced from each other along the longitudinal length of the arm support section 50. These support ribs 80, which extend between the planar side support member 60, on the second lateral side 56 of the arm support section 50, and the underside of the lower wall 72 of the ledge 58, provide support for the ledge 58 to prevent it from flexing. The support ribs 80, which are perpendicular to the upper and lower walls 70, 72 of the ledge 58, do not extend transversely on the underside of the lower wall 72 of the ledge 68 to more than is necessary so as not to interfere with the ability of the lower wall 72 of the ledge 58 to rest on the armrest 6 of the passenger's seat 8 when the armrest divider 2 of the present invention is mounted thereon.

The barrier or divider section 52 of the armrest divider 2 of the present invention of this second embodiment has a first lateral side 82 and an opposite second lateral side 84. The barrier section 52 includes a planar mid-portion 86, which is horizontally disposed when the armrest divider 2 is mounted on the armrest 6 of the passenger's seat 8, a vertical, planar barrier wall 88 which extends upwardly and perpendicularly from the planar mid-portion 86, at the second lateral side 84 of the barrier section 52, and a vertical, generally planar, side support member 90 which extends downwardly from and perpendicularly to the planar mid-portion 86 of the barrier section 52, at the first lateral side 82 thereof. The barrier section 52 also includes a plurality of spaced apart fingers 78 arranged in a planar row and extending perpendicularly from the vertical barrier wall 88 and spaced above the planar mid-portion 86 of the barrier section 52. Preferably, the centerlines of the fingers are spaced apart about every ¾ of an inch, just like the ledge ribs 74 of the arm support section. As will be described in greater detail, these fingers 78 of the barrier section 52 are received in the sockets 76 formed in the ledge 58 of the arm support section 50 so that the arm support section 50 may be adjusted longitudinally on the barrier section 52 to extend the overall length of the armrest divider 2 of the present invention.

Situated on the proximal end 92 of the barrier section 52, and on the first lateral side 82 thereof, is another protruding dome 94 and another stop 96 adjacent the protruding dome 94, just like the protruding dome 66 and stop 68 formed on the arm support section 50. More specifically, the dome 94 and the stop 96 are situated at an extended portion 98 of the planar side support member 90 of the barrier section 52, at the proximal end 92 thereof. The stop 96 on the barrier section 52 is slightly smaller in width and length than the stop 68 of the arm support section 50 so that, when the arm support section 50 is mated to the barrier section 52, with the first lateral side 82 of the barrier section 52 being situated adjacent to the second lateral side 56 of the arm support section 50, and with the armrest divider 2 in a non-extended state, the stop 96 of the barrier section 52 fits into the concavity defined by the stop 68 of the arm support section 50 on the second lateral side 56 thereof, and the dome 94 of the barrier section 52 is received by the concavity defined by the protruding dome 66 of the arm support section 50, also on the second lateral side 56 thereof.

Figure 34:
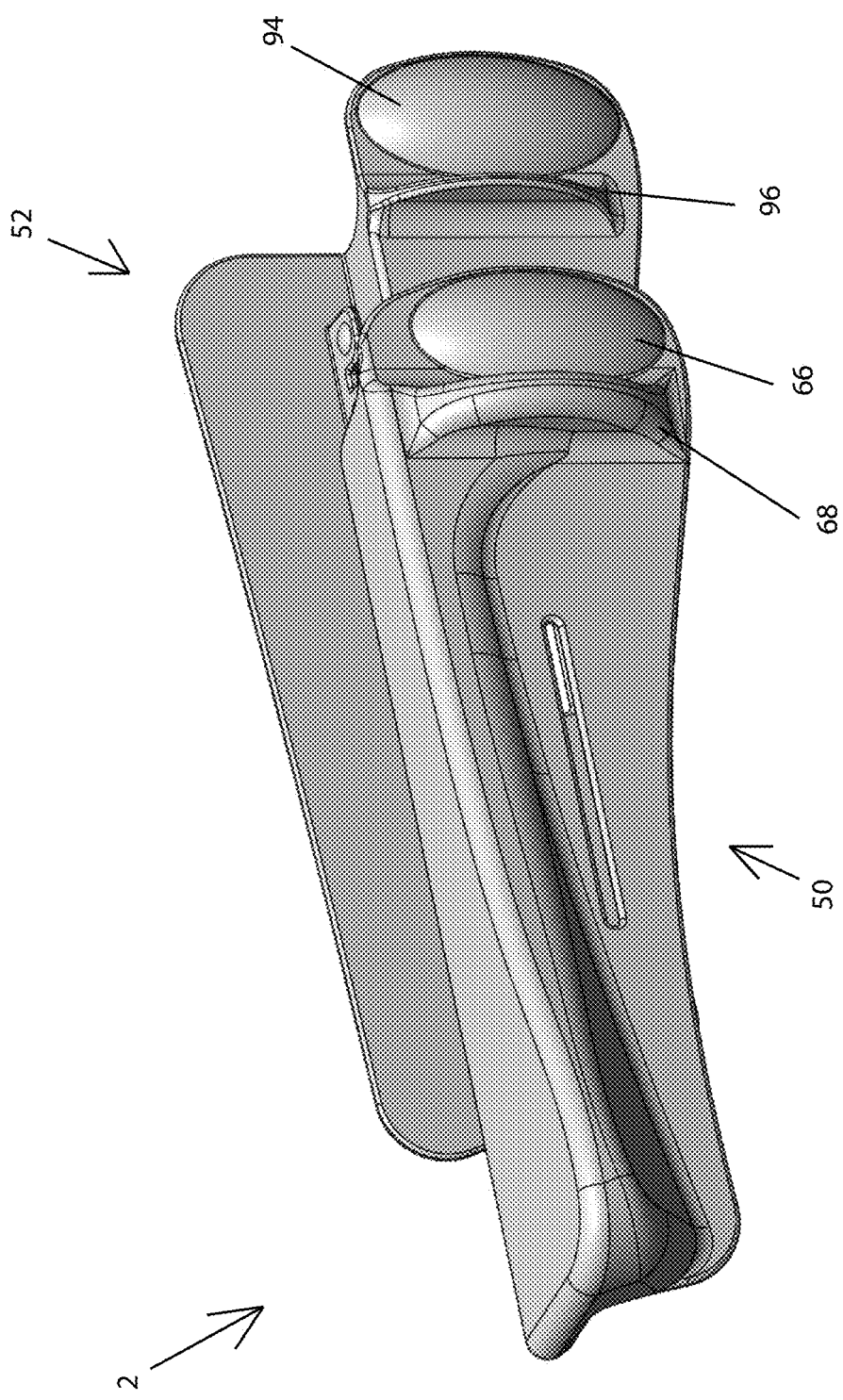
FIG. 34 is a perspective view of the first lateral side of the armrest divider of the present invention shown in FIGS. 24-33, and illustrating how the armrest divider may be adjusted to be in a first extended position.
Figure 35:
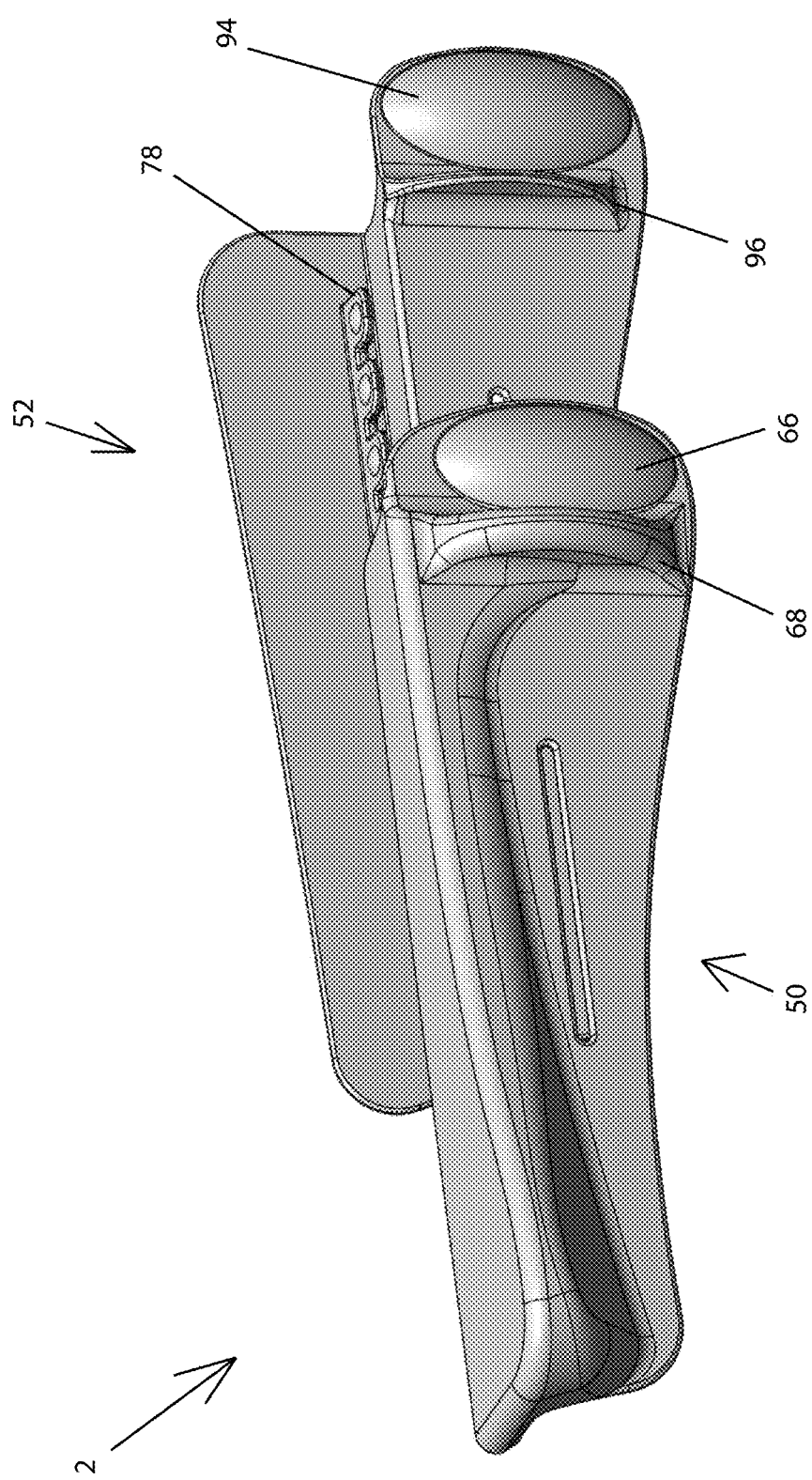
FIG. 35 is a perspective view of the first lateral side of the armrest divider of the present invention shown in FIGS. 24-34, and illustrating how the armrest divider may be adjusted to be in a second extended position.
Figure 36:
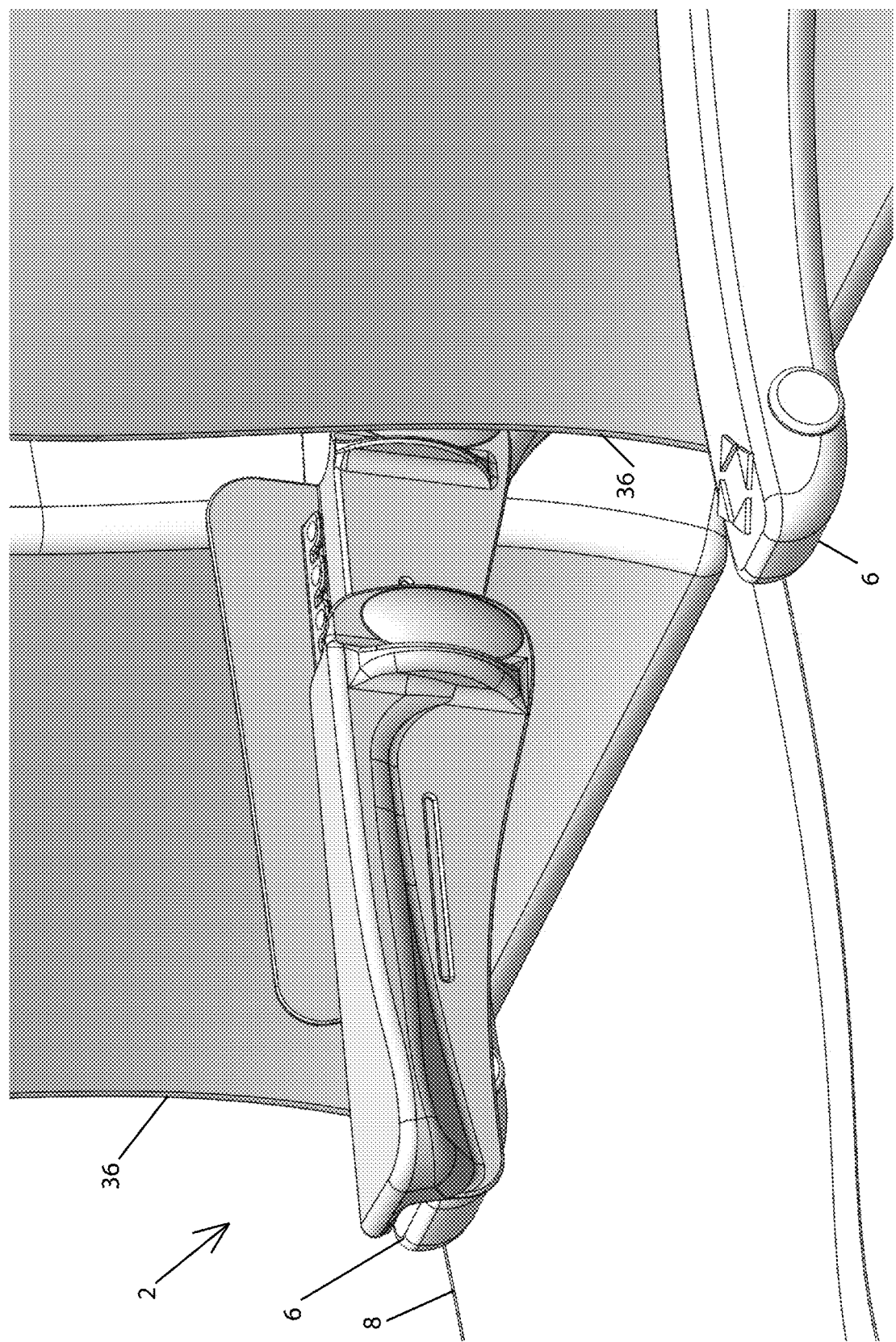
FIG. 36 is a perspective view of the armrest divider of the present invention shown in FIGS. 24-35, taken from the first lateral side thereof, and illustrating the armrest divider of the present invention in an extended state and mounted on the armrest of a passenger's seat.
Figure 37:
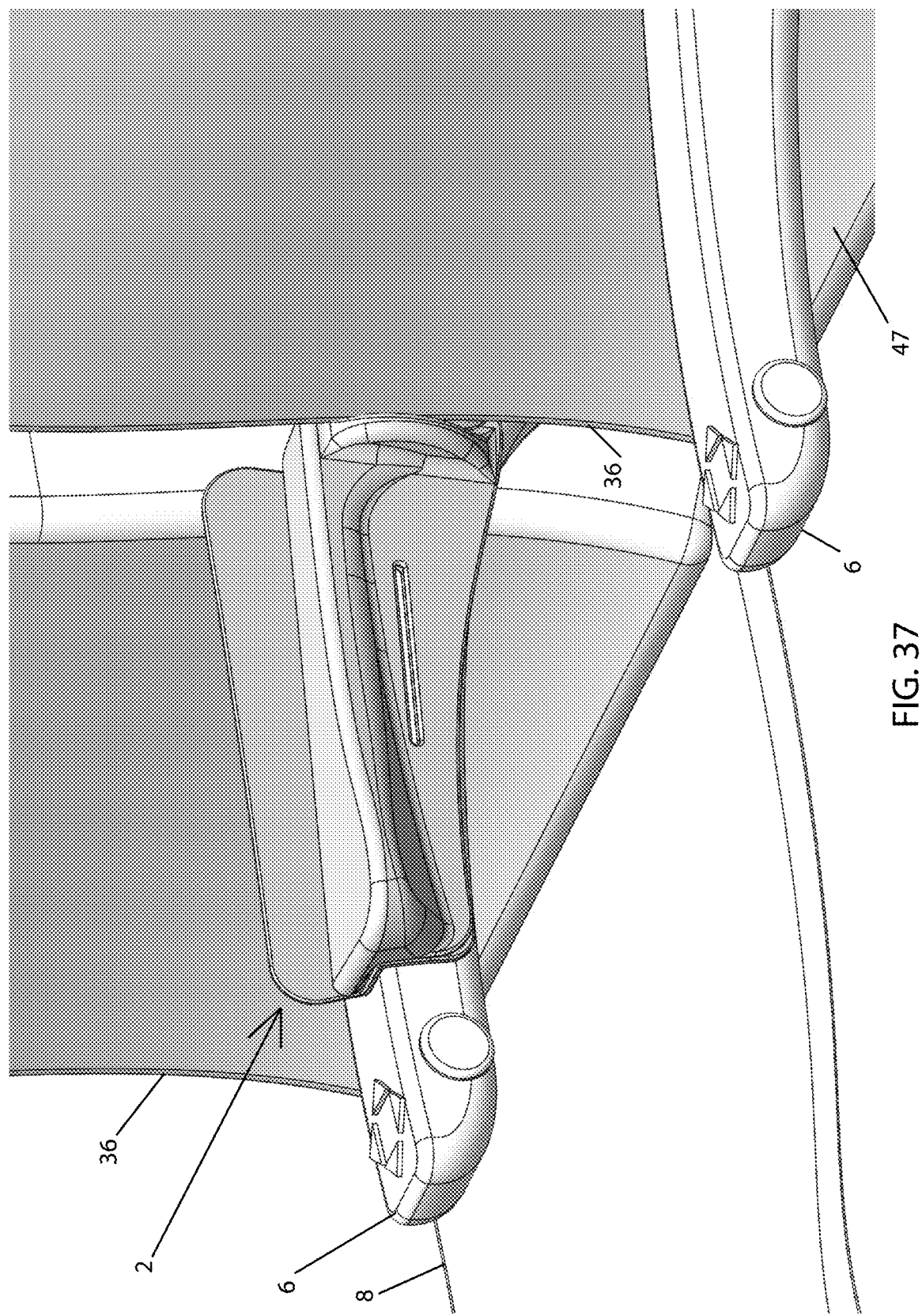
FIG. 37 is a perspective view of the armrest divider of the present invention shown in FIGS. 24-36, taken from the first lateral side thereof, and illustrating the armrest divider of the present invention in a non-extended state and mounted on the armrest of a passenger's seat.

However, and as mentioned previously, the armrest divider 2 in accordance with this embodiment of the present invention is adjustable in longitudinal length to provide more comfort for the user of the armrest divider 2. The arm support section 50 may be separated from the barrier section 52 and repositioned thereon longitudinally so that the fingers 78 of the barrier section 52 may be received in different sockets 76 formed in the ledge 58 of the arm support section 50. Such repositioning of the arm support section 50 on the barrier section 52 is shown in FIG. 34 in one position, and in FIG. 35 in yet another, more extended position. In such a case, the proximal end 92 of the barrier section 52, with the protruding dome 94 formed thereon, is received between the passenger seat armrest 6 and the backrest 36 of the passenger seat 8 to secure the armrest divider 2 in place on the passenger's seat 8. The stop 96 of the barrier section 52 limits the extent to which the proximal end 92 of the barrier section 52 may be inserted between the armrest 6 and the backrest 36 of the passenger's seat 8.

Figure 28:
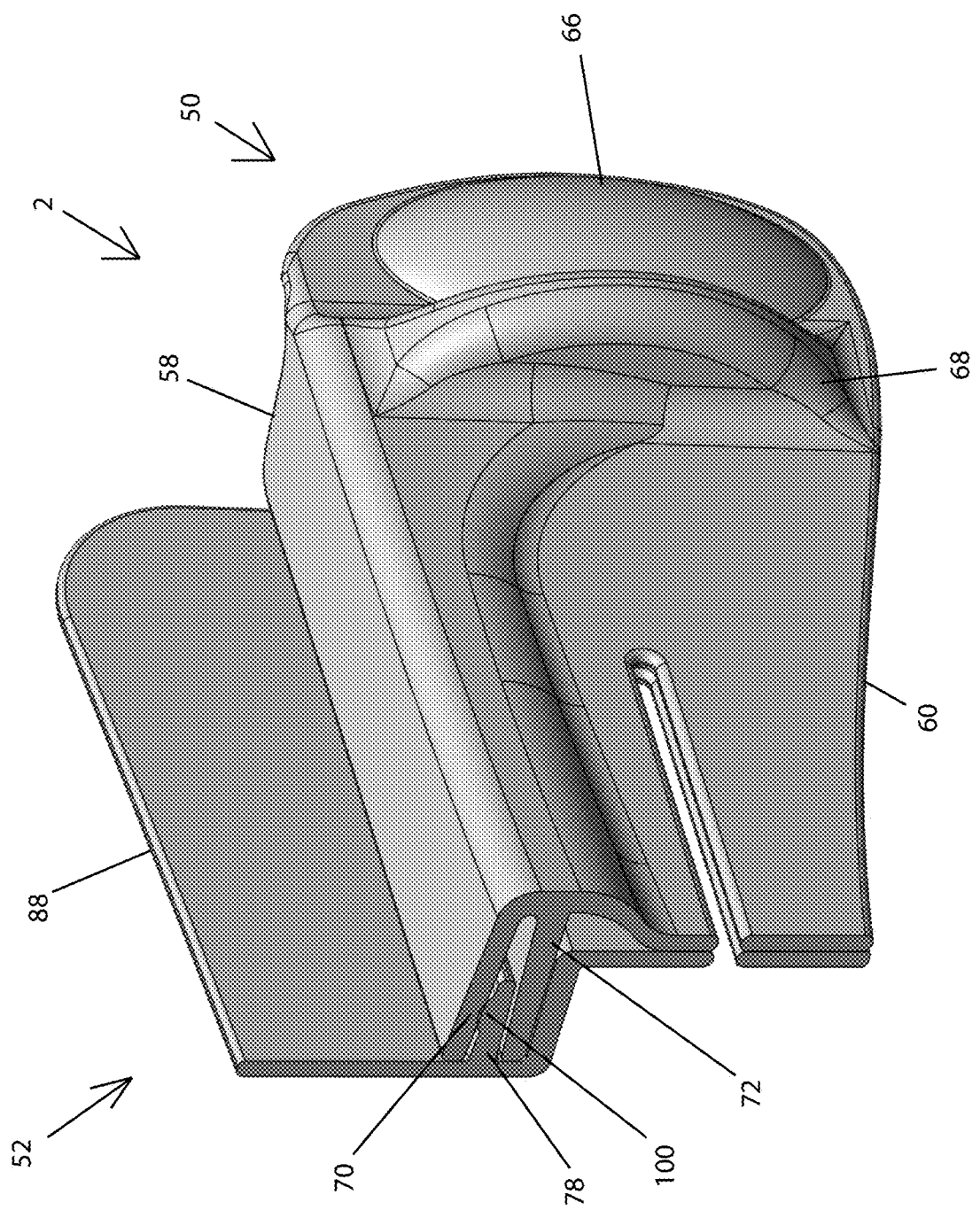
FIG. 28 is a cutaway perspective view of a proximal portion of the armrest divider of the present invention shown in FIGS. 24-27, taken from the first lateral side thereof.
Figure 29:
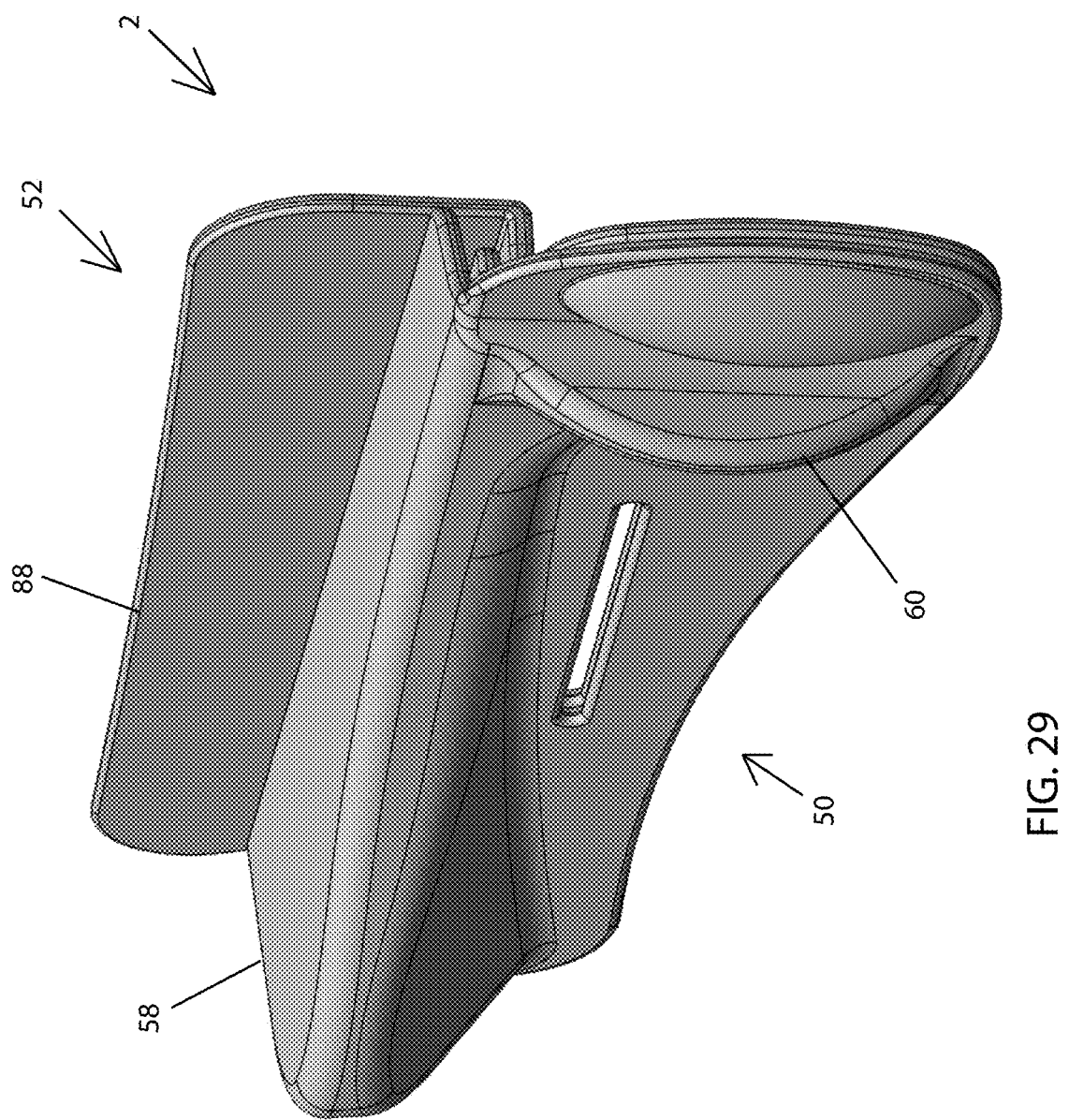
FIG. 29 is still another perspective view of the first lateral side of the armrest divider of the present invention shown in FIGS. 24-28, taken from a different angle than the views of FIGS. 24-28, with a proximal end portion of the armrest divider cut away to illustrate certain structure thereof.
Figure 30:
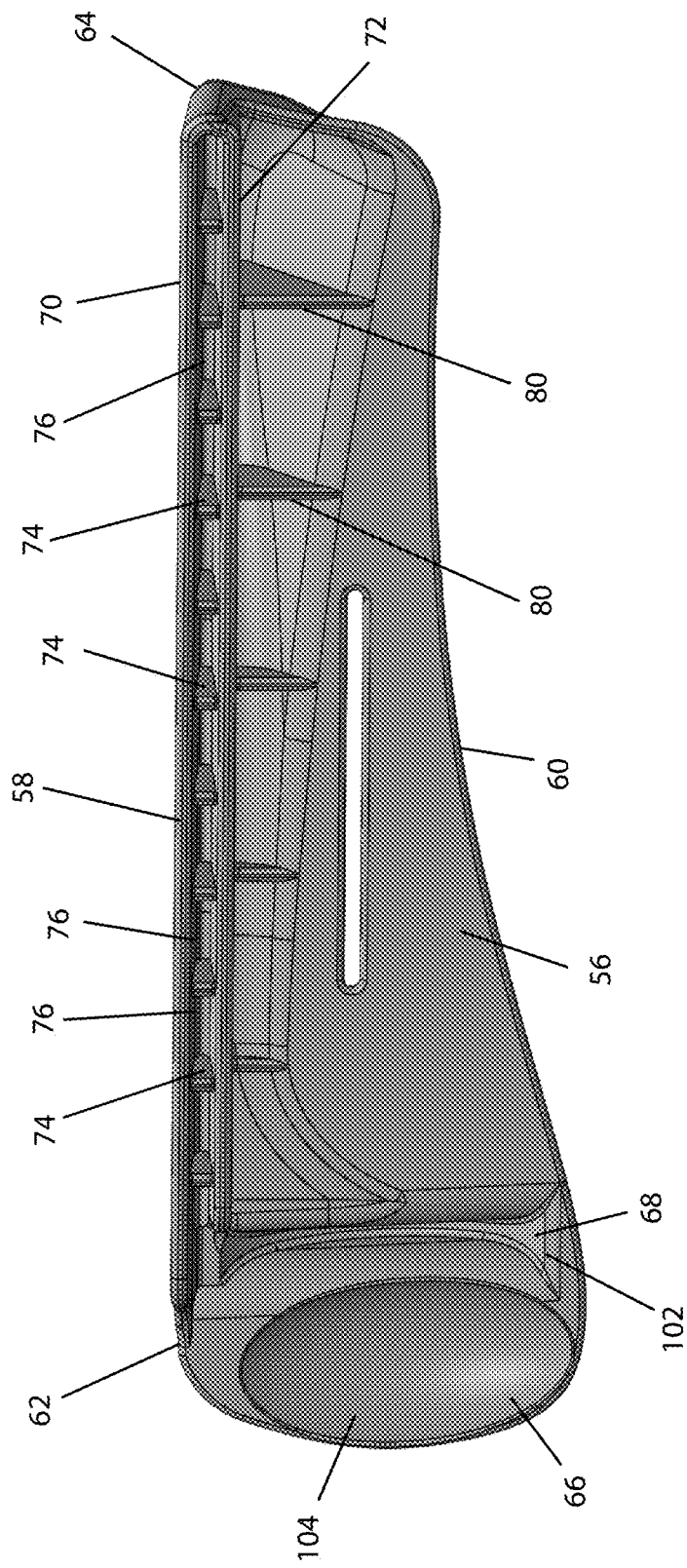
FIG. 30 is a perspective view of the second lateral side of a first portion of the armrest divider of the present invention shown in FIGS. 24-29.
Figure 31:
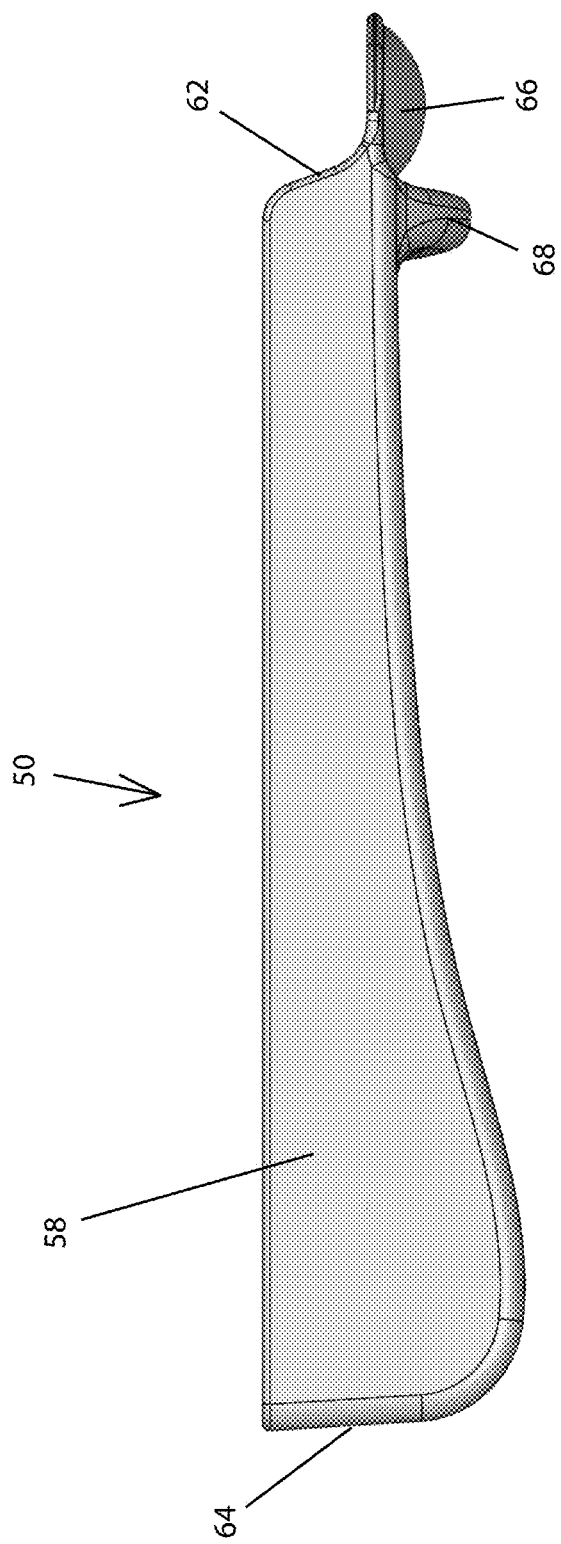
FIG. 31 is a top perspective view of the first portion of the armrest divider of the present invention shown in FIGS. 24-30.
Figure 32:
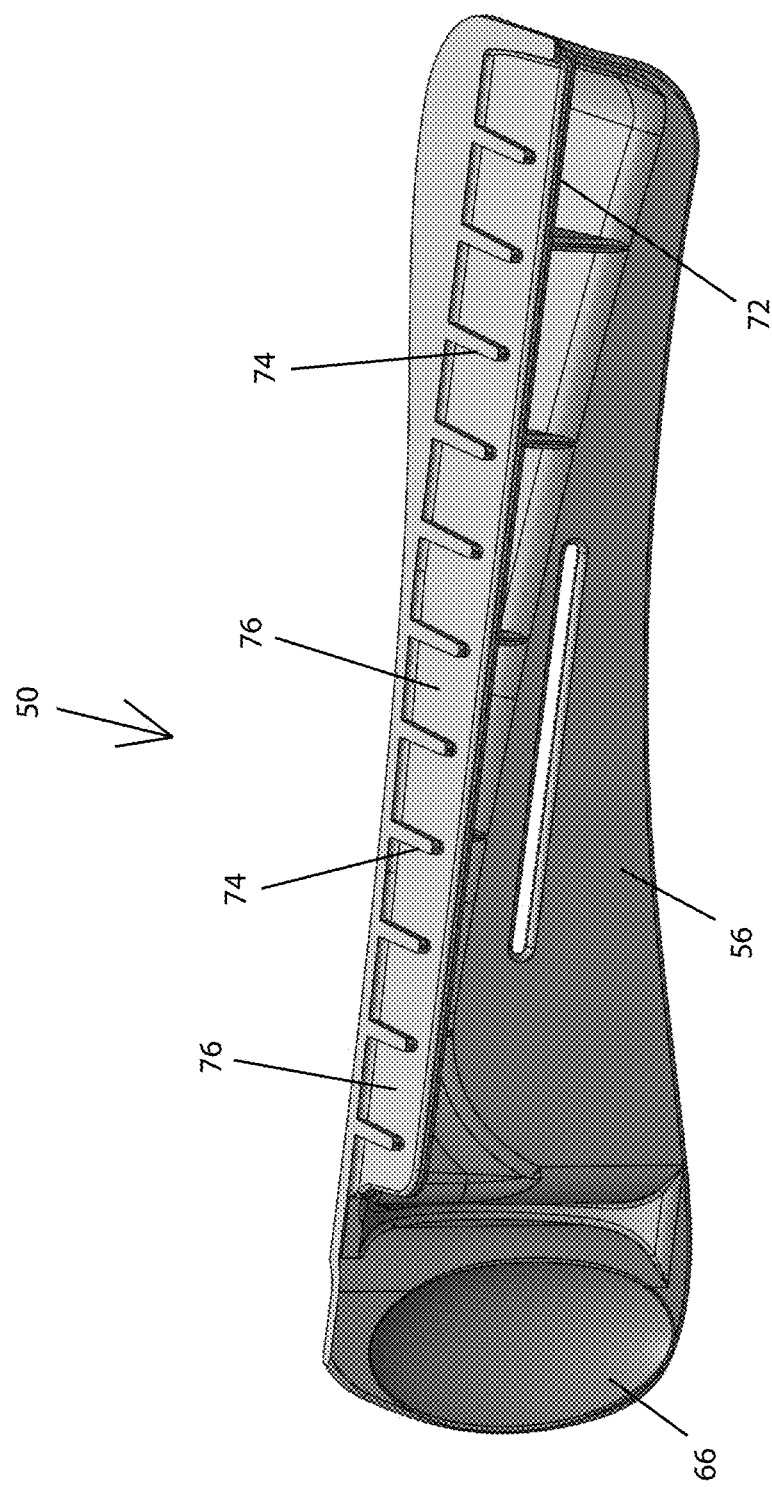
FIG. 32 is a perspective view of the second lateral side of the first portion of the armrest divider of the present invention shown in FIGS. 24-31, with a top portion thereof cut away to illustrate certain structure thereof.
Figure 33:
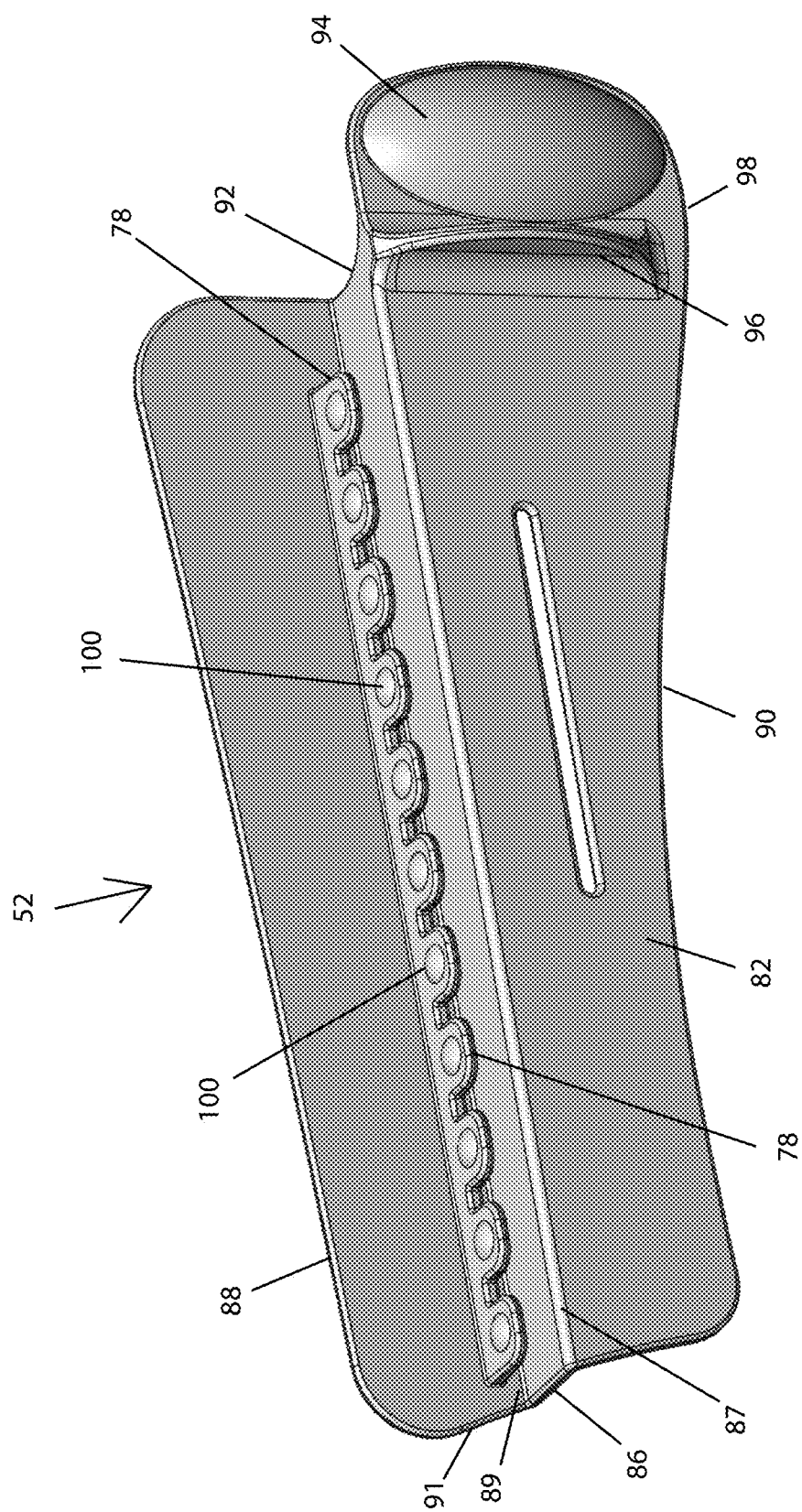
FIG. 33 is a perspective view of a first lateral side of a second portion of the armrest divider of the present invention shown in FIGS. 24-32.

To help ensure that the arm support section 50 and the barrier section 52 of the armrest divider 2 are maintained in a joined together manner, each finger 78 of the barrier section 52 may include a detent bump or button protrusion 100 formed on either the upper surface (as shown in the drawings) or the lower surface thereof to provide a friction or interference fit between the upper wall 70 and the lower wall 72 of the ledge 58 of the arm support section 50 when the fingers 78 are received by the ledge sockets 76, as shown in FIG. 28 of the drawings, until the two sections 50, 52 are forcibly separated by the user of the armrest divider 2.

Figure 38:
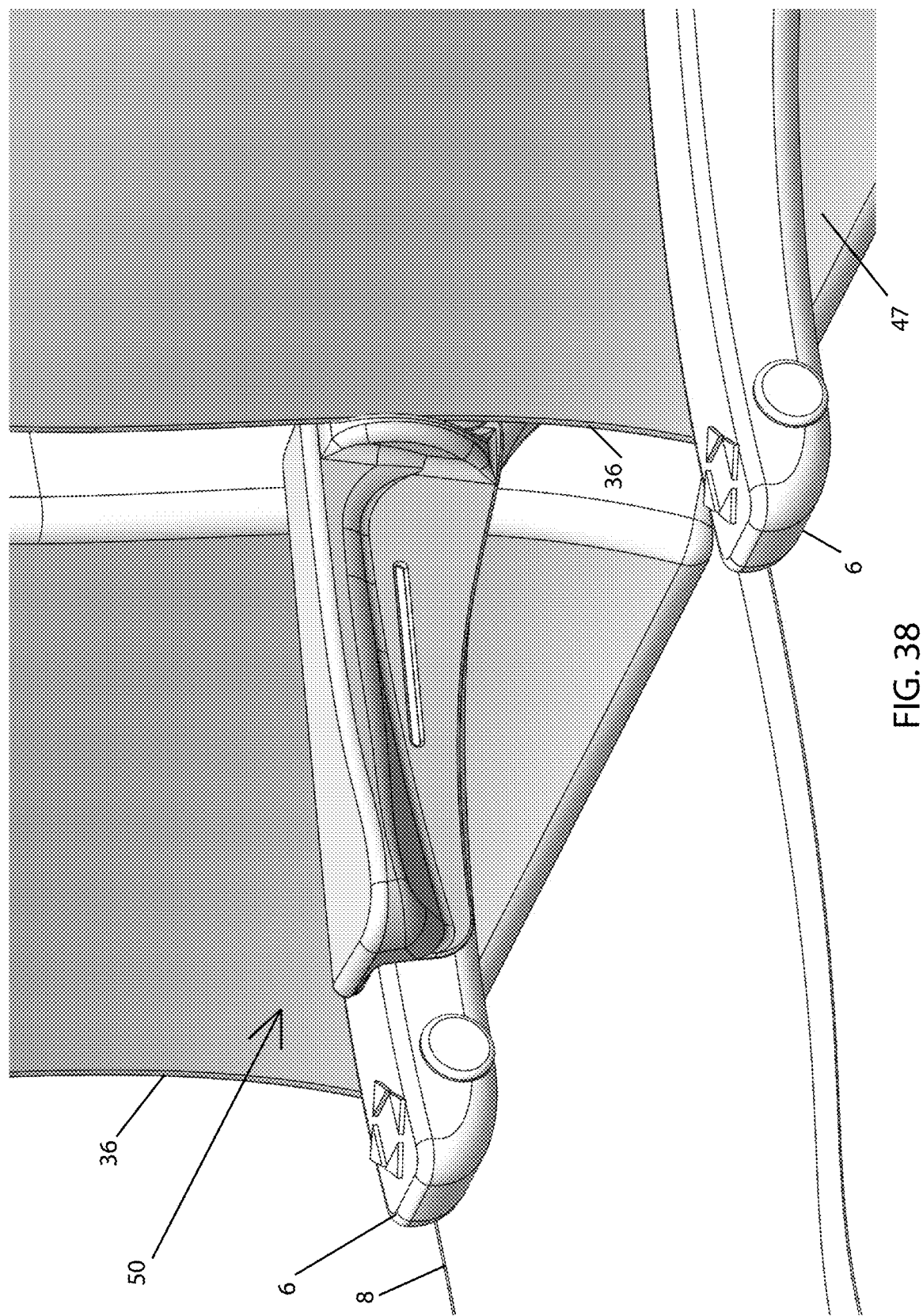
FIG. 38 is a perspective view of the first portion of the armrest divider of the present invention shown in FIGS. 24-37, taken from the first lateral side thereof, and illustrating the first portion of the armrest divider mounted on the armrest of a passenger's seat.
Figure 39:
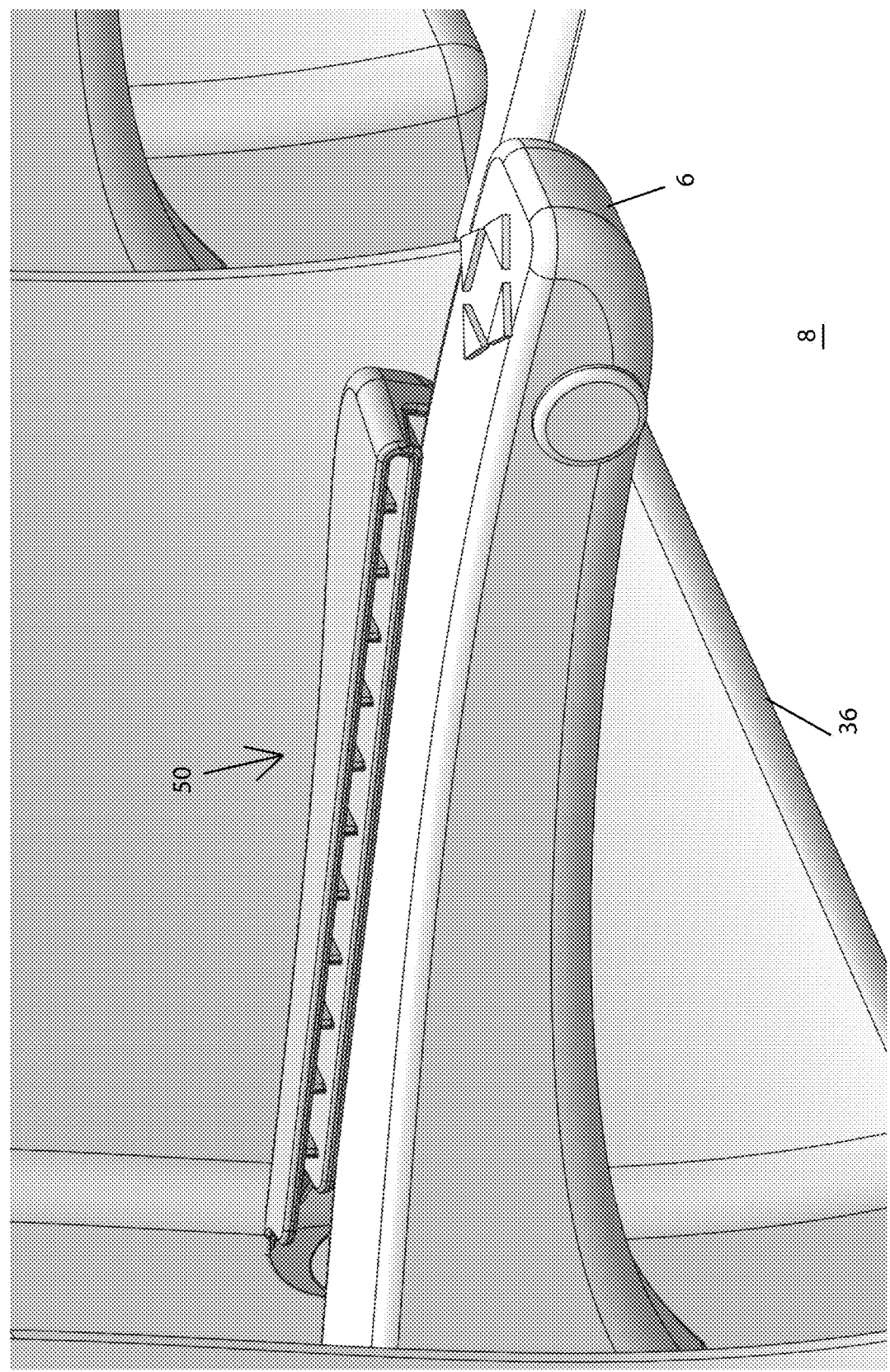
FIG. 39 is a perspective view of the first portion of the armrest divider of the present invention shown in FIGS. 24-38, taken from the second lateral side thereof, and illustrating the first portion of the armrest divider mounted on the armrest of a passenger's seat.
Figure 40:
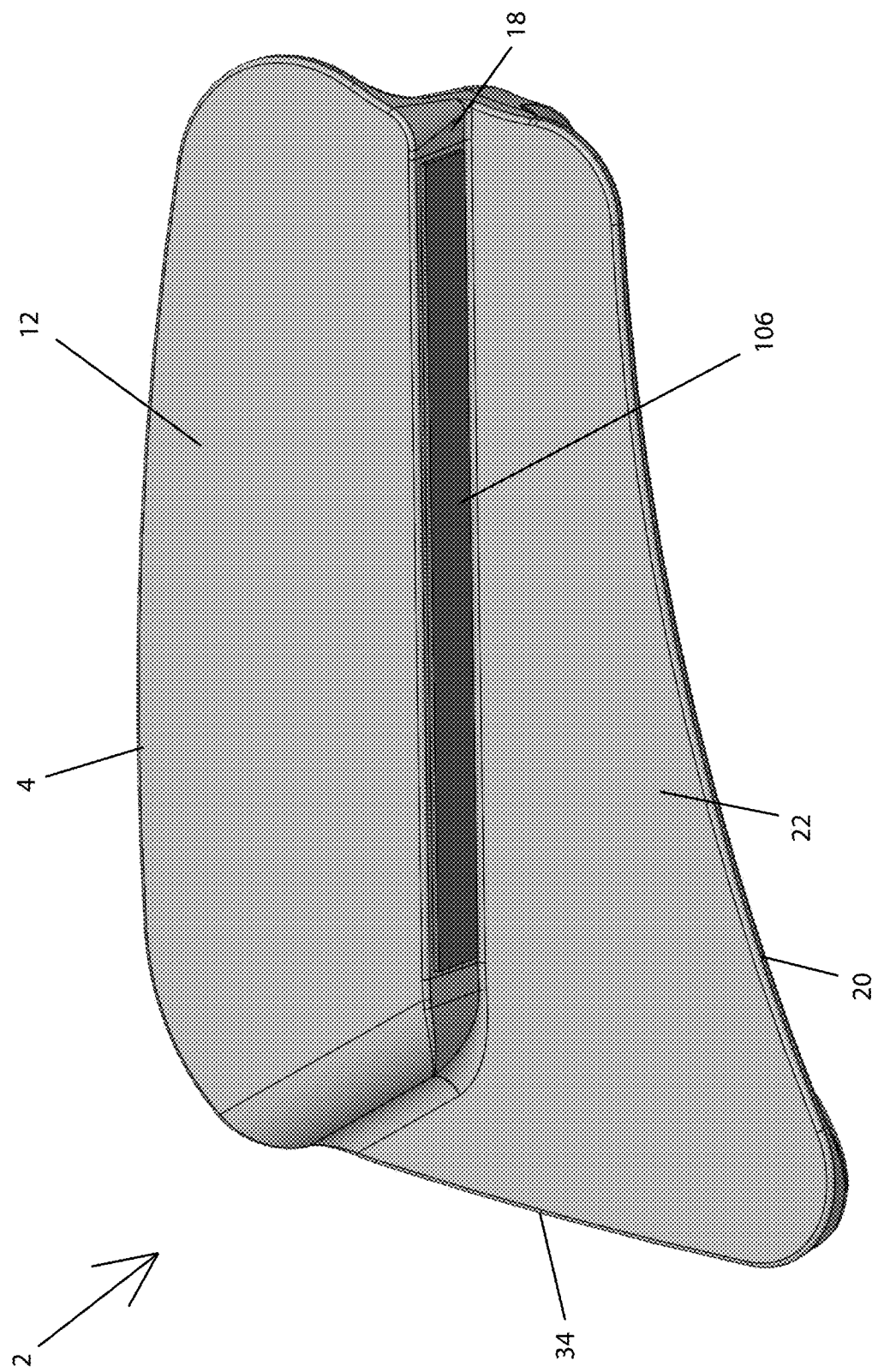
FIG. 40 is a bottom perspective view of the armrest divider of the present invention shown in FIGS. 1-23, and illustrating the addition of a bar or strip magnet to the underside of the ledge portion thereof.
Figure 41:
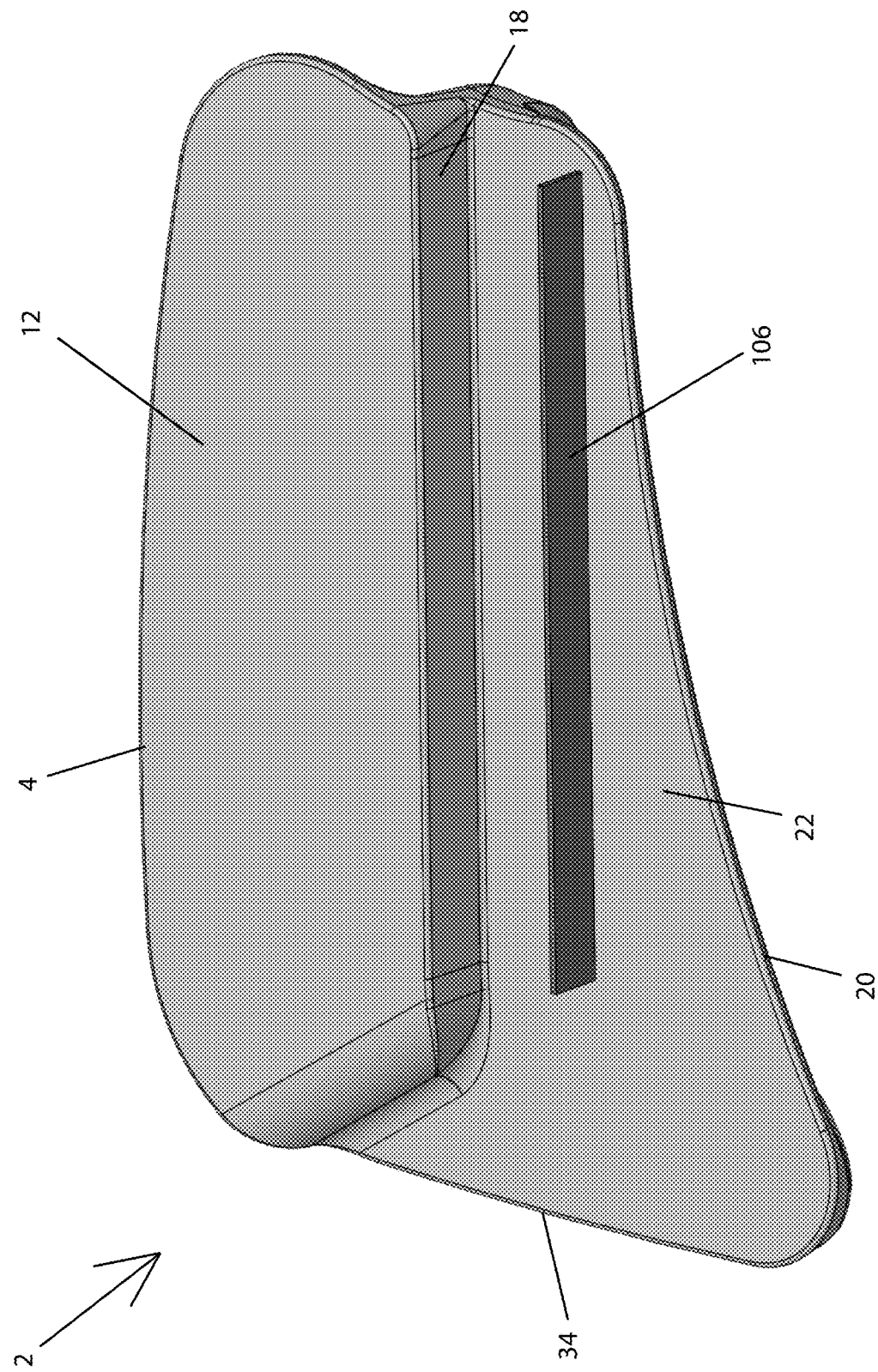
FIG. 41 is an exploded bottom perspective view of the armrest divider of the present invention shown in FIG. 40.

When the armrest divider 2 is used as a whole, that is, with both the barrier section 52 and the arm support section 50, the lower surface of the planar mid-portion 86 of the barrier section 52 will rest on the armrest 6 of the passenger's seat 8. However, and as mentioned previously, it is possible to just use the arm support section 50 of the armrest divider 2 alone. When used in this manner, the underside of the lower wall 72 of the ledge 58 rests on the armrest 6 of the passenger seat 8, with the proximal end 62 of the arm support section 50, having the protruding dome 66 formed thereon, being inserted between the armrest 6 and the backrest 36 of the passenger seat 8, such is shown in FIGS. 38 and 39 of the drawings. It should be noted, and as clearly shown in FIG. 39, that the upper wall 70 and lower wall 72 of the ledge 58 of the arm support section 50, when used alone, are spaced apart sufficiently to provide a height or thickness to the ledge 58 of preferably about 7/16 inches, on the second lateral side 56 of the arm support section 50, which is sufficient to create a short barrier that an adjacent passenger can feel.

The armrest divider 2 of the present invention will now be further described. With respect to the non-extendable version of the armrest divider 2 shown in FIGS. 1-23 of the drawings, the armrest divider 2 is removably mountable on an armrest 6 of a seat 8 in which a person may sit, the seat 8 having a seating portion 45 and a backrest 36 having a front surface 47 and situated in proximity to the seating portion 45, the armrest 6 and backrest 36 of the seat 8 defining a space 48 therebetween for receiving a portion of the armrest divider 2. The armrest divider 2 includes:

a planar barrier portion 4, the barrier portion 4 being disposed vertically when the armrest divider 2 is mounted on the armrest 6 of the seat 8, the barrier portion 4 having an inner lateral side 10 and an outer lateral side 12 disposed opposite the inner lateral side 10;

a ledge portion 14, the ledge portion 14 being joined to and extending outwardly from and generally perpendicularly to the inner lateral side 10 of the barrier portion 4, the ledge portion 14 having a distal free edge 26 situated opposite to where the ledge portion 14 is joined to the inner lateral side 10 of the barrier portion 4, the ledge portion 14 being a generally planar member having an upper wall 16 and a lower wall 18 disposed opposite the upper wall 16, the upper wall 16 functioning as a substitute armrest for a person using the armrest divider 2, the lower wall 18 functioning as a supporting surface for removably mounting the armrest divider 2 on the armrest 6 of the seat 8;

a side support member 20, the side support member 20 having a generally planar shape and extending downwardly from and generally perpendicularly to the lower wall 18 of the ledge portion 14, the side support member 20 having an outer lateral side surface 22 and an inner lateral side surface 24 disposed opposite the outer lateral side surface 22, the side support member 20 extending along at least a portion of the longitudinal length of the ledge portion 14;

a locking wedge section 34, the locking wedge section 34 being a generally planar member joined to and extending rearwardly and outwardly from the side support member 20, the locking wedge section 34 being configured to be inserted and wedged in the space 48 defined by and between the armrest 6 and the backrest 36 of the seat 8 when the armrest divider 2 is mounted on the armrest 6; and a stop protrusion 38, the stop protrusion 38 being formed as a protruding member which extends outwardly and generally perpendicularly from the inner lateral side surface 24 of the side support member 20, the stop protrusion 38 being disposed generally where the locking wedge section 34 joins the side support section 20, wherein the stop protrusion 38 is configured to contact the front surface 47 of the backrest 36 of the seat 8 when the armrest divider 2 is mounted on the armrest 6 of the seat 8 to prevent the locking wedge section 34 from being inserted more than a predetermined depth into the space 48 defined by the armrest 6 and the backrest 36 of the seat 8.

The armrest divider 2 of the present invention may further include at least one cushion 17, the at least one cushion 17 being affixed to the upper wall 16 of the ledge portion 14, the at least one cushion 17 providing added comfort for a person using the armrest divider 2 and resting his arm on the ledge portion 14 of the armrest divider 2. Alternatively, or in addition, the armrest divider 2 may include at least one member 19 formed of cushioning material, the at least one cushioning material member 19 being affixed to at least a portion of the inner lateral side 10 of the barrier portion 4 to provide added comfort to the user of the armrest divider 2.

Preferably, the side support member 20 is disposed on the ledge portion 14 so as to extend downwardly from the lower wall 18 of the ledge portion 14 about midway between where the ledge portion 14 joins the inner lateral side 10 of the barrier portion 4 and the distal free edge 26 of the ledge portion 14. Also, in one form of the armrest divider 2, at least the upper section of the ledge portion 14 is formed from a material which is softer than the material from which the barrier portion 4 is formed to provide added comfort to the user of the armrest divider 2 when the user rests his arm on the ledge portion 14.

In a preferred form of the armrest divider 2, the ledge portion 14 extends outwardly from the inner lateral side 10 of the barrier portion 4 a distance which is about two inches to about four inches in order to provide support for an arm or an elbow of a person using the armrest divider 2 when the armrest divider 2 is mounted on the armrest 6 of the seat 8. Additionally, preferably, the side support member 20 extends about three inches to about six inches from and below the ledge portion 14. Preferably, the overall longitudinal length of the armrest divider 2, from one end of one of the ledge portion 14 and the barrier portion 4 to the opposite end of the locking wedge section 34 is about twelve inches to about eighteen inches.

In yet another form, the locking wedge section 34 of the armrest divider 2 generally resides in substantially the same plane in which the side support member 20 generally resides, and the locking wedge section 34 is formed as a thickened rear portion of the side support member 20. Alternatively, the locking wedge section 34 is offset laterally from the plane in which the side support member 20 generally resides.

In yet another preferred form, the armrest divider 2 further includes an upper back wall 40 and a lower back wall 42, the lower back wall 42 being joined to the lower wall 18 of the ledge portion 14 and the inner lateral side surface 24 of the side support member 20, and further being joined to the stop protrusion 38, the lower back wall 42 extending generally perpendicularly from the ledge portion 14 and side support member 20 and defining with the lower wall 18 of the ledge portion 14 a lower corner 44, the upper back wall 40 being joined to the inner lateral side 10 of the barrier portion 4 and the upper wall 16 of the ledge portion 14 and further extending generally perpendicularly to the ledge portion 14 and the barrier portion 4 to define an upper corner 46 therewith. Preferably, the lower corner 44 is one of rounded and curved, and the upper corner 46 is one of rounded and curved. Also, the upper back wall 40 is preferably rearwardly inclined with respect to the upper wall 16 of the ledge portion 14 to define an obtuse angle of inclination therewith at the upper corner 46, wherein the angle of inclination of the upper back wall 40 with respect to the upper wall 16 of the ledge portion 14 is preferably between about 105 degrees and about 135 degrees.

Also, in accordance with the present invention, two armrest dividers 2 may be used. More specifically, a first armrest divider 2 having the structure described previously and a second armrest divider 2 also having the structure described previously may be used. The first armrest divider 2 is structured as a mirror image of the second armrest divider 2 so that the first armrest divider 2 and the second armrest divider 2 may be used on armrests 6 disposed on opposite lateral sides of the seat 8.

With respect to the extendable version of the armrest divider 2 shown in FIGS. 24-39 of the drawings, the armrest divider 2 is removably mountable on an armrest 6 of a seat 8 in which a person may sit, the seat 8 having a seating portion 45 and a backrest 36 having a front surface 47 and situated in proximity to the seating portion 45, the armrest 6 and the backrest 36 of the seat 8 defining a space 48 therebetween for receiving a portion of the armrest divider 2. The extendable armrest divider 2 includes:

an arm support section 50 and a barrier section 52 adjustably mounted to the arm support section 50. The arm support section 50 of the armrest divider 2 includes the following components:

a first lateral side 54 and a second lateral side 56 disposed opposite the first lateral side 54, and a distal end 64 and a proximal end 62 disposed longitudinally opposite the distal end 64;

a ledge portion 58 configured to act as a support for a user of the armrest divider 2 on which the user may rest his arm, the ledge portion 58 being in a generally horizontal disposition when the armrest divider 2 is mounted on the armrest 6 of the seat 8, the ledge portion 58 including an upper wall 70 and a lower wall 72 disposed opposite and below the upper wall 70, the upper wall 70 and the lower wall 72 being separated from each other on the second lateral side 56 of the arm support section 50 and being joined together on the first lateral side 54 of the arm support section 50, the ledge portion 58 having a plurality of laterally extending internal ribs 74 spaced apart from each other periodically along at least a portion of the longitudinal length of the arm support section 50 between the upper wall 70 and the lower wall 72 of the ledge portion 58, whereby adjacent ribs 74 and the upper and lower walls 70,72 of the ledge portion 58 of the arm support section 50 define a plurality of individual sockets 76;

a generally planar, first side support member 60, the first side support member 60 being joined to and extending outwardly and downwardly from the lower wall 72 of the ledge portion 58;

a first protruding dome 66 disposed on the first side support member 60 of the arm support section 50 and in proximity to the longitudinal proximal end 68 of the arm support section 50, the first protruding dome 66 being configured to be inserted and wedged in the space 48 defined by and between the armrest 6 and the backrest 36 of the seat 8 when the armrest divider 2 is mounted on the armrest 6; and a first stop protrusion 68, the first stop protrusion 68 being formed as a protruding member which extends outwardly and generally perpendicularly from the first lateral side 54 of the arm support section 50, the first stop protrusion 68 being disposed generally in proximity to the longitudinal proximal end 68 of the arm support section 50 near the first protruding dome 66, the first stop protrusion 68 being configured to contact the front surface 47 of the backrest 36 of the seat 8 when the armrest divider 2 is mounted on the armrest 6 of the seat 8 to prevent the first protruding dome 66 from being inserted more than a predetermined depth into the space 48 defined by the armrest 6 and the backrest 36 of the seat 8.

The barrier section 52 of the armrest divider 2 includes the following components:

a first lateral side 82 and a second lateral side 84 disposed opposite the first lateral side 82, and a distal end 91 and a proximal end 92 disposed longitudinally opposite the distal end 91;

a generally planar mid-portion 86, the planar mid-portion 86 having a longitudinally extending first lateral end 87 and a longitudinally extending second lateral end 89 situated opposite the first lateral end 87;

a generally planar barrier wall 88 extending upwardly from and perpendicularly to the planar mid-portion 86 at the second lateral end 89 of the planar mid-portion 86;

a generally planar, second side support member 90 extending downwardly from and perpendicularly to the planar mid-portion 86 at the first lateral end 87 of the planar mid-portion 86;

a plurality of spaced apart fingers 78 arranged in a planar row and extending perpendicularly outwardly from the barrier wall 88 and spaced above the planar mid-portion 86 of the barrier section 52, the fingers 78 being receivable in the sockets 76 formed in the ledge portion 58 of the arm support section 50 so that the arm support section 50 may be adjusted longitudinally on the barrier section 52 to increase or decrease the overall longitudinal length of the armrest divider 2;

a second protruding dome 94 disposed in proximity to the longitudinal proximal end 92 of the barrier section 52 and being situated on the second side support member 90 of the barrier section 52; and a second stop protrusion 96, the second stop protrusion 96 being formed as a protruding member joined to the second side support member 90 of the barrier section 52 and extending outwardly and generally perpendicularly from the first lateral side 82 of the barrier section 52, the second stop protrusion 96 being disposed generally in proximity to the second protruding dome 94 of the barrier section 52 and near the longitudinal proximal end 92 of the barrier section 52.

This version of the armrest divider 2 is adjustable in longitudinal length to provide more comfort for the user of the armrest divider 2. The arm support section 50 is repositionable on the barrier section 52 longitudinally so that the fingers 78 of the barrier section 52 may be received in different sockets 76 formed in the ledge portion 58 of the arm support section 50. The armrest divider 2 is configurable in an extended state and in a non-extended state wherein, when the armrest divider 2 is configured in an extended state, the longitudinal proximal end 92 of the barrier section 52, with the second protruding dome 94 formed thereon, is configured to be receivable in the space 48 defined between the armrest 6 and the backrest 36 of the seat 8 to help secure the armrest divider 2 in place on the seat 8, the second stop protrusion 96 of the barrier section 52 being configured to contact the front surface 47 of the backrest 36 of the seat 8 when the armrest divider 2 in the extended state is mounted on the armrest 6 of the seat 8 to prevent the second protruding dome 94 of the barrier section 52 from being inserted more than a predetermined depth into the space 48 defined by the armrest 6 and the backrest 36 of the seat 8, and wherein, when the armrest divider 2 is configured to be in a non-extended state, the longitudinal proximal end 62 of the arm support section 50, with the first protruding dome 66 formed thereon, is configured to be receivable in the space 48 defined between the armrest 6 and the backrest 36 of the seat 8 to help secure the armrest divider 2 in place on the seat 8, the first stop protrusion 68 of the arm support section 50 being configured to contact the front surface 47 of the backrest 36 of the seat 8 when the armrest divider 2 in the non-extended state is mounted on the armrest 6 of the seat 8 to prevent the first protruding dome 66 of the arm support section 50 from being inserted more than a predetermined depth into the space 48 defined by the armrest 6 and the backrest 36 of the seat 8. When both the barrier section 52 and the arm support section 50 of the armrest divider 2 are mated together during use, the planar mid-portion 86 of the barrier section 52 will rest on the armrest 6 of the seat 8.

The extendable version of the armrest divider 2 may further include at least one cushion 17, the at least one cushion 17 being affixed to the upper wall 70 of the ledge portion 58, the at least one cushion 17 providing added comfort for a person using the armrest divider 2 and resting his arm on the ledge portion 58 of the armrest divider 2. Additionally, or alternatively, the extendable armrest divider 2 further includes at least one member 19 formed of cushioning material, the at least one cushioning material member 19 being affixed to at least a portion of the barrier wall 88 of the barrier section 52 on the first lateral side 82 thereof to provide added comfort to the user of the armrest divider 2.

Preferably, with respect to the extendable armrest divider 2, the arm support section 50 is detachable from the barrier section 52 and may be used without the barrier section 52. Furthermore, the first side support member 60 of the arm support section 50 extends downwardly from the lower wall 72 of the ledge portion 58 about midway relative to the transverse width of the ledge portion 58 so that a section of the lower wall 72 of the ledge portion 58 extends transversely outwardly beyond the first side support member 60 so as to be configured to rest on and be supported by the armrest 6 of the seat 8 when the arm support section 50 of the armrest divider 2 is used without the barrier section 52.

Preferably, the first side support member 60 of the extendable armrest divider 2 extends longitudinally on the arm support section 50 substantially from the longitudinal proximal end 62 of the arm support section 50 substantially to the opposite longitudinal distal end 64 of the arm support section 50. Furthermore, in another preferred form of the extendable armrest divider 2, the first protruding dome 66 of the arm support section 50 has a generally convex oval shape that extends outwardly on the arm support section 50 from the first lateral side 54 thereof, and/or the second protruding dome 94 of the barrier section 52 has a generally convex oval shape that extends outwardly on the barrier section 52 from the first lateral 82 side thereof.

Also, preferably, the adjacent ribs 74 of the ledge portion 58 of the arm support section 50 are spaced apart about three-quarters of an inch, and/or each of the fingers 78 of the barrier section 52 includes a centerline, and wherein the centerlines of adjacent fingers 78 are spaced apart about three-quarters of an inch.

In yet another preferred form of the extendable armrest divider 2, the first stop protrusion 68 of the arm support section 50 defines a first concavity 102 on the second lateral side 56 of the arm support section 50, and the first protruding dome 66 of the arm support section 50 defines a second concavity 104 on the second lateral side 56 of the arm support section 50. The second stop protrusion 96 on the barrier section 52 is smaller in dimensions than the first stop protrusion 68 of the arm support section 50 so that, when the arm support section 50 is mated to the barrier section 52, with the first lateral side 82 of the barrier section 52 being situated adjacent to the second lateral side 56 of the arm support section 50, and with the armrest divider 2 in a non-extended state, the second stop protrusion 96 of the barrier section 52 is at least partially receivable in the first concavity 102 defined by the first stop protrusion 68 of the arm support section 50 on the second lateral side 56 thereof, and the second protruding dome 94 of the barrier section 52 is at least partially receivable in the second concavity 104 defined by the first protruding dome 66 of the arm support section 50 on the second lateral side 56 thereof.

Preferably, each finger 78 of the barrier section 52 includes a bump protrusion 100 formed on a surface thereof configured to provide a friction or interference fit with one of the upper wall 70 and the lower wall 72 of the ledge portion 58 of the arm support section 50 when the fingers 78 are received by respective sockets 76 of the ledge portion 58.

In yet another preferred form of the extendable armrest divider 2, the arm support section 50 is detachable from the barrier section 52 and may be used without the barrier section 52, and the first side support member 60 of the arm support section 50 extends downwardly from the lower wall 72 of the ledge portion 58 about midway relative to the transverse width of the ledge portion 58 so that a section of the lower wall 72 of the ledge portion 58 extends transversely outwardly beyond the first side support member 60 so as to be configured to rest on and be supported by the armrest 6 of the seat 8 when the arm support section 50 of the armrest divider 2 is used without the barrier section 52, with the proximal end 62 of the arm support section 50 having the first protruding dome 66 formed thereon being insertable in the space 48 defined by the armrest 6 and the backrest 36 of the seat 8.

Also, in accordance with the present invention, two extendable armrest dividers 2 may be used. More specifically, a first extendable armrest divider 2 having the structure described previously and a second extendable armrest divider 2 also having the structure described previously may be used. The first armrest divider 2 is structured as a mirror image of the second armrest divider 2 so that the first armrest divider 2 and the second armrest divider 2 may be used on armrests 6 disposed on opposite lateral sides of the seat 8.

FIGS. 40-45 of the drawings illustrate another version of the non-extendable armrest divider 2 of the present invention shown in FIGS. 1-23. Similarly, FIGS. 46-51 of the drawings illustrate yet another version of the extendable armrest divider 2 of the present invention shown in FIGS. 24-39.

In these versions of the extendable and non-extendable armrest dividers 2, one or more magnets 106, such as in the form of a flexible or inflexible bar or strip magnet, or a plurality of individual magnets, may be affixed by using an adhesive or fasteners on the lower wall 18 of the ledge portion 14, for the non-extendable armrest divider 2, or on the underside of the mid-portion 86 of the barrier section 52, for the extendable armrest divider 2. Some armrests 6 of passenger, stadium or theater seats 8, or other seating, may be formed of a ferrous metal or other magnetically attractable material. The magnets 106 on the extendable and non-extendable armrest dividers 2 of the present invention will aid in removably attaching and securing the armrest divider 2 to an armrest 6 of a seat 8 by magnetic attraction with the armrest 6.

Figure 44:
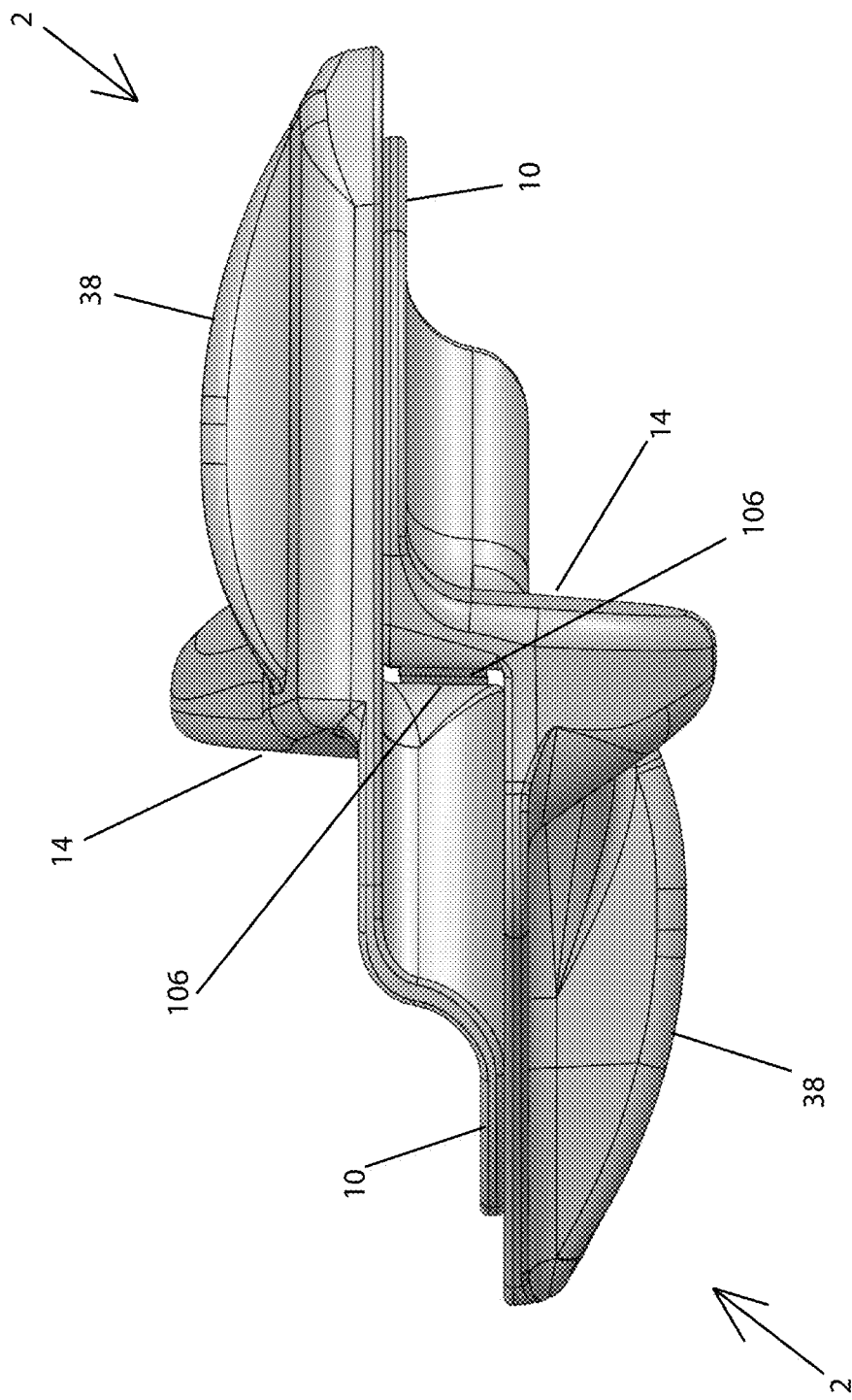
FIG. 44 is an end view of a pair of first and second armrest dividers formed in accordance with the present invention and shown in FIGS. 1-23 and 40-43, the first armrest divider being structured as a mirror image of the second armrest divider, each armrest divider having a bar or strip magnet attached to the underside of the ledge portion, the first and second armrest dividers of the present invention being shown as being detachably joined together by magnetic attraction.
Figure 45:
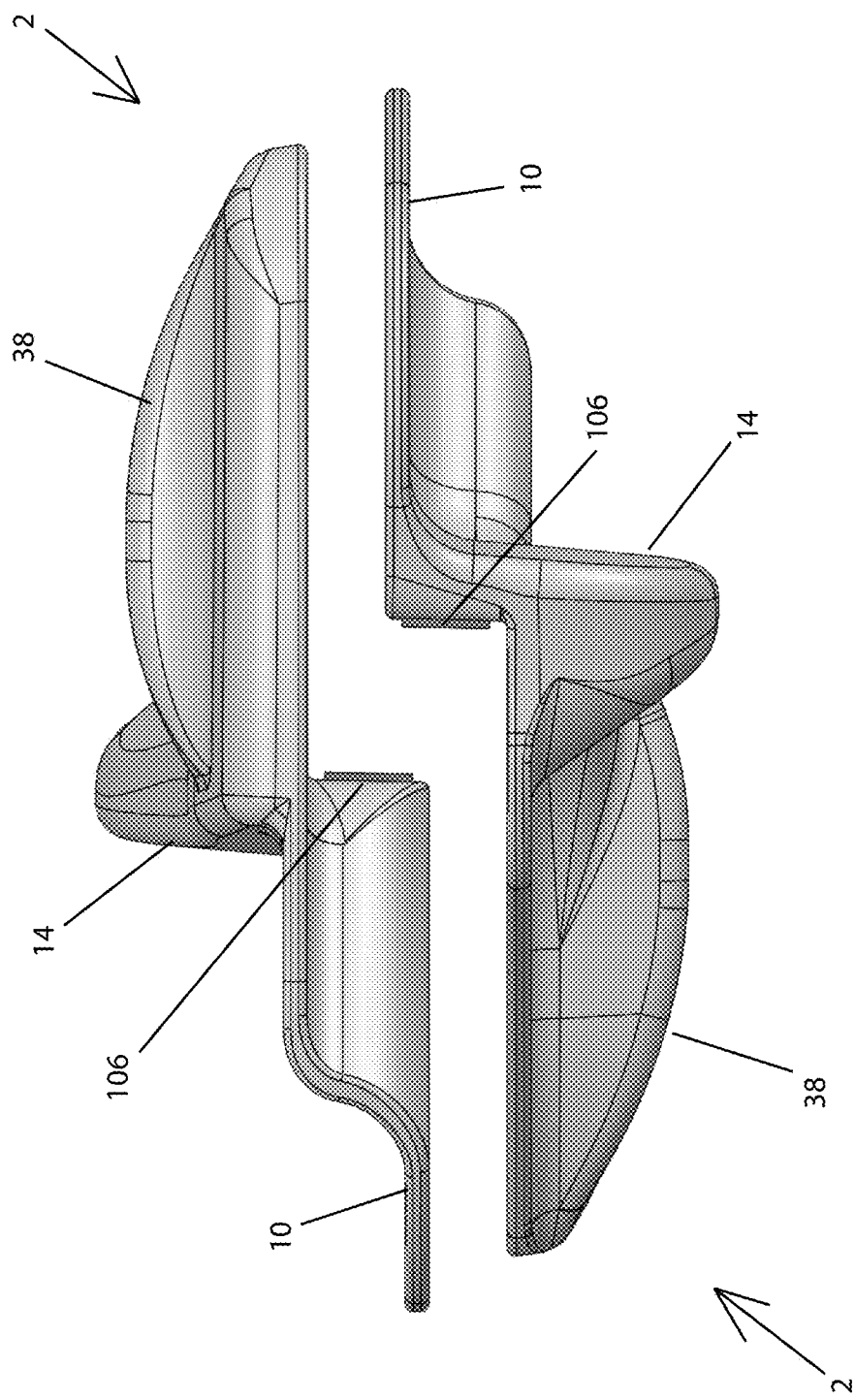
FIG. 45 is a partially exploded end view of a pair of first and second armrest dividers formed in accordance with the present invention and shown in FIGS. 40-44, and illustrating the orientation of the first and second armrest dividers before they are joined together by magnetic attraction.
Figure 46:
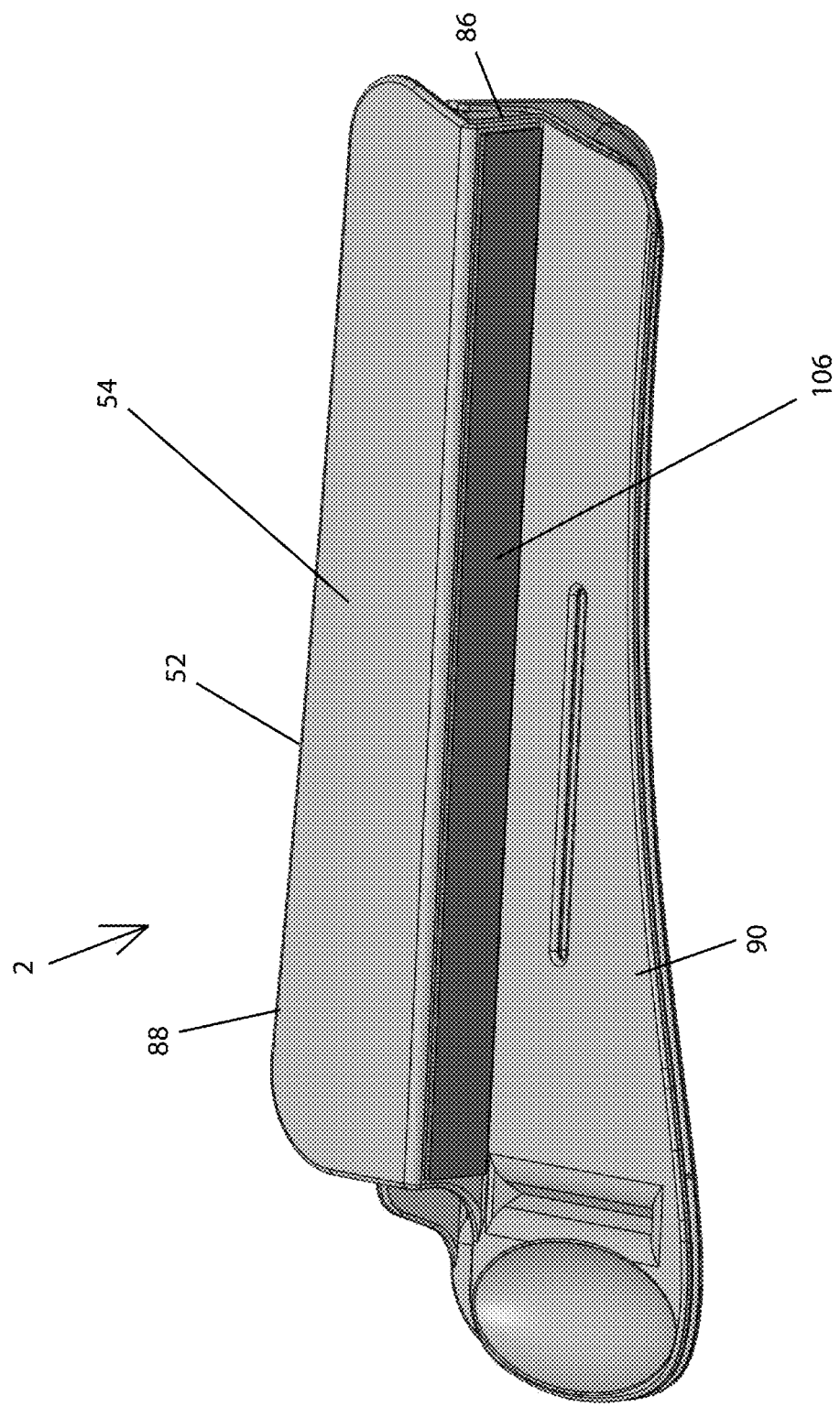
FIG. 46 is a bottom perspective view of the armrest divider of the present invention shown in FIGS. 24-39, and illustrating the addition of a bar or strip magnet to the underside of the mid-portion of the barrier section thereof.
Figure 47:
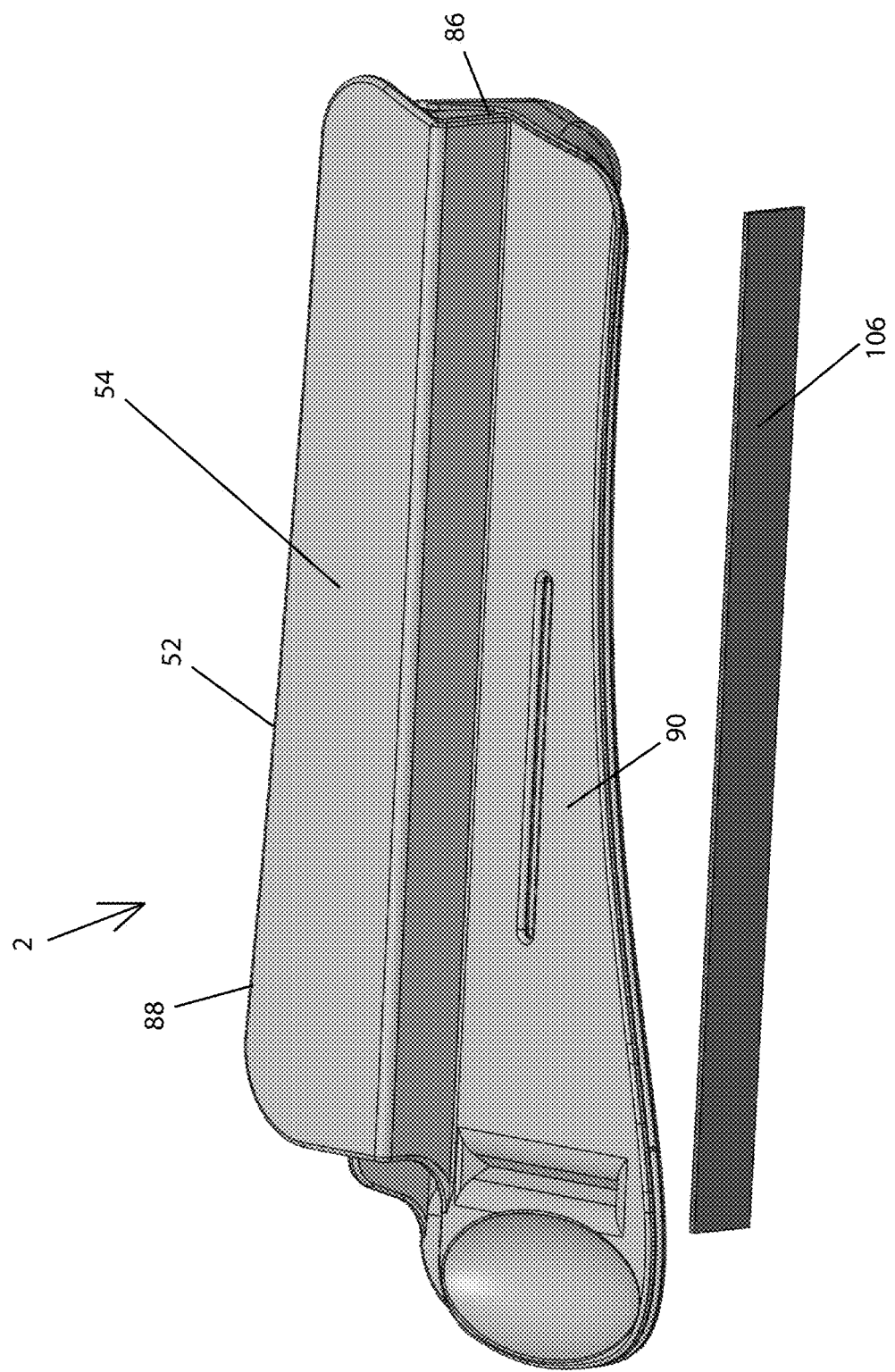
FIG. 47 is a partially exploded bottom perspective view of the armrest divider of the present invention shown in FIG. 46.

Furthermore, as mentioned previously, two armrest dividers 2, structured as mirror images of one another, may be used for armrests 6 situated on the left lateral side and the right lateral side of a seat 8. The left and right armrest dividers 2 may be conveniently held together when not in use by orienting one of the pair of left and right armrest dividers 2 180 degrees longitudinally with respect to the other armrest divider 2 of the pair, and positioning the armrest dividers 2 of the pair such that their magnets 106 face one another in opposite polarity. The magnets 106 of the armrest dividers 2 of the pair will attract and engage one another to conveniently hold the pair of armrest dividers 2 together when not in use, the armrest dividers 2 of the pair being easily forcibly separable when required for use and placement on the armrests 6 of a seat 8. Such an arrangement of a pair of armrest dividers 2, held together by magnetic attraction, is illustrated by FIGS. 44 and 45 of the drawings for the non-extendable armrest divider 2 and FIGS. 50 and 51 for the extendable armrest divider 2.

Figure 42:
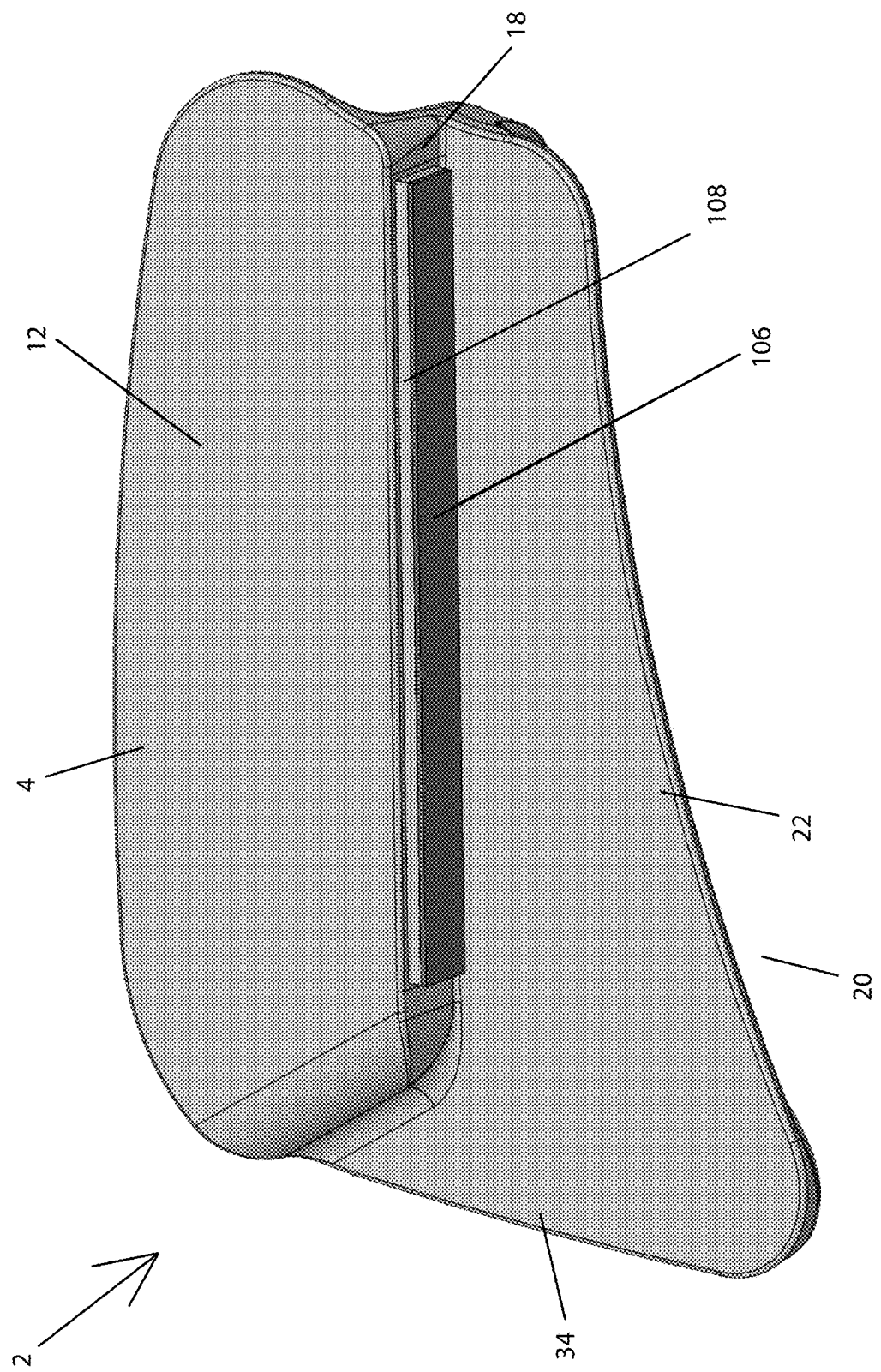
FIG. 42 is a bottom perspective view of the armrest divider of the present invention shown in FIGS. 1-23, and illustrating the addition of a bar or strip magnet and cushioning material to the underside of the ledge portion thereof.
Figure 43:
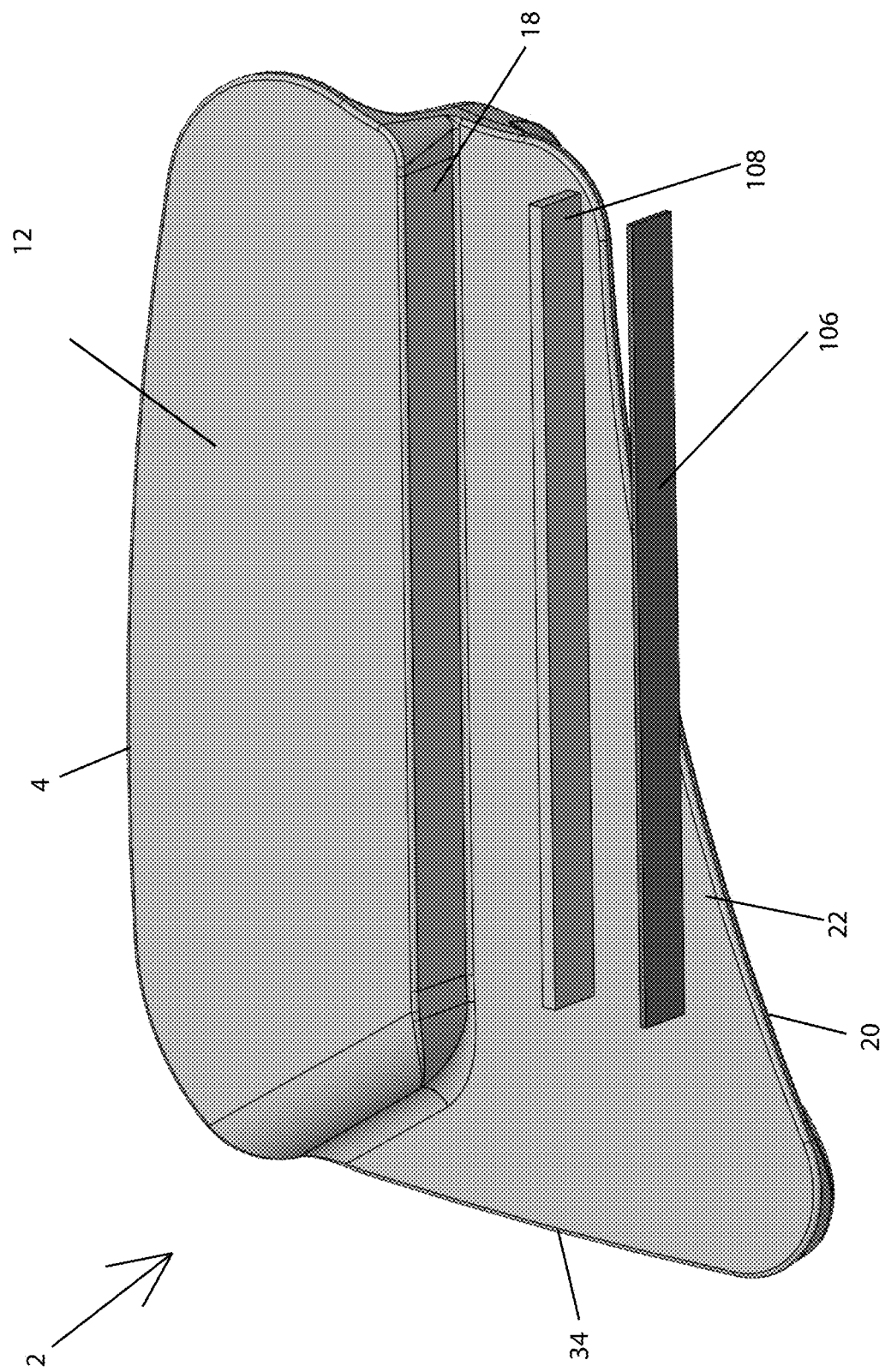
FIG. 43 is an exploded bottom perspective view of the armrest divider of the present invention shown in FIG. 42.
Figure 48:
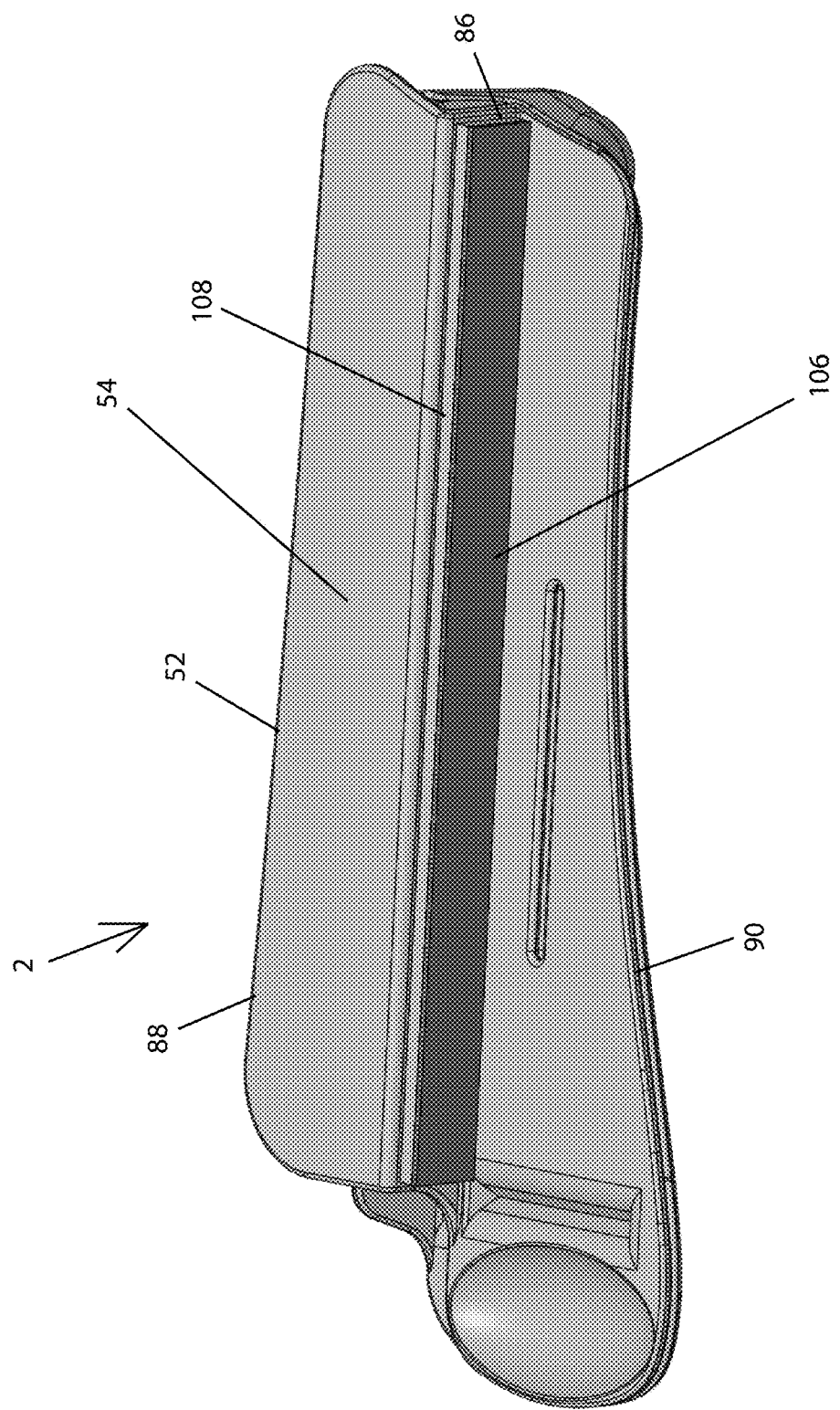
FIG. 48 is a bottom perspective view of the armrest divider of the present invention shown in FIGS. 24-39, and illustrating the addition of a bar or strip magnet and cushioning material to the underside of the mid-portion of the barrier section thereof.
Figure 49:
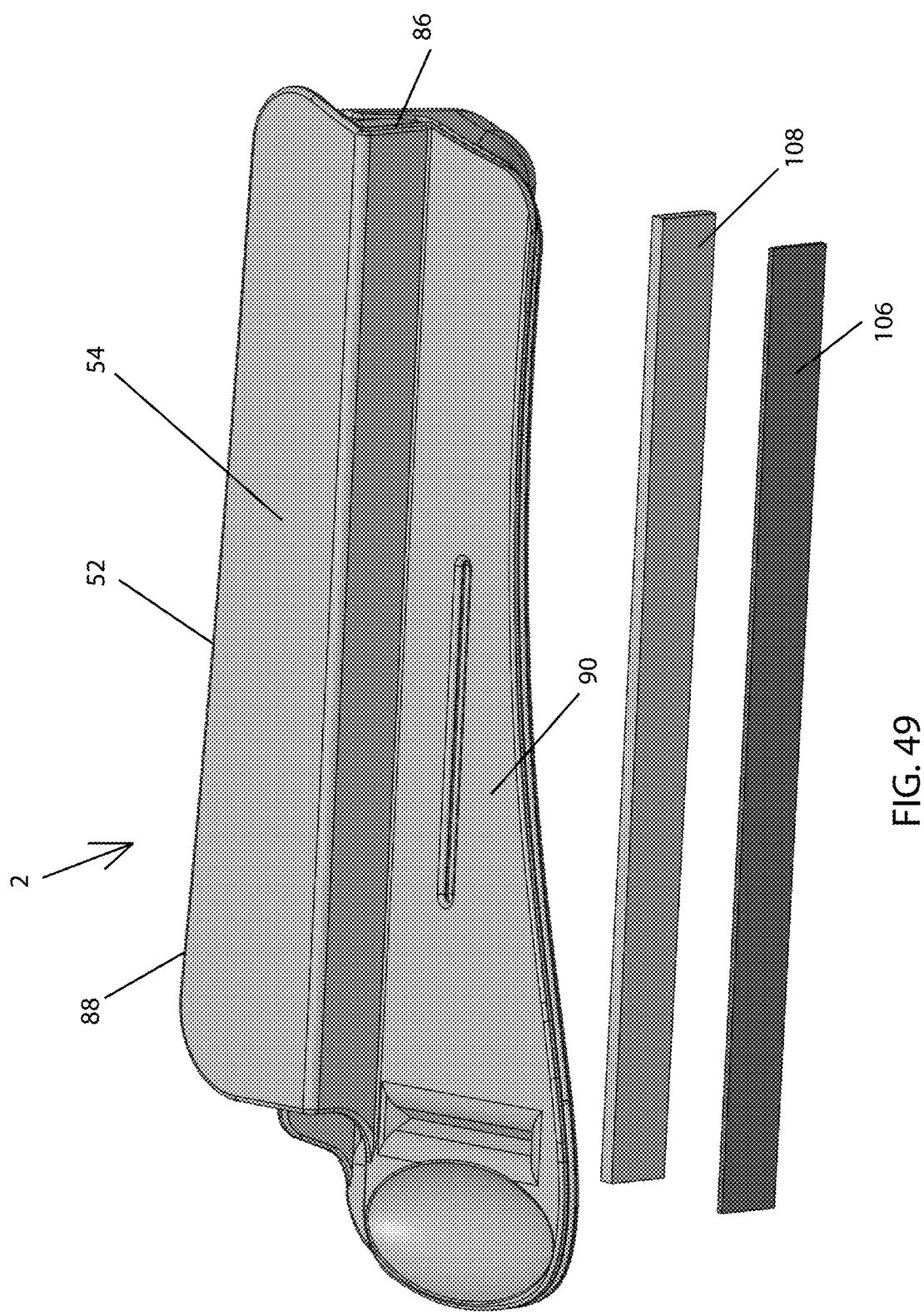
FIG. 49 is a partially exploded bottom perspective view of the armrest divider of the present invention shown in FIG. 48.
Figure 50:
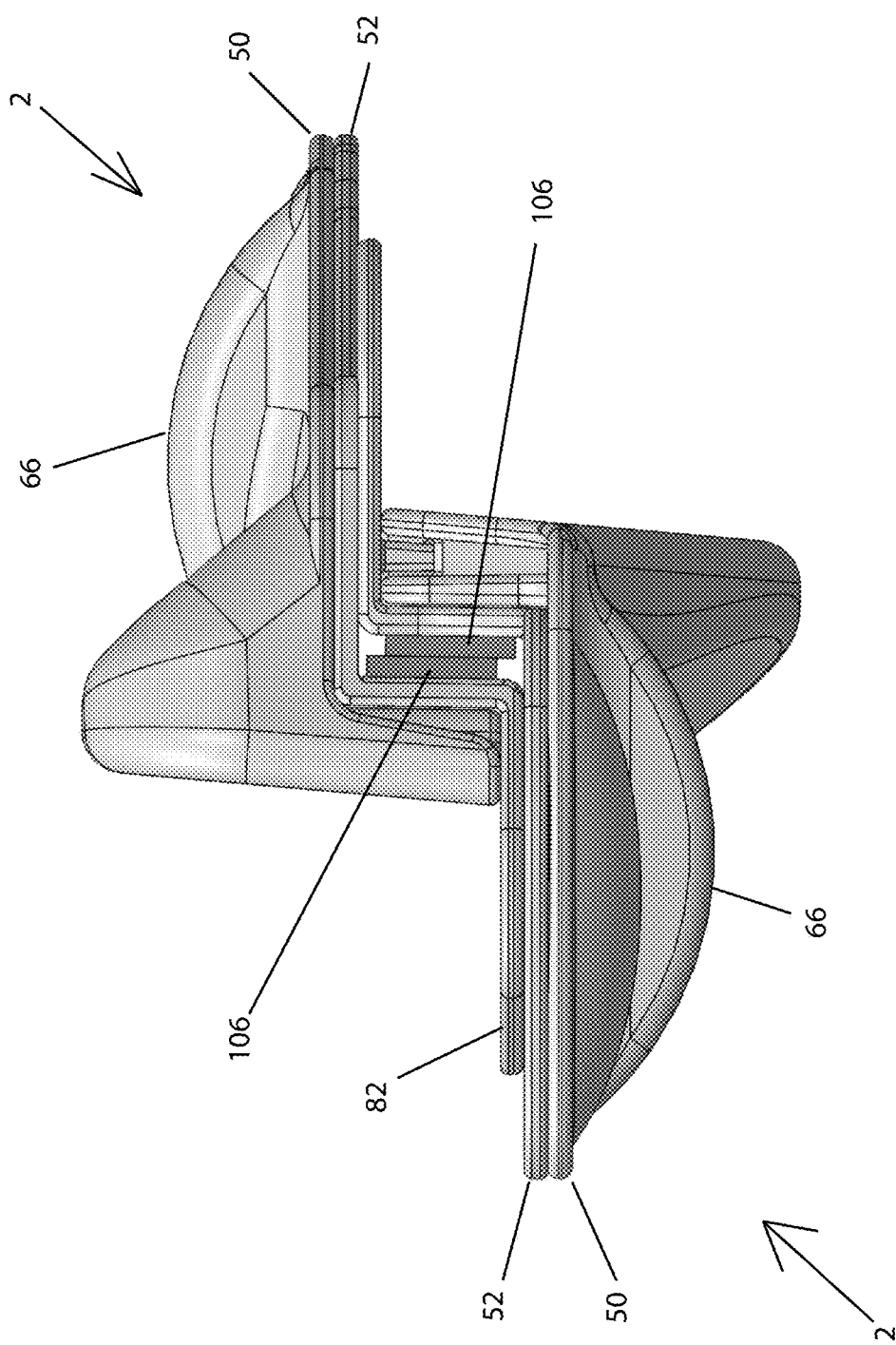
FIG. 50 is an end view of a pair of first and second armrest dividers formed in accordance with the present invention and shown in FIGS. 24-39 and 46-49, the first armrest divider being structured as a mirror image of the second armrest divider, each armrest divider having a bar or strip magnet attached to the underside of the mid-portion of the barrier section thereof, the first and second armrest dividers of the present invention being shown as being detachably joined together by magnetic attraction.
Figure 51:
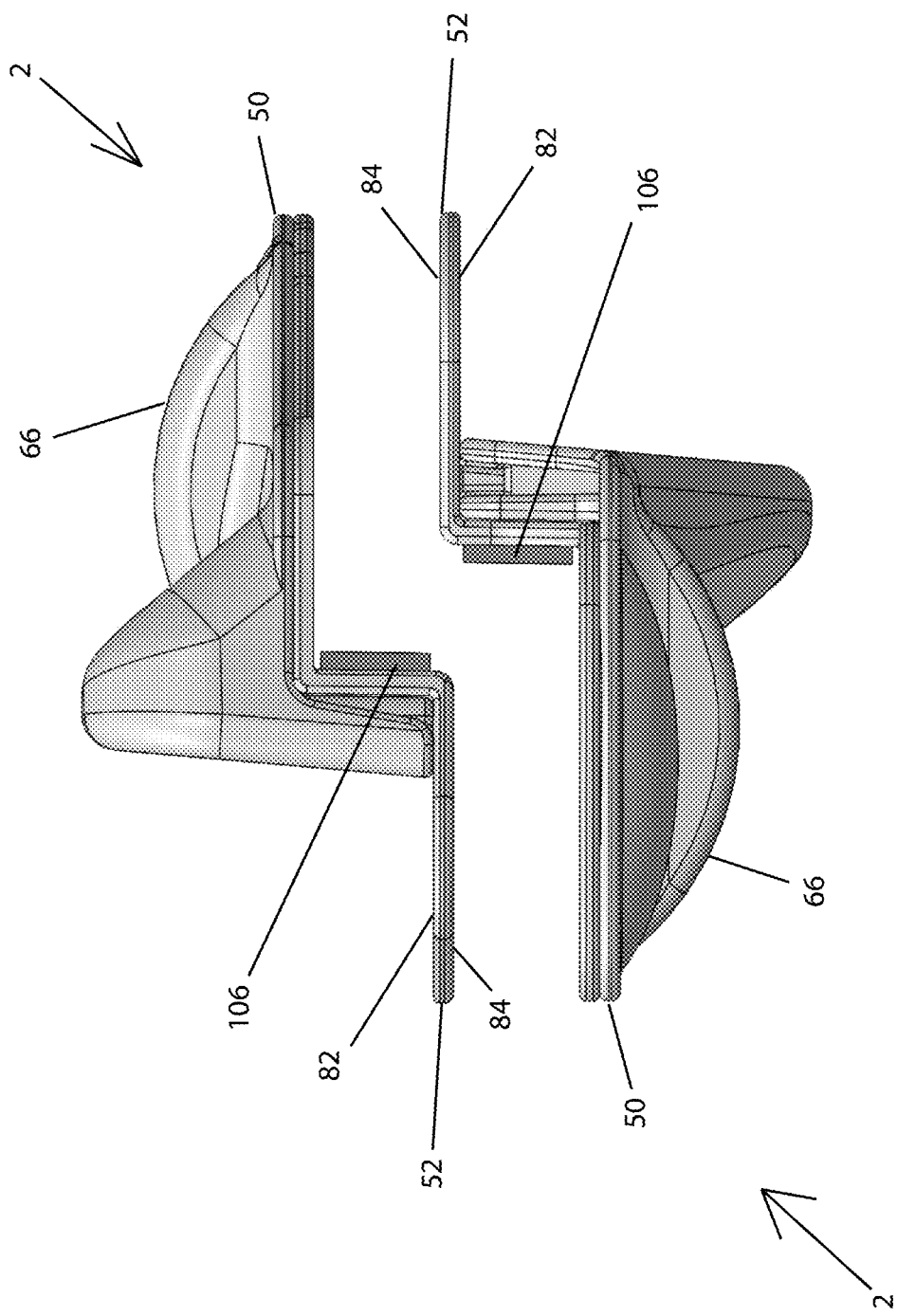
FIG. 51 is a partially exploded end view of a pair of first and second armrest dividers formed in accordance with the present invention and shown in FIGS. 46-50, and illustrating the orientation of the first and second armrest dividers before they are joined together by magnetic attraction.

Additionally, a foam pad 108 or other cushioning material may be positioned between the magnets 106 and either the lower wall 18 of the ledge portion 14 of the non-extendable armrest divider 2, as shown in FIGS. 42 and 43 of the drawings, and the underside surface of the mid-portion 86 of the barrier section 52 of the extendable armrest divider 2, as shown in FIGS. 48 and 49, or may be included on the armrest dividers 2 without the magnets 106. This foam pad 108 adds more comfort to the user of the armrest divider 2, especially when the armrest 6 on which the divider 2 is used is constructed of metal or some other hard, unpadded material. The foam pad 108 may be affixed to the lower wall 18 of the ledge portion 14 or the underside surface of the mid-portion 86 of the barrier section 52 of the non-extendable and extendable armrest dividers 2, respectively, by using an adhesive or fasteners, with the magnet or magnets 106 affixed to the foam pad 108 also by using an adhesive or fasteners. As mentioned above, the foam pads 108 may be included on the armrest dividers 2 without the magnets 106. In such a situation, the foam pad 108, being resilient and resting directly on the armrest 6, will conform to any screw heads or other non-flat or non-planar surfaces on the armrest 6 and will help prevent the armrest divider 2 from rocking on the non-flat or non-planar surface of the armrest 6 on which it is mounted.

Although the armrest divider 2 of the present invention is primarily described herein for use on airplanes, trains, buses and other forms of public transportation, it is envisioned to use the armrest divider 2 wherever there is public or private seating having a shared armrest between adjacent seats, such as theatres, stadiums and the like.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An armrest divider removably mountable on an armrest of a seat in which a person may sit, the seat having a seating portion and a backrest having a front surface and situated in proximity to the seating portion, the armrest and backrest of the seat defining a space therebetween for receiving a portion of the armrest divider, the armrest divider comprising:

a planar barrier portion, the barrier portion being disposed vertically when the armrest divider is mounted on the armrest of the seat, the barrier portion having an inner lateral side and an outer lateral side disposed opposite the inner lateral side;

a ledge portion, the ledge portion being joined to and extending outwardly from and generally perpendicularly to the inner lateral side of the barrier portion, the ledge portion having a distal free edge situated opposite to where the ledge portion is joined to the inner lateral side of the barrier portion, the ledge portion being a generally planar member having an upper wall and a lower wall disposed opposite the upper wall, the upper wall functioning as a substitute armrest for a person using the armrest divider, the lower wall functioning as a supporting surface for removably mounting the armrest divider on the armrest of the seat;

a side support member, the side support member having a generally planar shape and extending downwardly from and generally perpendicularly to the lower wall of the ledge portion, the side support member having an outer lateral side surface and an inner lateral side surface disposed opposite the outer lateral side surface, the side support member extending along at least a portion of the longitudinal length of the ledge portion;

a locking wedge section, the locking wedge section being a generally planar member joined to and extending rearwardly and outwardly from the side support member, the locking wedge section being configured to be inserted and wedged in the space defined by and between the armrest and the backrest of the seat when the armrest divider is mounted on the armrest; and a stop protrusion, the stop protrusion being formed as a protruding member which extends outwardly and generally perpendicularly from the inner lateral side surface of the side support member, the stop protrusion being disposed generally where the locking wedge section joins the side support section, wherein the stop protrusion is configured to contact the front surface of the backrest of the seat when the armrest divider is mounted on the armrest of the seat to prevent the locking wedge section from being inserted more than a predetermined depth into the space defined by the armrest and the backrest of the seat.

2. An armrest divider as defined by claim 1, which further comprises:
at least one cushion, the at least one cushion being affixed to the upper wall of the ledge portion, the at least one cushion providing added comfort for a person using the armrest divider and resting his arm on the ledge portion of the armrest divider.

3. An armrest divider as defined by claim 1, which further comprises:
at least one member formed of cushioning material, the at least one cushioning material member being affixed to at least a portion of the inner lateral side of the barrier portion to provide added comfort to the user of the armrest divider.

4. An armrest divider as defined by claim 1, wherein the side support member is disposed on the ledge portion so as to extend downwardly from the lower wall of the ledge portion about midway between where the ledge portion joins the inner lateral side of the barrier portion and the distal free edge of the ledge portion.

5. An armrest divider as defined by claim 1, wherein at least the upper section of the ledge portion is formed from a material which is softer than the material from which the barrier portion is formed to provide added comfort to the user of the armrest divider when the user rests his arm on the ledge portion.

6. An armrest divider as defined by claim 1, wherein the ledge portion extends outwardly from the inner lateral side of the barrier portion a distance which is about two inches to about four inches in order to provide support for an arm or an elbow of a person using the armrest divider when the armrest divider is mounted on the armrest of the seat.

7. An armrest divider as defined by claim 1, wherein the side support member extends about three inches to about six inches from and below the ledge portion.

8. An armrest divider as defined by claim 1, wherein the overall longitudinal length of the armrest divider, from one end of one of the ledge portion and the barrier portion to the opposite end of the locking wedge section is about twelve inches to about eighteen inches.

9. An armrest divider as defined by claim 1, wherein the locking wedge section generally resides in substantially the same plane in which the side support member generally resides.

10. An armrest divider as defined by claim 1, wherein the locking wedge section is formed as a thickened rear portion of the side support member.

11. An armrest divider as defined by claim 1, wherein the locking wedge section is offset laterally from the plane in which the side support member generally resides.

12. An armrest divider as defined by claim 1, which further comprises:
an upper back wall and a lower back wall, the lower back wall being joined to the lower wall of the ledge portion and the inner lateral side surface of the side support member, and further being joined to the stop protrusion, the lower back wall extending generally perpendicularly from the ledge portion and side support member and defining with the lower wall of the ledge portion a lower corner, the upper back wall being joined to the inner lateral side of the barrier portion and the upper wall of the ledge portion and further extending generally perpendicularly to the ledge portion and the barrier portion to define an upper corner therewith.

13. An armrest divider as defined by claim 12, wherein the lower corner is one of rounded and curved.

14. An armrest divider as defined by claim 12, wherein the upper corner is one of rounded and curved.

15. An armrest divider as defined by claim 12, wherein the upper back wall is rearwardly inclined with respect to the upper wall of the ledge portion to define an obtuse angle of inclination therewith at the upper corner.

16. An armrest divider as defined by claim 15, wherein the angle of inclination of the upper back wall with respect to the upper wall of the ledge portion is between about 105 degrees and about 135 degrees.

17. In combination:
a first armrest divider as defined by claim 1; and
a second armrest divider as defined by claim 1, wherein the first armrest divider is structured as a mirror image of the second armrest divider so that the first armrest divider and the second armrest divider may be used on armrests disposed on opposite lateral sides of the seat.

18. An armrest divider as defined by claim 1, which further comprises:
at least one magnet, the at least one magnet being disposed in proximity to the lower wall of the ledge portion.

19. An armrest divider as defined by claim 1, which further comprises:

a cushioning pad, the cushioning pad being disposed in proximity to the lower wall of the ledge portion.

20. An armrest divider as defined by claim 1, which further comprises:
a cushioning pad, the cushioning pad being affixed to the lower wall of the ledge portion; and
at least one magnet, the at least one magnet being affixed to the cushioning pad.

21. An armrest divider removably mountable on an armrest of a seat in which a person may sit, the seat having a seating portion and a backrest having a front surface and situated in proximity to the seating portion, the armrest and the backrest of the seat defining a space therebetween for receiving a portion of the armrest divider, the armrest divider comprising:
an arm support section and a barrier section adjustably mounted to the arm support section, the arm support section of the armrest divider including:
a first lateral side and a second lateral side disposed opposite the first lateral side, and a distal end and a proximal end disposed longitudinally opposite the distal end;
a ledge portion configured to act as a support for a user of the armrest divider on which the user may rest his arm, the ledge portion being in a generally horizontal disposition when the armrest divider is mounted on the armrest of the seat, the ledge portion including an upper wall and a lower wall disposed opposite and below the upper wall, the upper wall and the lower wall being separated from each other on the second lateral side of the arm support section and being joined together on the first lateral side of the arm support section, the ledge portion having a plurality of laterally extending internal ribs spaced apart from each other periodically along at least a portion of the longitudinal length of the arm support section between the upper wall and the lower wall of the ledge portion, whereby adjacent ribs and the upper and lower walls of the ledge portion of the arm support section define a plurality of individual sockets;
a generally planar, first side support member, the first side support member being joined to and extending outwardly and downwardly from the lower wall of the ledge portion;
a first protruding dome disposed on the first side support member of the arm support section and in proximity to the longitudinal proximal end of the arm support section, the first protruding dome being configured to be inserted and wedged in the space defined by and between the armrest and the backrest of the seat when the armrest divider is mounted on the armrest; and
a first stop protrusion, the first stop protrusion being formed as a protruding member which extends outwardly and generally perpendicularly from the first lateral side of the arm support section, the first stop protrusion being disposed generally in proximity to the longitudinal proximal end of the arm support section near the first protruding dome, the first stop protrusion being configured to contact the front surface of the backrest of the seat when the armrest divider is mounted on the armrest of the seat to prevent the first protruding dome from being inserted more than a predetermined depth into the space defined by the armrest and the backrest of the seat;
the barrier section of the armrest divider including:

a first lateral side and a second lateral side disposed opposite the first lateral side, and a distal end and a proximal end disposed longitudinally opposite the distal end;
a generally planar mid-portion, the planar mid-portion having a longitudinally extending first lateral end and a longitudinally extending second lateral end situated opposite the first lateral end;
a generally planar barrier wall extending upwardly from and perpendicularly to the planar mid-portion at the second lateral end of the planar mid-portion;
a generally planar, second side support member extending downwardly from and perpendicularly to the planar mid-portion at the first lateral end of the planar mid-portion;
a plurality of spaced apart fingers arranged in a planar row and extending perpendicularly outwardly from the barrier wall and spaced above the planar mid-portion of the barrier section, the fingers being receivable in the sockets formed in the ledge portion of the arm support section so that the arm support section may be adjusted longitudinally on the barrier section to increase or decrease the overall longitudinal length of the armrest divider;
a second protruding dome disposed in proximity to the longitudinal proximal end of the barrier section and being situated on the second side support member of the barrier section; and
a second stop protrusion, the second stop protrusion being formed as a protruding member joined to the second side support member of the barrier section and extending outwardly and generally perpendicularly from the first lateral side of the barrier section, the second stop protrusion being disposed generally in proximity to the second protruding dome of the barrier section and near the longitudinal proximal end of the barrier section;
wherein the armrest divider is adjustable in longitudinal length to provide more comfort for the user of the armrest divider, the arm support section being repositionable on the barrier section longitudinally so that the fingers of the barrier section may be received in different sockets formed in the ledge portion of the arm support section, the armrest divider being configurable in an extended state and in a non-extended state wherein, when the armrest divider is configured in an extended state, the longitudinal proximal end of the barrier section, with the second protruding dome formed thereon, is configured to be receivable in the space defined between the armrest and the backrest of the seat to help secure the armrest divider in place on the seat, the second stop protrusion of the barrier section being configured to contact the front surface of the backrest of the seat when the armrest divider in the extended state is mounted on the armrest of the seat to prevent the second protruding dome of the barrier section from being inserted more than a predetermined depth into the space defined by the armrest and the backrest of the seat, and wherein, when the armrest divider is configured to be in a non-extended state, the longitudinal proximal end of the arm support section, with the first protruding dome formed thereon, is configured to be receivable in the space defined between the armrest and the backrest of the seat to help secure the armrest divider in place on the seat, the first stop protrusion of the arm support section being configured to contact the front surface of the backrest of the seat when the armrest divider in the non-extended state is mounted on the armrest of the seat to prevent the first protruding dome of the arm support section from being inserted more than a predetermined depth into the space defined by the armrest and the backrest of the seat; and wherein, when both the barrier section and the arm support section of the armrest divider are mated together during use, the planar mid-portion of the barrier section will rest on the armrest of the seat.

22. An armrest divider as defined by claim 21, which further comprises:
at least one cushion, the at least one cushion being affixed to the upper wall of the ledge portion, the at least one cushion providing added comfort for a person using the armrest divider and resting his arm on the ledge portion of the armrest divider.

23. An armrest divider as defined by claim 21, which further comprises:
at least one member formed of cushioning material, the at least one cushioning material member being affixed to at least a portion of the barrier wall of the barrier section on the first lateral side thereof to provide added comfort to the user of the armrest divider.

24. An armrest divider as defined by claim 21,
wherein the arm support section is detachable from the barrier section and may be used without the barrier section; and
wherein the first side support member of the arm support section extends downwardly from the lower wall of the ledge portion about midway relative to the transverse width of the ledge portion so that a section of the lower wall of the ledge portion extends transversely outwardly beyond the first side support member so as to be configured to rest on and be supported by the armrest of the seat when the arm support section of the armrest divider is used without the barrier section.

25. An armrest divider as defined by claim 21, wherein the first side support member extends longitudinally on the arm support section substantially from the longitudinal proximal end of the arm support section substantially to the opposite longitudinal distal end of the arm support section.

26. An armrest divider as defined by claim 21, wherein the first protruding dome of the arm support section has a generally convex oval shape that extends outwardly on the arm support section from the first lateral side thereof.

27. An armrest divider as defined by claim 21, wherein the second protruding dome of the barrier section has a generally convex oval shape that extends outwardly on the barrier section from the first lateral side thereof.

28. An armrest divider as defined by claim 21, wherein the adjacent ribs of the ledge portion of the arm support section are spaced apart about three-quarters of an inch.

29. An armrest divider as defined by claim 21, wherein each of the fingers of the barrier section includes a centerline, and wherein the centerlines of adjacent fingers are spaced apart about three-quarters of an inch.

30. An armrest divider as defined by claim 21, wherein the first stop protrusion of the arm support section defines a first concavity on the second lateral side of the arm support section;
wherein the first protruding dome of the arm support section defines a second concavity on the second lateral side of the arm support section; and
wherein the second stop protrusion on the barrier section is smaller in dimensions than the first stop protrusion of the arm support section so that, when the arm support section is mated to the barrier section, with the first lateral side of the barrier section being situated adjacent to the second lateral side of the arm support section, and with the armrest divider in a non-extended state, the second stop protrusion of the barrier section is at least partially receivable in the first concavity defined by the first stop protrusion of the arm support section on the second lateral side thereof, and the second protruding dome of the barrier section is at least partially receivable in the second concavity defined by the first protruding dome of the arm support section on the second lateral side thereof.

31. An armrest divider as defined by claim 21, wherein each finger of the barrier section includes a bump protrusion formed on a surface thereof configured to provide a friction or interference fit with one of the upper wall and the lower wall of the ledge portion of the arm support section when the fingers are received by respective sockets of the ledge portion.

32. An armrest divider as defined by claim 21,
wherein the arm support section is detachable from the barrier section and may be used without the barrier section; and
wherein the first side support member of the arm support section extends downwardly from the lower wall of the ledge portion about midway relative to the transverse width of the ledge portion so that a section of the lower wall of the ledge portion extends transversely outwardly beyond the first side support member so as to be configured to rest on and be supported by the armrest of the seat when the arm support section of the armrest divider is used without the barrier section, with the proximal end of the arm support section having the first protruding dome formed thereon being insertable in the space defined by the armrest and the backrest of the seat.

33. In combination:
a first armrest divider as defined by claim 21; and
a second armrest divider as defined by claim 21, wherein the first armrest divider is structured as a mirror image of the second armrest divider so that the first armrest divider and the second armrest divider may be used on armrests disposed on opposite lateral sides of the seat.

34. An armrest divider as defined by claim 21, which further comprises:
at least one magnet, the at least one magnet being disposed in proximity to an underside surface of the mid-portion of the barrier section.

35. An armrest divider as defined by claim 21, which further comprises:
a cushioning pad, the cushioning pad being disposed in proximity to an underside surface of the mid-portion of the barrier section.

36. An armrest divider as defined by claim 21, which further comprises:
a cushioning pad, the cushioning pad being affixed to an underside surface of the mid-portion of the barrier section; and
at least one magnet, the at least one magnet being affixed to the cushioning pad.

\* \* \* \* \*